US006862016B2

(12) United States Patent
Matsuura et al.

(10) Patent No.: US 6,862,016 B2
(45) Date of Patent: Mar. 1, 2005

(54) IMAGE DISPLAYING METHOD AND IMAGE FORMING APPARATUS UTILIZING A REVERSIBLE IMAGE DISPLAY MEDIUM HAVING A HIGH RESOLUTION IMAGE DISPLAY

(75) Inventors: Masahiko Matsuura, Suita (JP); Hiroshi Mizuno, Ikoma (JP); Akihito Ikegawa, Sakai (JP); Masaharu Kanazawa, Suita (JP); Keyaki Yogome, Kyoto (JP), jpx; Takaji Kurita, Osakasayama (JP)

(73) Assignee: Minolta Co., Ltd., Osaka (JP)

( * ) Notice: Subject to any disclaimer, the term of this patent is extended or adjusted under 35 U.S.C. 154(b) by 183 days.

(21) Appl. No.: 09/987,818

(22) Filed: Nov. 16, 2001

(65) Prior Publication Data

US 2002/0097199 A1 Jul. 25, 2002

(30) Foreign Application Priority Data

Nov. 16, 2000 (JP) ........................................ 2000-350197
Nov. 16, 2000 (JP) ........................................ 2000-350225
Nov. 16, 2000 (JP) ........................................ 2000-350231
Nov. 16, 2000 (JP) ........................................ 2000-350233

(51) Int. Cl.$^7$ ............................................. G09G 3/34
(52) U.S. Cl. ........................... 345/107; 345/85; 430/53; 399/1
(58) Field of Search ..................... 345/84–86, 107–111; 430/53; 399/1–2

(56) References Cited

U.S. PATENT DOCUMENTS 3,612,758 A * 10/1971 Evans et al. ................. 348/803
4,126,854 A    11/1978 Sheridon
4,143,103 A     3/1979 Sheridon
4,168,974 A *  9/1979 Ando et al. .................... 430/53
6,377,757 B2 *  4/2002 Matsuura et al. ............... 399/1
6,518,948 B1 *  2/2003 Berstis ......................... 345/107
6,611,100 B1 *  8/2003 Moore ......................... 313/582

OTHER PUBLICATIONS

Gugrae–Jo, et al, "New Toner Display Device: Image Display Using Conductive Toner And Charge Transport Layer" Japan Hardcopy '99, The Annual Conference Of The Imaging Society Of Japan, Jul. 21, 1999, 249–252.

* cited by examiner

*Primary Examiner*—Amr A. Awad
(74) *Attorney, Agent, or Firm*—McDermott Will & Emery LLP

(57) ABSTRACT

A method and apparatus capable of displaying a high-quality image using a reversible image display medium in which a cell(s) formed between two substrates accommodates at least two kinds of frictionally chargeable dry developing particles having different chargeable polarities and different optical reflection densities in image display, an electric field strength of, e.g., 0.3 V/$\mu$m to 3.0 V/$\mu$m is applied to the developer. An oscillating force (e.g. oscillating magnetic filed) is applicable and the oscillating force is substantially stopped during application of the electrostatic field. After completion of the electrostatic field, the surface of the medium on the image observation side may be charged to a potential holding the displayed image. Optionally, before image display, an alternating electric field may be applied to stir the developer for initialization of the medium.

20 Claims, 20 Drawing Sheets

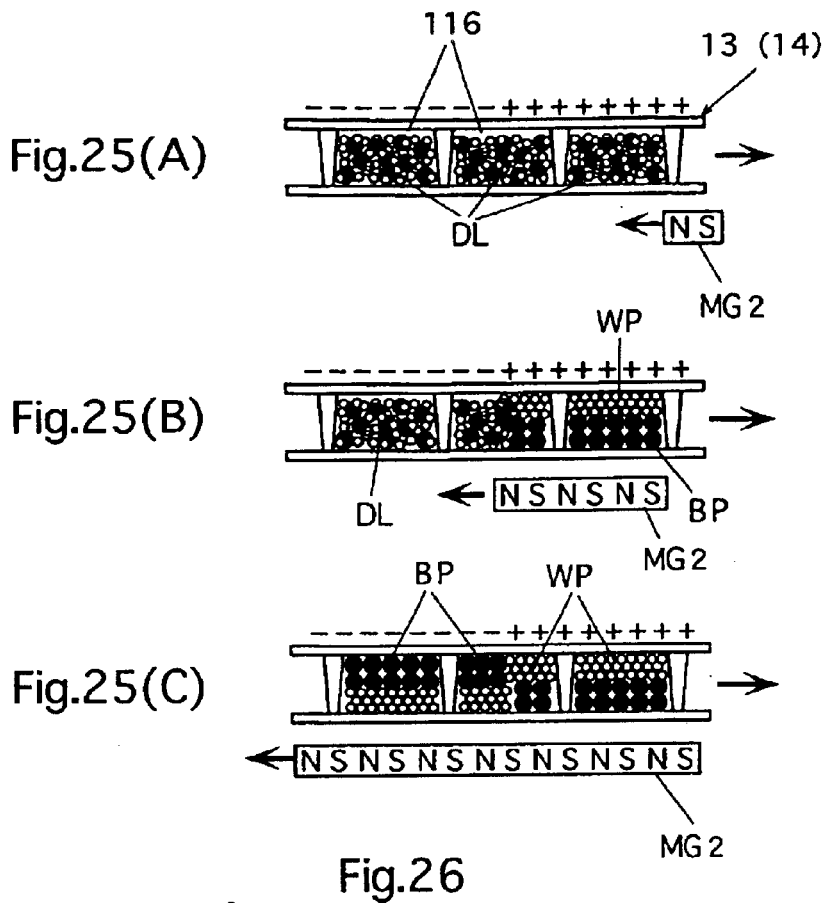
Fig.25(A)
Fig.25(B)
Fig.25(C)
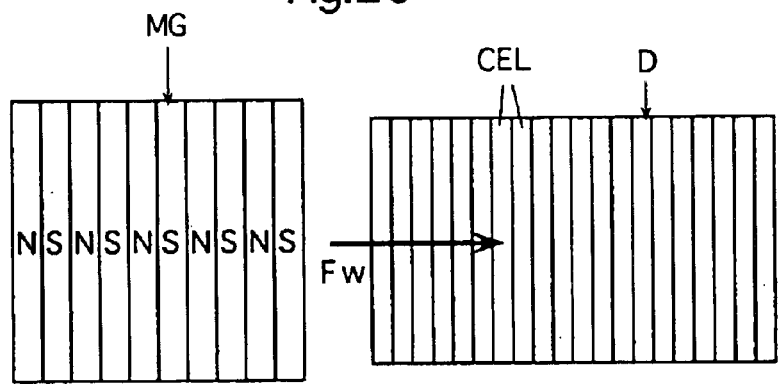
Fig.26
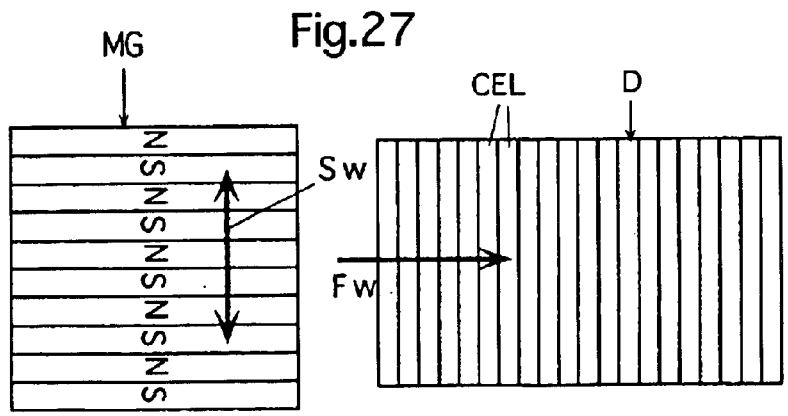
Fig.27

IMAGE DISPLAYING METHOD AND IMAGE FORMING APPARATUS UTILIZING A REVERSIBLE IMAGE DISPLAY MEDIUM HAVING A HIGH RESOLUTION IMAGE DISPLAY

CROSS-REFERENCE TO RELATED APPLICATION

This application is based on Japanese Patent applications No.2000-350197, No.2000-350225, No.2000-350231 and No.2000-350233 filed in Japan on Nov. 16, 2000, respectively, the contents of which are hereby incorporated by reference.

BACKGROUND OF THE INVENTION

1. Field of the Invention

The present invention relates to an image displaying method and an image forming apparatus, and particularly relates to an image displaying method and an image forming apparatus utilizing a reversible image display medium, in which image displaying and image erasing operations can be repeated.

2. Description of the Background Art

At present, image display is performed, e.g., in the following manners. A person uses a pencil, a pen, paints or the like, and manually writes or draws characters, pictures or the like on an image display medium such as paper sheet. Also, a computer, a word processor or the like is used to display text, graphics or the like on a display such as a CRT display, or output them on a medium such as a paper sheet via a printer for display.

A copying machine or the like may be used for producing duplication, on a medium of paper or the like, of the texts, pictures, graphics or the like, which are produced on the medium of paper or the like by a person or by a printer. A facsimile machine may be used for sending such contents (texts, pictures, graphics and others) prepared in the above manner for producing duplication on another medium of paper or the like.

The above image display, which is performed to display the texts, pictures or the like on the image display medium of paper or the like by a pencil, pen or the like, or by an image forming apparatus such as a printer, a copying machine or a facsimile machine operating in a electrophotographic method, an ink-jet method, a heat transfer method or the like, can achieve clear image display in a high resolution, and thus can achieve easy-on-the-eyes display.

However, it is impossible to repeat display and erasure of the images on the image display medium of paper or the like. In the case where the paper is used for writing characters or the like by a pencil, the characters can be erased by an eraser to a certain extent. However, it is difficult to erase completely the characters or the like written in an ordinary density, although it may be possible when written in a light density. The medium of paper or the like can not be reused except for the case of using the rear surface of the medium, which is not yet used for the image display.

Accordingly, the medium of paper or the like bearing images will be abandoned or burnt when it is not longer required. This results in consumption of a large mount of resources. The printer, copying machine or the like also consume consumable products or materials such as toner or ink. For obtaining the new display medium of paper or the like as well as toner, ink or the like, energies and resources are required for producing them. This is contrary to the current demand for reduction in environmental loads.

In contrast to the above, the image display by a display such as a CRT display can repeat the image display and the image erasure. However, the resolution, clarity and precision of images are restricted, as compared with the images displayed by the printer or the like on the paper medium or the like. Thus the image display by a display is improper especially when used for displaying the text documents mainly composed of letters because of low resolution. If it is used for displaying sentences which continue in less than the frame-size volume, it will do. However, if the sentences continue in twice or more times the frame-size volume, they may be difficult to read and to understand. Due to the relatively low resolution and the light emission from the display, operations for a long time are likely to be hard to eyes.

Electrophoretic display (EPD) and Twist ball-type display (TBD) have been proposed as an image display method allowing repetition of the image display and image erasure. Further displaying method was recently proposed, which is disclosed in "Japan Hardcopy '99, the book of the thesis, pp. 249–252".

In the electrophoretic display method, two substrates including at least one transparent substrate are opposed together with a spacer therebetween to form a closed space therebetween, and the space is filled with a display liquid formed of a dispersion medium and electrophoretic particles, which are dispersed in the dispersion medium and are different in color from the medium. The image display is performed by an application of an electrostatic field and in a color of the particles or a color of the dispersion medium.

The display liquid is usually formed of isoparaffin-contained dispersion medium, particles of titanium dioxide or the like, dyes applying contrast in color to the particles, and an additive such as a surface active agent, or a charge applying agent.

In the electrophoretic display, the display is performed by utilizing contrast between particles of a high refractive index (e.g., titanium dioxide particles) and colored insulating liquid, and therefore the particles can not hide the colored liquid to a high extent, resulting in a low contrast.

Furthermore, there is a limitation on the kind of dye which is dissolved in a high concentration in a nonpolar solvent of high resistance which allows the electrophoresis of particles. A dye showing a white color is not found. Nor known is a black dye having a high extinction coefficient. Therefore the background portion becomes colored so that it is difficult to achieve a good contrast by a white background. When white particles for formation of images are placed into a colored liquid, the colored liquid may be moved between the substrate and the layer of white particles which are moved to the image observation side substrate, or the colored liquid may come into between the white particles, thereby lowering the contrast. The electrophoretic particles can scarcely uniformly adhere to the image observation side substrate, and thus the resolution is low.

Further, settling and condensation of particles are liable to occur due to a very large difference in specific gravity between the particles and the dispersion medium in the display liquid. This is liable to lower the display contrast. Further, it is difficult to display the images with high stability for a long time, and remaining of last images is liable to occur. Further, the degree of charging of the particles in the liquid significantly changes with time, which also impairs the stability of the image display.

In the twist ball-type display method, images can be displayed in specified colors using an image display medium containing numerous microcapsules enclosing not only an insulating liquid but also fine spheric particle so processed that a half of their surface and the other surface portion show colors or an optical density which differs from each other. Images are displayed in predetermined colors by rotating the fine spheric particles in the microcapsules due to an electric field strength or magnetic strength.

However, according to the twist ball-type display, images are displayed using fine spherical particles in the insulating liquid within the microcapsules. This makes it difficult to attain good contrast. Further, the resolution is low since spaces are formed between the microcapsules. In the manufacture of microcapsules, difficulty is entailed in reducing the size of microcapsules to increase the resolution.

The "Japan Hardcopy '99, the book of the thesis, pp. 249–252" discloses an image displaying method wherein a closed space is formed by placing two substrates as opposed to each other and as spaced from each other, i.e. the two substrates being a laminate of electrodes and a charge transporting layer, the space being used to enclose the electrically conductive toner and insulating particles which are different in color from the toner, an electrostatic field being applied to inject charges into the electrically conductive toner so that the toner is moved by a Coulomb force applied thereto to display images.

However, the foregoing image displaying method utilizing the charge injection phenomenon poses problems. When the electrically conductive toner carrying the injected charges is moved, insulating particles (e.g. white particles mixed together to form the color of background) interfere with the movement of the toner particles, making their movement so difficult that some of them may stop their movement. This results in failure to obtain satisfactory image density and good contrast and in reduction of image display rate. To overcome these problems, a high voltage drive is necessitated. The resolution is determined by the electrodes and is so limited. Furthermore, it is essential to use electrodes, charge-injection layer and electrically conductive toner, which results in limited manufacture.

SUMMARY OF THE INVENTION

An object of the invention is to provide an image displaying method and an image forming apparatus utilizing a reversible image display medium, which allows repeating of image display and image erasure, and thereby can reduce consumption of image display mediums of paper or the like relating to the conventional image display and consumable materials such as developer and ink so that a current demand for reduction in environmental loads can be satisfied.

Another object of the invention is to provide an image displaying method and an image forming apparatus utilizing the reversible image display medium, which allow image display in good contrast and high quality.

A further object of the invention is to provide an image displaying method and an image forming apparatus utilizing the reversible image display medium, which allow image display in high resolution and high quality, and more specifically, in high resolution as compared with the electrophoretic display and the twist ball-type display, and also in higher resolution when display is performed based on an electrostatic latent image without employing opposite electrodes.

A still further object of the invention is to provide an image displaying method and an image forming apparatus utilizing the reversible image display medium, which can suppress remaining of last image(s), and therefore an image of good quality can be displayed.

An additional object of the invention is to provide an image displaying method and an image forming apparatus utilizing the reversible image display medium, which allow quick image display.

A further object of the invention is to provide an image displaying method and an image forming apparatus utilizing the reversible image display medium, which can reduce a drive voltage required for image display.

The present invention provides image displaying methods and image forming apparatuses relating to a reversible image display medium, which basically has the following structure.

The reversible image display medium includes:
two substrates opposed to each other with a predetermined gap therebetween;
one or more developer accommodating cells formed between the two substrates, each having a periphery surrounded by a partition wall; and
a dry developer contained in each of the cell(s), the dry developer containing at least two kinds of frictionally chargeable dry developing particles having different chargeable polarities and different optical reflection densities.

The invention provides the following image displaying methods and image forming apparatuses utilizing the reversible image display medium having such basic structure and having the following features.
(1) Image Displaying Method
(1-1) First Image Displaying Method
This method comprises the steps of:
providing a reversible image display medium having the foregoing basic structure; and displaying an image by driving the frictionally charged dry developing particles having different chargeable polarities in an electrostatic field corresponding to the image to be displayed.

In the image display step, the strength of the electric field to be applied to the developer is 0.3 V/$\mu$m to 3.0 V/$\mu$m.

The electric field strength of 0.3 V/$\mu$m to 3.0 V/$\mu$m is the strength of the electric field directly applied to the developer, in other words, applied to the space in the cell accommodating the developer.
(1-2) Second Image Displaying Method
This method comprises the steps of: providing a reversible image display medium having the foregoing basic structure; displaying an image by applying from outside an electrostatic field corresponding to the image to be formed and an oscillating force to the frictionally charged dry developing particles having different chargeable polarities to drive the developing particles; and substantially stopping application of the foregoing oscillating force during the application of the electrostatic field after image display.
(1-3) Third Image Displaying Method
This method comprises the steps of: providing a reversible image display medium having the foregoing basic structure; displaying an image by applying from outside an electrostatic field corresponding to the image to be formed to the frictionally charged dry developing particles having different chargeable polarities to drive the developing particles; and charging a surface of the reversible image display medium on image observation side to carry a potential holding the displayed image after completion of application of the electrostatic field.

(1-4) Fourth Image Displaying Method

This method comprises the steps of: providing a reversible image display medium having the foregoing basic structure; initializing the reversible image display medium by stirring the developer in the image display medium before displaying an image on the display medium; and displaying the image by driving the frictionally charged dry developing particles having different chargeable polarities within the above-initialized reversible image display medium in an electrostatic field corresponding to the image to be formed.

(1-5) Fifth Image Displaying Method

This method comprises the steps of: providing a reversible image display medium having the foregoing basic structure in which at least one kind out of at least two kinds of developing particles are magnetic particles; displaying an image by applying an electrostatic field corresponding to the image to be formed to the frictionally charged developing particles having different chargeable polarities to drive the developing particles; and applying a stirring force to the developer by affecting a stirring force on the developer in the reversible image display medium by a magnetic field from outside before and/or in the image display step.

If no problem is raised, a combination of at least two features in the foregoing image displaying methods may be employed.

(2) Image Forming Apparatus (2-1) First Image Forming Apparatus

The first image forming apparatus is one which causes a reversible image display medium having the foregoing basic structure to display an image. This apparatus comprises a device for initializing the reversible image display medium by stirring the developer in the image display medium before causing the display medium to display an image; and an image forming portion for displaying the image by driving the frictionally charged developing particles having different chargeable polarities within the initialized medium in an electrostatic field corresponding to the image to be formed.

(2-2) Second Image Forming Apparatus

The second image forming apparatus is one which causes a reversible image display medium having the foregoing basic structure to display an image. At least one kind out of at least two kinds of developing particles in the medium are magnetic particles. This apparatus comprises an image forming portion for displaying the image by driving the frictionally charged developing particles having different chargeable polarities within the reversible image display medium in an electrostatic field corresponding to the image to be formed; and at least one device for applying a magnetic stirring force to the developer by affecting the magnetic field on the developer in the reversible image display medium from outside before and/or in the image display on the medium, thereby applying a stirring force to the developer.

If no problem is raised, a combination of features in the foregoing image displaying apparatuses may be employed.

The foregoing and other objects, features, aspects and advantages of the present invention will become more apparent from the following detailed description and the accompanying drawings.

BRIEF DESCRIPTION OF THE DRAWINGS

FIG. 7(A) is a sectional view of the reversible image display medium before image display. FIG. 7(B) is a sectional view of an example of the medium in image display.

FIG. 8(A) is a sectional view of the reversible image display medium before image display. FIG. 8(B) is a sectional view of an example of the medium in image display.

FIG. 25(A) to FIG. 25(C) are views showing the state of images being displayed by applying the oscillating magnetic field to the image display medium carrying an electrostatic latent image formed over its surface.

FIG. 26 is a view showing an example of the arrangement of magnetic poles in a magnet plate.

FIG. 27 is a view showing another example of the arrangement of magnetic poles in a magnet plate.

DESCRIPTION OF THE PREFERRED EMBODIMENTS

Figure 1:
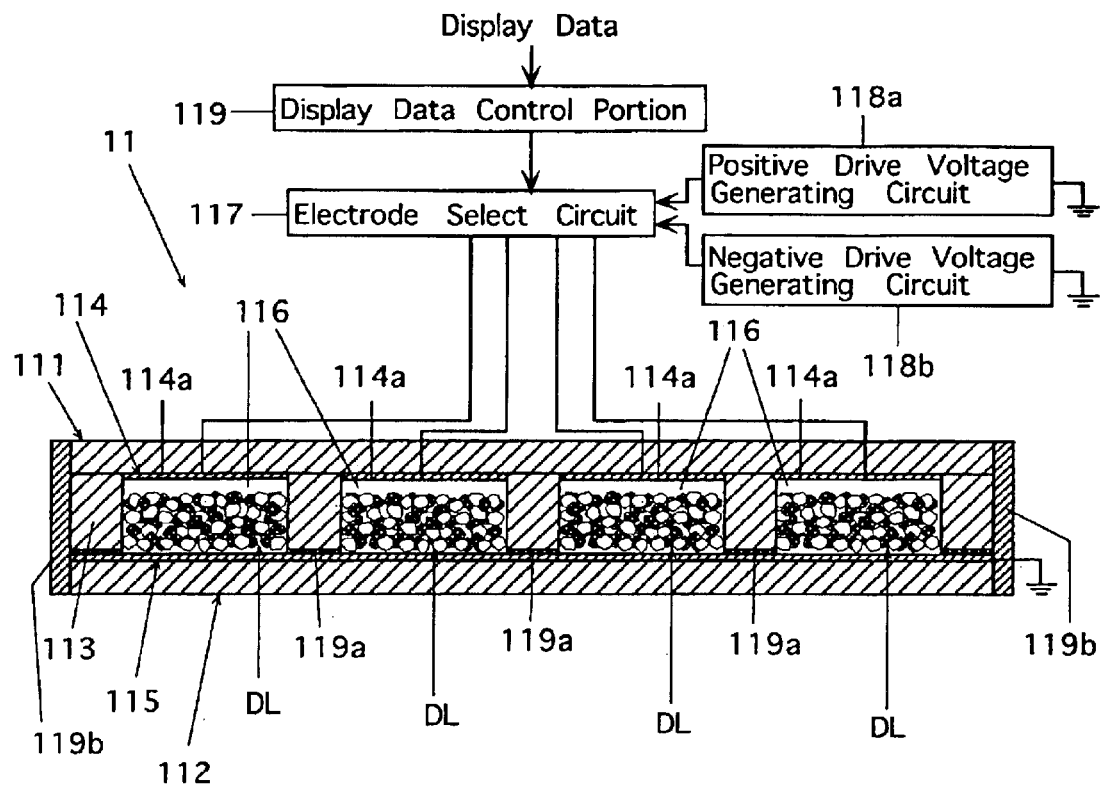
FIG. 1 is a sectional view showing an example of the reversible image display medium having opposite electrodes before image display.

A reversible (in other words, reusable) image display medium according to a preferred embodiment of the invention basically has the following structure.

The reversible image display medium includes two substrates opposed to each other with a predetermined gap therebetween; one or more developer accommodating cells formed between the two substrates, and each having a periphery surrounded by a partition wall; and a dry developer contained in each of the cell(s). The dry developer contains at least two kinds of frictionally chargeable dry developing particles having different chargeable polarities and different optical reflection densities.

According to the reversible image display medium, a predetermined electrostatic field corresponding to an image to be displayed is formed and is applied to the frictionally charged developing particles in the image display medium. Thereby, a Coulomb force acting between the electrostatic field and the charged developing particles can move the developing particles to display the image in predetermined contrast.

After displaying the image, a different electrostatic field, an alternating electric field, an oscillating magnetic field (when magnetic developing particles are employed) or the like may be formed so that the image can be erased. Also, the image can be rewritten by forming a different electrostatic field. Accordingly, it is not necessary to abandon the image display medium, on which the image is already displayed. The developing particles are contained in the cell, and therefore external supply or addition of the developer is not required. Owing to these facts, it is possible to reduce remarkably the use of the image display medium such as paper sheets as well as consumable materials such as developer in the prior art. In contrast to the image formation of the electrophotographic type or the like in the prior art, it is not necessary to melt the toner for fixing it onto a sheet of paper or the like, and a majority of the image forming energy, which is required in such an image forming apparatus in the prior art, is not required.

Owing to the above features, the medium can satisfy a current demand for reduction in environmental loads.

The developer contained in the cell includes at least two kinds of developing particles having different optical reflective densities, and in other words, exhibiting different contrasts or different colors. Further, the developing particles are dry particles, and one kind of the developing particles can appropriately screen or hide the other kind of developing particles. Therefore, image display in good contrast can be achieved.

The developer contained in the cell includes at least two kinds of the chargeable dry developing particles, which can be frictionally charged to have different chargeable polarities. For image display, the developing particles which are mutually reversely charged by the frictional charging are easily moved by the Coulomb force. This also achieves the display in good contrast, and can suppress remaining of the last image, and also allows quick display of images, and further can reduce a drive voltage required for image display.

The dry developing particles can suppress settling and condensation as compared with, e.g., electrophoretic particles in a display liquid used for electrophoretic image display, because the liquid is not present. This also suppress lowering of the contrast of the image display, and thereby can perform stable image display for a long time. Since the settling and condensation of the developing particles are suppressed, the remaining of the last image can be suppressed. As compared with the particles in the liquid, the dry developing particles can perform stable image display also for the reason that the charging performance thereof changes with time to a smaller extent.

As compared with the image display by a conventional CRT display or the like, easy-on-the-eyes image display in high resolution can be performed.

The electrostatic field corresponding to the image to be formed can be formed, for example, by applying a voltage corresponding to the image to be formed between electrodes arranged on the substrates of the image display medium, or by forming an electrostatic latent image on one of the substrates.

The electrostatic field can be formed based on the electrostatic latent image, which is formed on the outer surface of one of the two substrates. In this case, the electrostatic field may be formed simultaneously with formation of the electrostatic latent image, or may be formed after formation of the electrostatic latent image. The electrostatic field may be formed by placing a predetermined potential on the substrate, which is opposite to the substrate for carrying the electrostatic latent image. This predetermined potential can be placed by applying the bias voltage to the above opposite substrate, or grounding the opposite substrate, simultaneously with formation of the electrostatic latent image, or after formation of the electrostatic latent image.

Materials useful for substrates and cell partition walls can be selected from a wide range. Useful substrates include, for example, glass substrates, hard or soft synthetic resin substrates, and soft film substrates.

At least one of the two substrates forming the medium (arranged on the image observation side) is light permeable to allow seeing the displayed image.

In the case of forming an electrostatic latent image for image display on the medium surface, the substrate for carrying the electrostatic latent image can be formed of an insulating substrate. The other substrate on the opposite side (e.g., on the non-observation side) may be an insulating substrate or another kind of substrate. If the other substrate is an insulating substrate and ground potential or a bias voltage must be placed on the other insulating substrate, an electrically conductive film may be formed on the outer surface of the substrate, or the substrate may be entirely made of an electrically conductive material or a material containing an electrically conductive material, although these are not essential. By employing the above manner or structure, the substrate can be easily grounded to carry the ground potential, or the bias voltage can be easily applied to the substrate. An effect of externally shielding the electrical charges by the substrate on the opposite side can be achieved, if the substrate on the opposite side is an insulating substrate, and is provided at its outer surface with the electrically conductive film, or if the substrate itself on the opposite side is the electrically conductive substrate. Thereby, even in the case where the mediums on which images are displayed are overlapped together, collapsing of the images can be suppressed, and thereby the images can be stably held.

There is no limitation on the number, size, shape, distribution, arrangement (regular or irregular) and others of the developer-accommodating cells insofar as the image is displayed. Optionally a developer-moving suppressing member and a spacer for maintaining a gap between the substrates may be provided between the substrates. The cell partition wall may serve as the developer-moving suppressing member and the spacer.

FIG. 32 (A) to FIG. 32 (E) show examples of the shape of cells CEL in the reversible image display medium D. FIG. 32 (A) indicates the medium D having a plurality of continuous groove-like cells extending in a widthwise direction of the medium D. FIG. 32(B) shows a plurality of rectangular cells arranged in series in lengthwise and widthwise directions of the medium D. In the medium D of FIG. 32(C), the cells are arranged in series in a widthwise direction and displaced in a lengthwise direction, and they are arranged in a brick-wall design as a whole. In the medium D of FIG. 32(D), the cells are arranged in series in lengthwise and widthwise directions and consist of a plurality of squares arranged in a checkerboard design. The medium D of FIG. 32(E) consists of a single cell in which a large number of spacers are provided between the substrates.

In any case, when small-size cells are used, the deflection of developer is reduced. However, the partition walls occupy a larger portion of the space between the opposed substrates so that a correspondingly reduced amount of developer is accommodated, resulting in a lower contrast in the image density. If large cells are used, a good contrast is achievable, but the developer is deflected in a more degree. Accordingly the size of a cell is determined according to a suppressed degree of deflection of developer and a good contrast.

For example, when an electrostatic latent image is formed on the substrate, an excessively large gap between the substrates or an excessively large thickness of each substrate reduces the electric field applied to the developer between the substrates, and therefore impairs the development performance so that the contrast is lowered. If the gap between the substrates is excessively small, this reduces an amount of the developer, which can be accommodated in the developer accommodating cell, so that required contrast can not be achieved. If the thickness of each substrate is excessively small, and therefore the whole thickness of the medium affected by the thickness of each substrate is excessively small, the medium is liable to be curved so that the gap between the substrates can not be uniform, and the image irregularities are liable to occur. Accordingly, it is preferable that each substrate has a thickness from 5 $\mu$m to 100 $\mu$m, the gap between the opposite substrates is in a range from 20 $\mu$m to 300 $\mu$m, and the whole thickness is in a range from 30 $\mu$m to 500 $\mu$m, although not restricted to these values.

The developing particles may be frictionally charged by applying mechanical vibrations after accommodating the developing particles in the cells, or by frictionally charging at least two kinds of developing particles by stirring and then accommodating the developing particles in the cells. The latter method is preferable to give the developing particles frictionally charged in the desired state. At any rate, the developing particles are frictionally charged before image display.

Such reversible image display medium may have or may not have electrodes. If the substrate is free of electrode, the medium can be so simplified and the use of an elastic substrate such as a film is easily allowed.

Useful reversible image display mediums with electrodes include, for example, those in which an electrode (preferably transparent electrode) is formed on the internal surface of one of substrates which is permeable to light while an electrode opposed to the electrode is formed on the internal surface of the other substrate.

The electrode formed on the internal surface of the other substrate may consist of a group of independent electrodes formed for respective pixels.

The image display medium with the electrodes may be provided with leads for the electrodes. It is desired that the lead is arranged in the non-image display region where the partition wall or the like may be present.

In either of the reversible image display mediums with and without the electrode, the developer accommodated in the developer accommodating cell may contain at least two kinds of dry developing particles, which have mutually different chargeable polarities, and different optical reflective densities (in other words, of different contrasts or different colors). As a typical example, the developer may contain positively chargeable (or negatively chargeable) black particles having light absorbing properties and negatively chargeable (or positively chargeable) white particles having light reflecting properties.

Among at least two kinds of developing particles forming the dry developer, at least one kind of the developing particles may be non-conductive particles. In this case, the presence of such non-conductive particles allows easy and reliable charging by friction of the two kinds of developing particles, regardless of whether the image display medium has the electrodes or not. Thereby, the image display can be further improved.

Of the two kinds of developing particles forming the dry developer, at least one kind of the developing particles may be magnetic particles. The existence of such magnetic particles allows affecting a magnetic stirring force on the developer (developing particles) by the magnetic field (e.g., oscillating magnetic field) in relation to driving the developing particles in the electrostatic field. Owing to the stirring of the developer, the developing particles can easily move in the electrostatic field for image display. Thereby, the contrast is further improved and the required voltage for image display can be further lowered.

In other words, regardless of whether the image display medium has the electrodes or not, the existence of such magnetic particles allows stirring the developer (developing particles) by the magnetic field (e.g., oscillating magnetic field). Owing to the stirring of the developer, the developing particles can easily move when initializing the medium or erasing the last image, or displaying the new image in the electrostatic field for image display. Thereby, the image display is further improved.

The developing particles may be stirred by applying AC voltage or like alternating voltage and/or applying mechanical vibrations. Optionally the stirring may be done using a combination of two or more stirring means such as alternating voltage agitation, magnetic agitation, mechanical agitation, ultrasonic wave emission and the like.

One kind of the developing particles may be nonconductive and magnetic particles.

In any one of the foregoing cases, if the developing particles are excessively small, they have an excessively large adhesiveness, and therefore cause mutual adhesion of the particles and reduction in developing efficiency. Further, such excessively small developing particles carry a large amount of charges so that a large electric field is required for moving the particles for image display, and therefore, a high drive voltage is required.

If the developing particles are excessively large, the frictional charging can not be performed in an intended manner so that the developing particle moving speed can not be increased sufficiently in the electrostatic field for image display, and/or good contrast can not be achieved.

In view of the above as well as the material and others for obtaining the predetermined characteristics of the developing particles, the appropriate particle diameter (volume average particle diameter) of the non-conductive developing particle is in a range from 1 $\mu$m to 50 $\mu$m, and the appropriate particle diameter (volume average particle diameter) of the magnetic developing particle is in a range from 1 $\mu$m to 100 $\mu$m.

The developing particles can be formed, for example, from a binder resin and a coloring agent, etc. or with a coloring agent alone, etc. Those which are usable are described below.

Binder Resin

The binder resin is not specifically limited in so far as it can disperse a coloring agent, magnetic substance, etc. and is usable usually as a binding agent. Binding resins which are usable for electrophotography toner are used as a representative example.

Examples of useful binder resins are polystyrene type resins, poly(meth)acrylic type resins, polyolefin type resins, polyamide type resins, polycarbonate type resins, polyether type resins, polysulfone type resins, polyester type resins, epoxy resins, urea resins, urethane resins, fluorine-containing resins, silicone resins and copolymers, block polymers, graft-polymers and polymer blend, etc. of these resins.

The binder resin may have a considerably high glass transition temperature (Tg) and need not be a thermoplastic resin.

Coloring Agents

As the coloring agents, the following various kinds of organic or inorganic pigments and dyestuffs having various colors are usable.

Examples of black pigments are carbon black, copper oxide, manganese dioxide, Aniline Black and activated carbon, etc.

Examples of yellow pigments are chrome yellow, zinc yellow, cadmium yellow, yellow iron oxide, mineral Fast Yellow, Nickel Titanium Yellow, Naphthol Yellow S, Hansa Yellow G, Hansa Yellow 10G, Benzidine Yellow G, Benzidine Yellow GR, Quinoline Yellow Lake, Permanent Yellow NCG and Tartrazine Lake, etc.

Examples of orange pigments are red chrome yellow, molybdenum orange, Permanent Orange GTR, Pyrazolone Orange, Vulcan Orange, Indanthrene Brilliant Orange RK, Benzidine Orange G and Indanthrene Brilliant Orange GK, etc.

Examples of red pigments are red iron oxide, cadmium red, red lead, mercury sulfide, Permanent Red 4R, Lithol Red, Pyrazolone Red, Watchung Red, Lake Red D, Brilliant Carmine 6B, eosine lake, Rhodamine Lake B, alizarin lake and Brilliant Carmine 3B, etc.

Examples of violet pigments are manganese violet, Fast Violet B and Methyl Violet Lake, etc.

Examples of blue pigments are prussian blue, cobalt blue, Alkali Blue Lake, Victoria Blue Lake, Phthalocyanine Blue, Phthalocyanine Blue containing no metal, partially chlorinated Phthalocyanine Blue, Fast Sky Blue and Indanthrene Blue BC, etc.

Examples of green pigments are chrome green, chromium oxide, Pigment Green B, Malachite Green Lake and Final Yellow Green G, etc.

Examples of white pigments are zinc white, titanium oxide, antimony white and zinc sulfide, etc.

Examples of extender pigments are barite powder, barium carbonate, clay, silica, white carbon, talc and alumina white, etc.

Examples of various kinds of dyestuffs such as basic, acid, disperse and substantive dye are Nigrosine, Methylene Blue, Rose Bengale, Quinoline Yellow and Ultramarine Blue, etc.

These coloring agents are usable alone or in combination of plural of them.

Especially in white-black display, carbon black is preferable as a black coloring agent and titanium dioxide as a white coloring agent.

Especially in the case of preparing developing particles from a mixture of a white pigment and a meltable binding resin(binder resin), it is preferable to use the white pigment in an amount of at least 10 parts by weight, more preferably at least 20 parts by weight, per 100 parts by weight of raw monomer of white particles, in order to obtain sufficient whiteness. It is desirable to use the white pigment in an amount of up to 60 parts by weight, more preferably up to 50 parts by weight, in order to secure sufficient dispersibility of the white pigment. Over 60 parts by weight of the white pigment, the binding of the pigment and the binding resin will decrease and the dispersion of the pigment will deteriorate. Less than 10 parts by weight of the white pigment, the developing particles having a different color will not sufficiently be shaded by the pigment.

Although carbon black is preferable as the black coloring agent, it is possible to use magnetic particles or magnetic fine powder such as magnetite, ferrite, etc. as the coloring agent in order to provide magnetic character to the developing particles.

Other Additives

Examples of additives preferably usable other than the above binder resin or coloring agent are magnetic substance, charge-controlling agent, resistance adjusting agent, etc.

Charge-Controlling Agent

The charge-controlling agent is not specifically limited in so far as it provides a charge to the developing particles by friction-charging.

Examples of plus-charge-controlling agents are Nigrosine dye, triphenylmethane compound, quaternary ammonium salt compound, polyamine resin, imidazole derivative, etc.

Examples of minus-charge-controlling agents are salicylic acid-metal complex, metal-containing azo dye, metal-containing oil-soluble dye (including metal ion or metal atom), quaternary ammonium salt compound, calixarene compound, boron-containing compound (benzilic acid-boron complex), nitroimidazole derivative, etc.

Other than the above, as charge-controlling agents are usable metal oxides such as ultrafine silica particles, ultrafine titanium oxide particles, ultrafine alumina particles, etc., nitrogen-containing cyclic compounds such as pyridine or its derivative, salt, various organic pigments, resins containing fluorine, chlorine, nitrogen, etc.

Magnetic Substances

Magnetic particles and magnetic fine powder are usable. Examples of these substances are ferromagnetic elements, alloy or compounds containing the element. Examples thereof are those containing a conventionally known magnetic substance such as magnetite, hematite, ferrite or like alloys or compounds of iron, cobalt, nickel, manganese, etc., other ferromagnetic alloy, etc. The magnetic powder may have various shapes such as particle, needle, thin flat shape, etc. and is suitably usable.

Resistance Adjusting Agent

Resistance adjusting agents include similar compounds to the above magnetic powder and coloring agent.

Examples of resistance adjusting agents are metal oxides, graphite, carbon black, etc. having various shapes such as thin flat, fibrous or powder shape, etc.

Below is explained an example of preparing developing particles.

Prescribed amount of each of components selected from the above binder resin, magnetic powder, coloring agent, charge-controlling agent, resistance adjusting agent and other additives is prepared, and those components are mixed thoroughly. The mixture is further mixed with heating by use of press-kneader, twin-screw mixing device, etc. After cooling, the mixture is roughly pulverized with use of hammer mill, cutter mill, etc. and then finely pulverized with use of jet mill, angmill, etc. The resulting powder is classified by a wind classifier, etc. to a predetermined average particle size to obtain developing particles.

A developer having a predetermined amount of charges is obtained by mixing and stirring thus obtained particles having different chargeable polarities and contrasts (optical reflective densities) at a predetermined rate thereof. A third agent such as fluidization agent may be added thereto to improve fluidity of the developer.

Fluidization Agent

Examples of fluidity improving agents are silica, alumina, titanium oxide, barium titanate, magnesium titanate, calcium titanate, strontium titanate, zinc oxide, siliceous sand, clay, mica, wallastonite, diatomaceous earth, chromium oxide, cerium oxide, red iron oxide, antimony trioxide, magnesium oxide, zirconium oxide, barium sulfate, barium carbonate, calcium carbonate, silicon carbide, silicon nitride, etc.

Particularly preferable are fine powder of silica, aluminum oxide, titanium dioxide and magnesium fluoride. The fluidity improving agent is used either alone or in combination.

In the image display employing the reversible image display medium, the electrostatic field to be applied to the developing particles can be formed, for example, based on the electrostatic latent image, which is formed on, or brought close to or into contact with, e.g., the surface of one (e.g., on the image observation side) of the two substrates in accordance with the image to be displayed. The formation of the electrostatic field may be performed simultaneously with or after the formation or approach of the electrostatic latent image. The formation of the electrostatic field is performed, e.g., by placing a predetermined potential, which is required for forming the electrostatic field, on the substrate opposite to the substrate, on which the electrostatic latent image is to be formed. The above predetermined potential can be placed by applying a bias to the opposite substrate, or by grounding the opposite substrate.

The electrostatic latent image may be formed directly on the medium surface (substrate surface), e.g., by a device for directly forming the electrostatic latent image, or may be formed by transferring the electrostatic latent image, which is formed outside the medium by an external electrostatic latent image forming device, onto the medium surface (substrate surface). The electrostatic latent image, which is formed outside the medium by an external electrostatic latent image forming device, may be brought close to or into contact with the medium surface (substrate surface).

The direct electrostatic latent image forming device may be of various discharging types, in which the electrostatic latent image charges are placed by Ad performing the discharge to the medium surface in accordance with the image to be displayed, or of various charge injection types, in which the electrostatic latent image charges are placed by injecting charges to the medium surface in accordance with the image to be displayed. For example, the devices of the former type may be of an ion flow type, and also may be of a multi-stylus type having an electrostatic record head, in which recording electrodes are arranged in a predetermined direction (e.g., main scanning direction for substrate scanning by the device). In an example of the latter type, the device of the multi-stylus type may be used, which includes an electrostatic record head, in which the recording electrodes are arranged in a predetermined direction (e.g., main scanning direction for substrate scanning by the device), and neighboring control electrodes are arranged close to the recording electrodes.

The external electrostatic latent image forming device may be configured such that the electrostatic latent image corresponding to the image to be displayed is formed on the electrostatic latent image carrier, and then is transferred onto, or brought close to or into contact with the substrate surface. More specifically, the electrostatic latent image corresponding to the image to be displayed may be formed, e. g., on a photoconductive member such as a photosensitive member, and may be transferred onto, or brought close to or into contact with the substrate surface. Alternatively, the electrostatic latent image corresponding to the image to be displayed may be formed on a dielectric member, and may be transferred onto, or brought close to or into contact with the substrate surface.

The image display may be performed with the electric field forming device including one of the foregoing electrostatic latent image forming devices.

By forming the electrostatic latent image on the image display medium in the foregoing transfer manner or the direct formation manner or by bringing the electrostatic latent image close to or into contact with the image display medium, the image holding properties of the medium can be improved. In particular, the image holding properties can be improved in the case of using developer having high flowability or developer having flowability which can be increased by the developer stirring operation prior to the image display.

In the reversible image display medium having the opposite electrodes, the electrostatic field for the image display can be formed by applying a voltage across the opposite electrodes. The electrostatic field formation device for such medium will be described later.

In the reversible image display medium without an electrode or with an electrode on only one of the substrates, the electrostatic field to be applied to the developing particles can be formed, for example, by arranging an electrode or electrodes on the outer surface(s) of the medium and applying a voltage through the electrode(s).

In both the reversible image display mediums with and without the electrode, image erasing processing (initializing processing) may be performed for erasing the previously displayed image prior to the new image display.

The image erasing processing (initialization processing) can be performed, e.g., by forming an electric field, which can move the developing particles forming the developer in the image display medium, and/or applying a stirring force to the developer. The application of the stirring force can be performed, e.g., by forming an alternating electric field, forming an oscillating magnetic field, emitting ultrasonic waves, and/or applying mechanical vibrations.

For the image display, therefore, various kinds of image easing devices (medium initializing devices) can be appropriately employed. Such image erasing devices may include the electric field forming device for forming the electric field moving the developing particles, the stirring device for applying a stirring force to the developing particles, or both the electric field forming device and the stirring device.

For example, under the electric field, one kind of the developing particles, which have the same optical reflection density (i.e., the same contrast or the same color), among the two kinds of developing particles described above may be collected to one of the substrates, and the other kind of developing particles having the same optical reflection density may be collected to the other substrate. Thereby, the image erasure can be performed. Further, the next image formation can be performed by moving the developing particles on only the image portion so that the image display can be performed smoothly and reliably in high quality.

For example, in the operation of stirring the developer (developing particles), the image is erased, and the amount of charges and the flowability of the developing particles are improved. Thereby, the next image formation can be performed smoothly and reliably in a high quality.

In addition, for example, when the developer (developing particles) is stirred before image display, the image is erased, remaining of images is suppressed, the developing particles are prevented from locally existing in the medium (cells), are uniformly distributed therein and are brought into properly charged state. Thereby high-quality images are displayed in forming the images.

The electric field forming device for image erasing (initialization) may include a pair of electrodes (usually made of metal) or dielectric members, which are arranged on the opposite sides of the reversible image display medium, and a power supply device for applying a bias voltage across these electrodes or dielectric members.

In addition to the above, it is possible to employ various kinds of electric field forming devices of the discharging type, in which the electric field is formed by performing the discharging to the image display medium, and various kinds of electric field forming devices of the charge injection type, in which the electric field is formed by injecting the electric charges to the reversible image display medium. The devices of the former type may be specifically are a Corona charging device, an electric field forming device of an ion flow type, and an electric field forming device of the multi-stylus type having a head, in which electrodes are arranged in a predetermined direction. The device of a latter type may be specifically an electric field forming device of the multi-stylus type, in which electrodes are arranged in a predetermined direction, and neighboring control electrodes are arranged close to the electrodes.

The stirring device may be configured as follows:

Thus, the stirring device may be configured to form an alternating electric field applied to the reversible image display medium.

This device can be utilized if at least one kind of developing particles have the electrically insulating property.

Also, the stirring device may be configured to form an oscillating magnetic field applied to the reversible image display medium.

This device can be utilized if at least one kind of developing particles contain a magnetic material.

Further, the stirring device may be configured to emit ultrasonic waves to the reversible image display medium.

The stirring device may be configured to apply mechanical vibrations to the reversible image display medium.

The stirring device may be formed of a combination of the foregoing two or more structures.

The alternating electric field applying device and the oscillating magnetic field applying device can efficiently stir the developer.

As already described, the stirring of the developer (developing particles) improves the amount of charges and the flowability of the developing particles, and thereby can achieve smooth and reliable image display with high quality.

By stirring the developer prior to the image display, the amount of charges of the developing particles is stabilized. This likewise achieves good image display. Further, the allowable ranges of the chargeability and flowability of the developer can be widened.

For the image display using the reversible image display medium either with or without the electrode, the developer may be stirred also for the purpose of performing the foregoing image erasing processing, or independently of the image erasing processing.

When using the image display medium without an electrode or with an electrode on only one of the substrates, for example, the electrostatic latent image corresponding to the image to be displayed may be formed, e.g., on the surface (substrate surface) of the image display medium, and the electrostatic field may be formed based on the electrostatic latent image simultaneously with or after the formation of the electrostatic latent image, and the developer may be stirred, for example, simultaneously with and/or before formation of the electrostatic field.

For the image display medium provided with the opposite electrodes, a voltage may be applied across the opposite electrodes to form the electrostatic field, and, for example, the developer may be stirred before or simultaneously with the formation of the electrostatic field.

Regardless of whether the electrode is employed or not, the developer can be stirred, e.g., by a stirring device, which is opposed to an image display medium transporting path, and is located in or upstream to the region for forming the electrostatic field by the electric field formation device in the relative transporting direction of the image display medium with respect to the electric field formation device.

The developer stirring device and method may be the same as or similar to those already exemplified in connection with the image erasing processing.

By stirring the developer for the image display, the contrast can be further improved, and the drive voltage can be further lowered.

For the image display employing the reversible image display medium, the electrostatic latent image may be formed on the surface (substrate surface) of the image display medium in such a manner that the medium surface is uniformly charged to carry the predetermined potential before formation of the electrostatic latent image, and the electrostatic latent image in accordance with the image to be displayed is formed on the charged region. Based on the electrostatic latent image, the predetermined electrostatic field is formed in accordance with the image to be displayed. Thereby, the developing particles may be moved for the image display.

The formation of electrostatic latent image on the medium can be performed, e.g., by directly forming it on the medium surface charged in the charging step, or by transferring the electrostatic latent image formed on the electrostatic latent image carrier outside the medium onto the medium surface charged in the charging step.

The region of the electrostatic latent image formed on the medium may have such charging characteristics that the region is charged to carry the same polarity as or the polarity different from the charged polarity of the region of the medium surface, which is uniformly charged prior to the electrostatic latent image formation, or that the region of the latent image is charged to 0 V.

According to the above manner, in which the electrostatic latent image is written onto the charged region formed by uniformly charging the surface of the image display medium to carry the uniform potential, the charged developing particles in the developer accommodating cell(s) can be moved. Further, such an electrostatic field, which is enough to hold the moved developing particles is formed. In other words, after uniformly charging the surface of the image display medium to carry the predetermined potential, the electrostatic latent image is written onto the charged region, whereby the image holding properties are improved. Particularly, in the case of using the developer having high flowability or the developer having the flowability which can be increased by the developer stirring operation prior to the image display, the advantages relating to the image holding can be achieved. Owing to the above, images of good contrast and high quality can be stably displayed for a long time.

According to the various reversible image display mediums described above, the images of good contrast, high resolution and high quality can be stably displayed for a long time. Further, remaining of last images can be suppressed, and therefore good reversibility can be achieved. These improve the quality of the displayed image. The image display can be quickly performed with lower drive voltage. The image display can be performed with fewer irregularities.

If an electric field having an excessively low electric field strength is applied to the developer (developing particles) in image display (image display step) on the reversible image display medium having the foregoing basic structure, a low electrostatic force is applied to the developing particles, so that the particles can not move with ease, resulting in low contrast and low density reproducibility. If an electric field having an excessively high electric field strength is applied, the particles charged to a polarity which should be moved in a predetermined direction according to the electric field are moved in the foregoing direction together with the charged particles having reversed polarity which should be moved in the opposite direction, resulting in reduced contrast, impaired density reproducibility and lowered density uniformity.

In image display (in image display step), if the strength of electric field applied to the developer (electric field for driving the developing particles) is in the range of 0.3 V/$\mu$m to 3.0 V/$\mu$m, the developing particles can smoothly and properly move and images can be displayed in good contrast, and with high image density (density reproducibility). The electric field strength of 0.3 V/$\mu$m to 3.0 V/$\mu$m is applied directly to the developer.

Of the two kinds of developing particles forming the dry developer in the reversible image display medium, at least one kind of the developing particles may be magnetic particles. Such magnetic developing particles are usually prepared by dispersing magnetic powder in the particles. In this case, the particles are lowered in electrical resistance due to the magnetic powder, and may be abnormally charged by injection of charge but can be prevented from being so charged by applying the electric field having the electric field strength of 3.0 V/$\mu$m or less to the developing particles for driving the developing particles.

When an image is displayed by the reversible image display medium having said structure, an oscillating force may be applied from outside to the developing particles in the medium as described above. The stirring force may be applied to the developing particles of the medium in driving the developing particles by an electrostatic field. Thereby the developing particles can be smoothly moved, and contrast can be more improved and a lower voltage drive can be allowed.

When the application of the oscillating force is substantially stopped during application of electrostatic field after image display, the image display can be smoothly performed and the displayed image is suppressed from being disturbed by external oscillating force so that the displayed image can be stably held.

If at least one kind out of two kinds of frictionally chargeable developing particles forming the dry developer and having different chargeable polarities and different optically reflection densities are magnetic particles, the application of oscillating force to the developing particles in image display step can be performed by applying an oscillating magnetic field. The substantial stop of application of oscillating force in the step of substantial stop of application of oscillating force can be done by substantial stop of application of oscillating magnetic field during the application of electrostatic field after image display. If the oscillating magnetic force is applied to the developing particles in the medium in image display, a magnetic stirring force can be applied to the developing particles of the medium in driving the developing particles by an electrostatic field. Thereby the developing particles can be smoothly moved in the electrostatic field, and contrast can be improved and a lower voltage drive is allowed.

In the case of substantial stop of application of oscillating magnetic field during the application of electrostatic field after image display, the term "stop of application of oscillating magnetic field" refers to both cases of a) stop (exclusion or removal) of application of oscillating magnetic field and static magnetic field and b) stop (exclusion or removal) of application of oscillating magnetic field while allowing remaining of static magnetic field. The term "substantial stop" of application of oscillating magnetic field includes the case of complete stop thereof (complete exclusion or removal) and the case where the application of oscillating magnetic field still remains but the displayed image can not be disturbed any more by the oscillating magnetic field.

The application of external oscillating force includes, for example, application of oscillating magnetic field, application of mechanical oscillating force, application of alternating electric field (e.g. AC electric field), emitting ultrasonic waves, etc.

In the case where the oscillating force is applied from outside in image display, substantial stop of application of oscillating force is conducted, whatever the application of oscillating force from outside may be, for example, in order to assure the retention of displayed image while the electrostatic field having a strength of at least 0.5 V/$\mu$m is applied from outside to the developer (developing particles) after image display.

After completion of application of electrostatic field, the surface of the reversible image display medium on the image observation side may be charged to a potential holding the displayed image. Thereby the displayed image can be more stably held.

The term "a potential holding the displayed image" used herein means a potential corresponding to one of the charged polarities of the frictionally charged developing particles having different polarities. Slight repulsive force is exerted on the developing particles of the same polarity as the charged potential among the developing particles locally existing toward the substrate on the image observation side, while the charged potential positively attracts the developing particles of reversed polarity toward the substrate on the image observation side in preference. Thus it is the potential for retaining the displayed image as a whole. If such potential for retaining the displayed image is too high, it results in disturbance of images. To avert this problem, a proper potential is, e.g., 100 V or less in terms of absolute value. A lower limit of the potential for retaining the displayed image is such that at least the displayed image can be retained. For example, it is about 10 V in terms of absolute value.

The magnetic developing particles are prepared usually using a magnetic powder, and in most cases, developing particles of deep color such as black are produced. When the magnetic developing particles include those locally existing at the substrate on the image observation side in image display, the locally existing magnetic developing particles can be easily seen through the substrate on the image observation side, even if they are slightly separated from the substrate due to the repulsive force. On the other hand, it is difficult to see the developing particles, if remote from the substrate, which are frictionally charged to a polarity opposite to that of magnetic developing particles, these charged developing particles being low in optically reflection density (such as white color) and existing locally toward the substrate on the image observation side in image display.

Therefore, if the magnetic developing particles are used, and when the surface of reversible image display medium is charged to carry a potential holding the displayed image after application of electrostatic field, the charged polarity of the charged potential may correspond to the charged polarity of the magnetic developing particles.

The surface of reversible image display medium may be charged to carry a potential holding the displayed image after application of electrostatic field, irrespectively of whether or not the developer present in the medium contains the magnetic developing particles. Thereby the displayed image can be more stably held.

In the reversible image display medium having the foregoing basic structure, the developer in the image display medium may be stirred before image display to initialize the medium, and an image can be displayed on the initialized image display medium as described above.

The image display medium may be initialized as stated above before image display, whereby the displayed image can be erased and remaining of last images can be suppressed so that a new image can be displayed in higher quality.

Preferred examples of the initializing processing include application of alternating electric field to the developer in the reversible image display medium. Accordingly preferred examples of the initializing device include initializing devices in which the developer is stirred by application of alternating electric field to the developer in the reversible image display medium.

The developer can be efficiently stirred by application of alternating electric field.

The wave shape of alternating electric field such as sine wave, rectangular wave and the like which are effective in stirring the developer can be employed.

When images are displayed by forming an electrostatic latent image on the surface of the reversible image display medium, a remaining electrostatic latent image can be erased by application of alternating electric field before image display, whereby remaining of images can be suppressed and images of higher quality can be formed.

In the case of application of alternating electric field to the developer for initialization or in the case of using a device for application of alternating electric field to the developer as an initializing device in the image forming apparatus, the strength of the alternating electric field to be applied to the developer or to the space in the cells accommodating the developer in the image display medium is, for instance, 0.5 V/$\mu$m or higher.

If the strength of electric field to be applied is less than 0.5 V/$\mu$m, the developer can not be sufficiently stirred.

The upper limit of the strength of electric field to be applied is, for example, preferably approximately less than 2.0 V/$\mu$m, although not limited thereto, to prevent the undesired charging.

A preferred frequency of alternating electric field to be applied is, for example, 5 kHz or less.

If the frequency of alternating electric field to be applied is greater than 5 kHz, the developing particles can not easily move, whereby they can not be sufficiently stirred. If the frequency of alternating electric field to be applied is excessively low, it takes a longer time to stir the developer sufficiently.

The alternating electric field is applied, for example, such that (the frequency of alternating electric field)×(the time for application of alternating electric field)=20 or more.

The equation of (the frequency of alternating electric field [Hz])×(the time (sec) for application of alternating electric field) represents the value corresponding to the number of vibrations of developer, in other words, the value showing the extent of stirring the developer. If this value is less than 20, the developer can not be sufficiently stirred. In the reversible image display medium having the foregoing basic structure, at least one kind out of two kinds of developing particles may be magnetic particles. When the reversible image display medium containing the magnetic particles is used, a stirring force may be applied to the developer by affecting a stirring force on the developer by a magnetic field from outside before and/or in image display step.

When a magnetic stirring force is applied to the developer before image display, the developer containing the magnetic developing particles is stirred before image display, whereby the remaining images are erased, and remaining of images can be suppressed. Further uneven distribution of developing particles in the medium is prevented, the uniformity of distribution is achieved, and the developing particles are charged in a proper state. Thereby image display of high quality can be done in image display step. When a magnetic stirring force is applied to the developer in image display step, the developing particles to be moved by application of an electric field are smoothly moved and high-quality images can be displayed more rapidly with lower voltage drive.

The image forming apparatus may be provided with at least one device for applying a magnetic stirring force to the developer by affecting a stirring force on the developer from outside by the magnetic field before and/or when an image is displayed on the reversible image display.

When the device for applying a magnetic stirring force affects a stirring force on the developer before image display, the developer containing the magnetic developing particles can be stirred by the device before image display, whereby the last images are erased, and remaining of the last images can be suppressed. Further uneven distribution of developing particles in the medium is prevented, the uniformity of distribution is achieved, and the developing particles are charged in a proper state. Thereby image display of high quality can be achieved.

When a magnetic stirring force is applied to the developer by the device in image display, the device affects a stirring force on the developing particles to be moved by application of electrostatic field, whereby they are smoothly moved and high-quality images can be displayed quickly with lower voltage drive.

When such devices for use before image display and for use in image display, respectively are provided, images of higher quality can be formed.

If the developer is stirred by a magnetic force, the developer can be efficiently stirred.

The method of applying a magnetic stirring force comprises, for example, placing a magnetic field-generating member as opposed to the reversible image display medium, and relatively moving the medium and the surface of the magnetic field-generating member to oscillate the magnetic field strength to be applied to the developer or in other words to generate an oscillating magnetic field for application of a stirring force.

In this case, the magnetic field-generating member may be opposed to at least one surface of the reversible image display medium.

At any rate, the following cases can be exemplified concerning at least one magnetic field-generating member.

(a) The surface of the magnetic field-generating member and the reversible image display medium are relatively moved in one predetermined direction, and the magnetic field-generating member to be used is one in which magnetic poles are arranged in said predetermined direction.

(b) The surface of the magnetic field-generating member and the reversible image display medium are relatively moved in one predetermined direction and a direction across the predetermined direction, and the magnetic field-generating member to be used is one in which magnetic poles are arranged in the direction across the predetermined direction.

(c) The surface of the magnetic field-generating member and the reversible image display medium are relatively moved in one predetermined direction, and the magnetic field-generating member to be used is one wherein magnetic poles are arranged in a direction at a specified angle to the predetermined direction.

(d) The surface of the magnetic field-generating member and the reversible image display medium are relatively moved in one predetermined direction, and the magnetic field-generating member to be used is one wherein at least two rows of magnetic poles are arranged in a direction across said predetermined direction, and wherein in adjacent rows of magnetic poles, the positions of N and S magnetic poles are displaced from each other.

In any case, the magnetic field-generating member may be opposed to each side of image display medium. In this case, magnetic field-generating members opposed to both sides of the medium-having different arrangements of magnetic poles may be used.

In any case, the shape of the magnetic field-generating members can be any of a rotatable roller shape, a plate shape, and the like.

The device for applying a magnetic stirring force is, for example, one which includes the magnetic field-generating member as opposed to the reversible image display medium, and which is capable of oscillating the magnetic field strength to be applied to the developer by relative movement of the reversible image display medium and the surface of the magnetic field-generating member (in other words, capable of generating an oscillating magnetic field).

In this case, the device for applying a magnetic stirring force may be provided with the magnetic field-generating member opposed to at least one surface of the reversible image display medium. At any rate, the following cases may be exemplified concerning at least one magnetic field-generating member in at least one device for applying a magnetic stirring force.

(a) The surface of the magnetic field-generating member and the reversible image display medium are relatively moved in one predetermined direction, and the magnetic field-generating member has magnetic poles arranged in said predetermined direction.

(b) The surface of the magnetic field-generating member and the reversible image display medium are relatively moved in one predetermined direction and a direction across the predetermined direction, and the magnetic field-generating member has magnetic poles arranged in the direction across the predetermined direction.

(c) The surface of the magnetic field-generating member and the reversible image display medium are relatively moved in one predetermined direction, and the magnetic field-generating member has magnetic poles arranged in a direction at a specified angle to the predetermined direction.

(d) The surface of the magnetic field-generating member and the reversible image display medium are relatively moved in one predetermined direction, and the magnetic field-generating member has at least two rows of magnetic poles arranged in a direction across said predetermined direction, wherein in adjacent rows of magnetic poles, the positions of N and S magnetic poles are displaced from each other.

In any case, at least one device for applying a magnetic stirring force may have magnetic field-generating members opposed to both sides of the image display medium. In this case, the opposed magnetic field-generating members having different arrangements of magnetic poles may be used.

In the image forming apparatus, the shape of the magnetic field-generating members can be any of a rotatable roller shape, a plate shape, and the like.

Specific examples of the reversible image display medium, image display method and image forming apparatus will now be described below with reference to the drawings.

<Reversible Image Display Medium>

Reversible Image Display Medium 11

Figure 2:
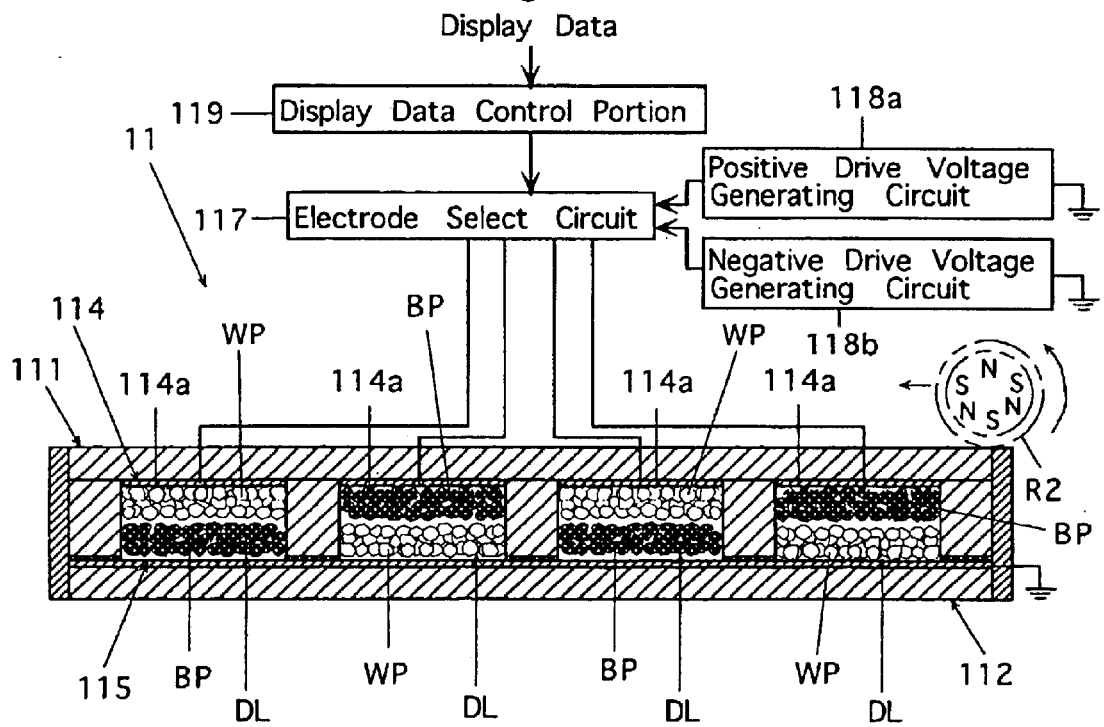
FIG. 2 is a sectional view of the medium shown in FIG. 1 on which images are displayed.

FIGS. 1 and 2 show an example of the reversible image display medium. A medium 11 shown in FIGS. 1 and 2 includes first and second substrates 111 and 112. These substrates 111 and 112 are opposed to each other with a predetermined gap therebetween. A partition member 113 is arranged between the substrates 111 and 112 for keeping a predetermined gap between the substrates. The partition member 113 serves also as a spacer between the substrates 111 and 112. The partition member 113 couples and fixes the substrates 111 and 112 together.

The first substrate 111 is formed of a light-transparent plate such as a glass plate, a transparent resin film or the like. The substrate 111 is located on the image observation side.

Figure 3:
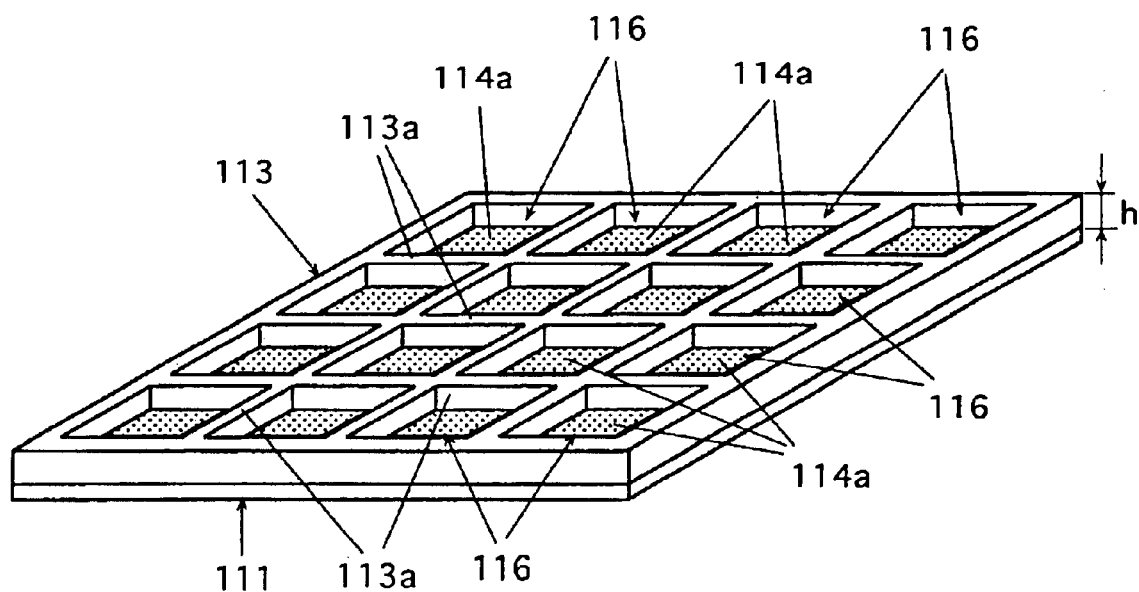
FIG. 3 is a perspective view showing a first substrate and a grid-like partition member formed thereon in the medium shown in FIG. 1.

The partition member 113 is also a group of partition walls forming developer accommodating cells (see FIG. 3). The partition member 113 is arranged on the inner surface of the first substrate 111 and has a grid-like form as shown in FIG. 3. Thereby, the partition member 113 defines a plurality of developer accommodating cells 116, each of which has a square form and is surrounded by a portion of the partition member 113. The partition wall has a width (thickness) α and a height h, and is spaced by a distance of pt from the neighboring wall.

A first electrode 114 is a transparent electrode, and formed on the inner surface of the first substrate 111 opposed to the second substrate 112. The first electrode 114 includes a plurality of independent electrodes 114a arranged in a grid-like form. Each of the independent electrodes 114a is transparent and made of, e.g., indium tin oxide (ITO). The independent electrodes 114a are arranged in cells 116, respectively, with a distance between the neighboring independent electrodes, which is substantially identical with the partition wall thickness α. Thus one cell corresponds to one pixel.

The second substrate 112 is not essentially required to be transparent, but is formed of a light-transparent plate such as a glass plate, a resin film or the like in this embodiment.

The second substrate 112 is provided at its inner surface opposed to the first substrate 111 with a second electrode 115. The second electrode 115 in this example extends continuously throughout an image display region of the inner surface of the substrate. The second electrode 115 is not essentially required to be transparent, but may be formed of, e.g., transparent ITO.

Each cell accommodates the dry developer DL including the white and black developing particles WP and BP, which are mutually and frictionally charged.

Each cell is sealed so that the developer DL does not leak from the cell.

Figure 4:
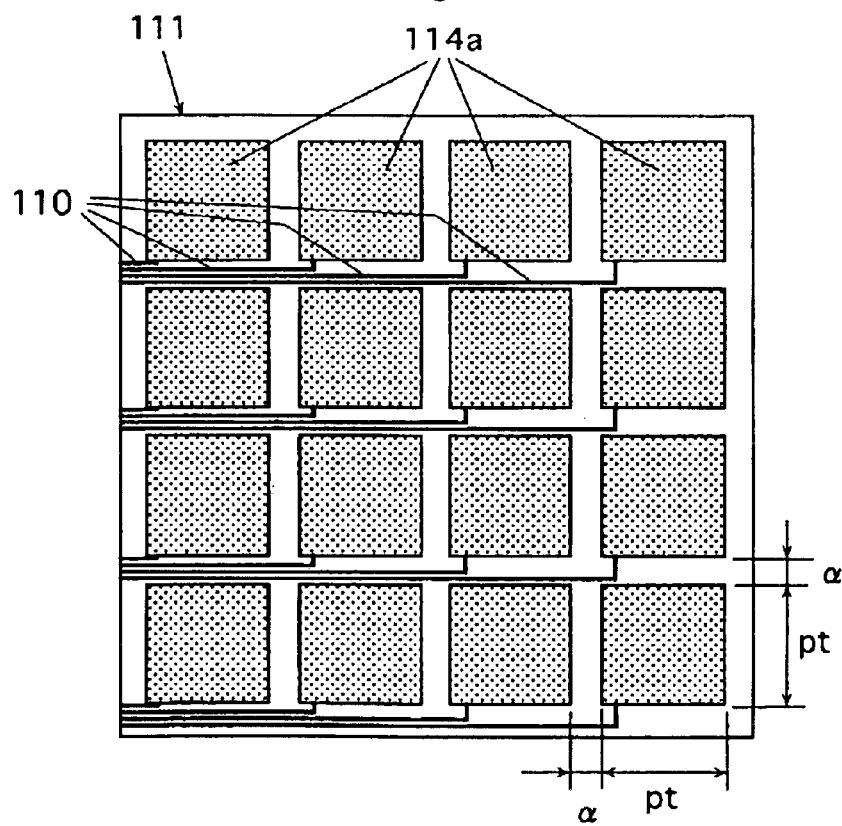
FIG. 4 is a plan view showing the first substrate and independent electrodes formed thereon in the medium shown in FIG. 1.

The independent electrode 114a forming the second electrode 114 in the image display medium 11 is connected to or provided with a lead portion 110 as shown in FIG. 4, and is connected to an electrode select circuit 117 through the lead portion as shown in FIG. 1. The electrode select circuit 117 is connected to a positive drive voltage generating circuit 118a, a negative drive voltage generating circuit 118b and a display data control portion 119. Each independent electrode 114a is independently supplied with a drive voltage from the electrode select circuit 117. The display data control portion 119 receives display data from display data output means (not shown) such as a computer, a word processor, a facsimile machine or the like, and controls the electrode select circuit 117 based on the supplied data. In other words, these electrode select circuit and others form an example of the electric field forming device or the image forming apparatus for the reversible image display medium provided with the electrodes.

Figure 5:
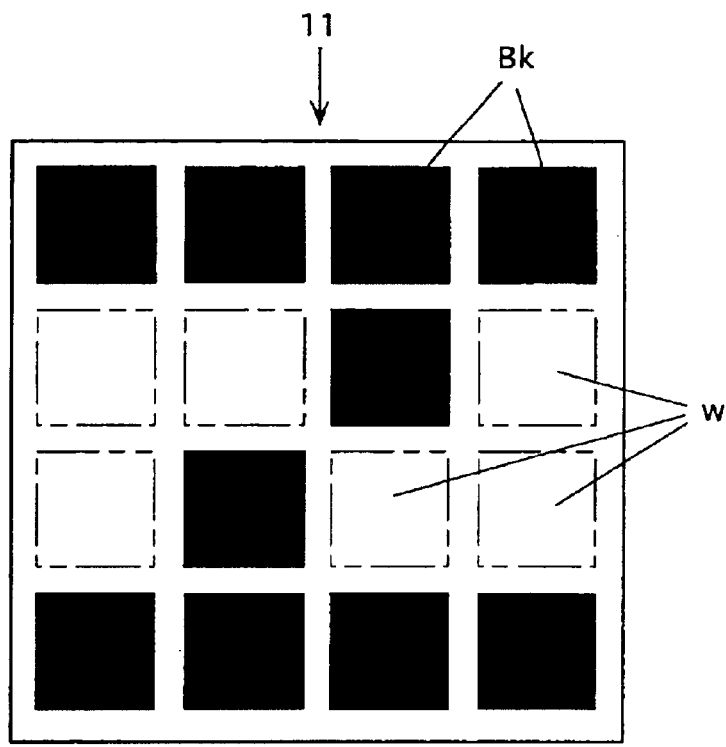
FIG. 5 is a view showing an example of the image display on the medium shown in FIG. 1.

For example, the second electrode 115 in the image display medium 11 is grounded, or a bias voltage is applied from a bias source (not shown) to the electrode 115, if necessary, and the positive or negative drive voltage generating circuit 118a or 118b applies the predetermined voltage across the electrode 115 and each independent electrode 114a via the electrode select circuit 117, which is controlled to perform the desired image display by the display data control portion 119. Thereby, the predetermined electric field is formed for each pixel so that the developing particles WP and BP, which are mixed in the developer DL as shown in FIG. 1, move in accordance with the respective electric fields as shown in FIG. 2. In this manner, the image can be displayed in predetermined contrast. For example, image display can be performed as shown in FIG. 5. In FIG. 5, Bk indicates a portion displayed in black, W indicates a portion displayed in white.

A roller R2 shown with a chain line in FIG. 2 will be described later.

Reversible Image Display Mediums 12, 12'

Figure 6A:
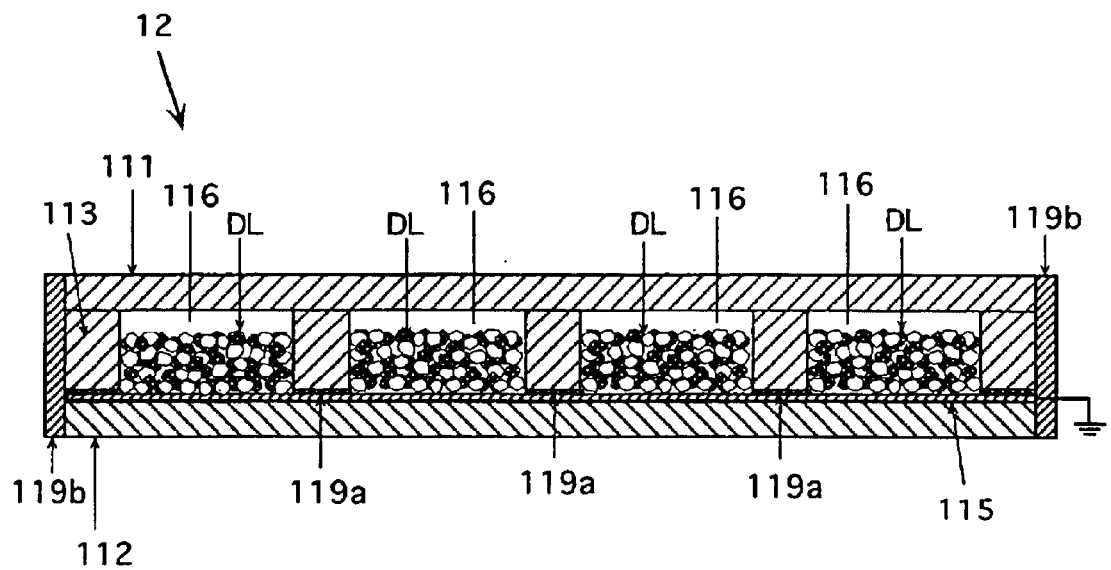
FIG. 6(A) is a sectional view showing another example of the reversible image display medium.
Figure 6B:
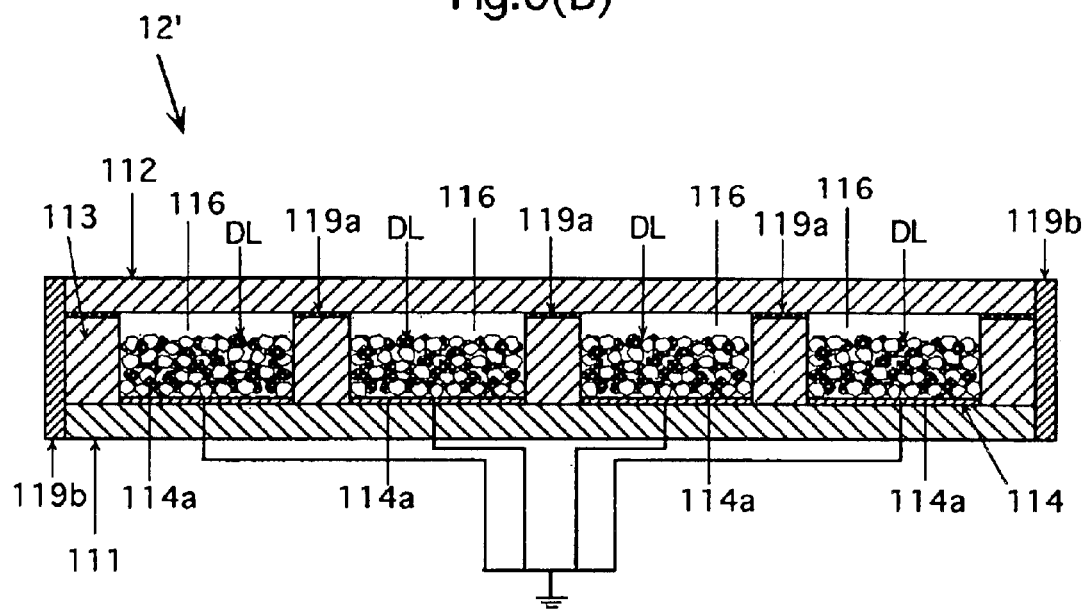
FIG. 6(B) is a sectional view showing a further example of the reversible image display medium.

FIG. 6(A) and FIG. 6(B) show other examples of the reversible image display medium.

The reversible image display medium 12 shown in FIG. 6(A) is identical with the medium 11 of FIG. 1 if the medium 11 is such that at least the first substrate 111 is formed of a material having a light transmitting property and an insulating property and that the independent electrodes 114a are not provided.

The medium 12 is identical in other respects with the medium 11 of FIG. 1. In FIG. 6(A), the same components and parts as in the medium 11 are indicated with the same reference symbols.

The reversible image display medium 12' shown in FIG. 6(B) is identical with the medium 11 of FIG. 1 if the medium 11 is such that at least the second substrate 112 is formed of a material having a light transmitting property and an insulating property and that the electrode 115 is not provided. The medium 12' has the substrate 112 on the image observation side.

The medium 12' is identical in other respects with the medium 11 of FIG. 1. In FIG. 6(B), the same components and parts as the medium 11 are indicated with the same reference symbols.

In the medium 12 (or the medium 12'), for example, the electrode 115 of the second substrate 112 (electrodes 114a in the medium 12') is (are) grounded. In addition, for example, over the external surface of the first substrate 111 (second substrate 112 in the medium 12'), a) an electrode or electrodes are provided to selectively apply a voltage corresponding to the image to be formed between the electrode(s) and the ground electrode(s), b) an electrostatic latent image corresponding to the image to be formed is directly formed, or c) an image carrier carrying the electrostatic latent image corresponding to the image to be formed is contacted (or made to come close), whereby the electric field for driving the developing particles is applied to the developer DL, whereby an image can be displayed.

The electrode 115 of the medium 12 and the electrodes 114a of the medium 12' may be electrode(s) having an intermediate resistance value.

Reversible Image Display Medium 13

Figure 7A:
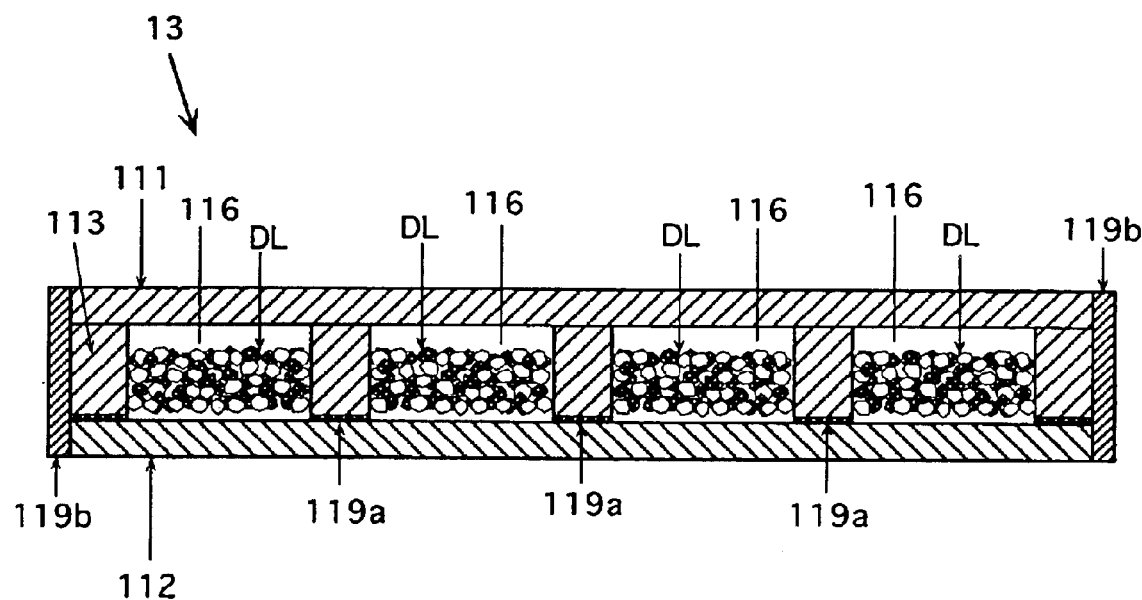
FIG. 7(A) and FIG. 7(B) show other example of the reversible image display medium.

FIG. 7(A) shows another example of the reversible image display medium.

The reversible image display medium 13 shown in FIG. 7(A) is identical with the medium 11 of FIG. 1 if the medium 11 is such that at least the first substrate 111 is formed of a material having a light transmitting property and an insulating property and that the first substrate electrode 114 and the second substrate electrode 115 are not provided.

The medium 13 is identical in other respects with the medium 11 of FIG. 1. In FIG. 7(A), the same components and parts as in the medium 11 are indicated with the same reference symbols.

Reversible Image Display Medium 14

Figure 8A:
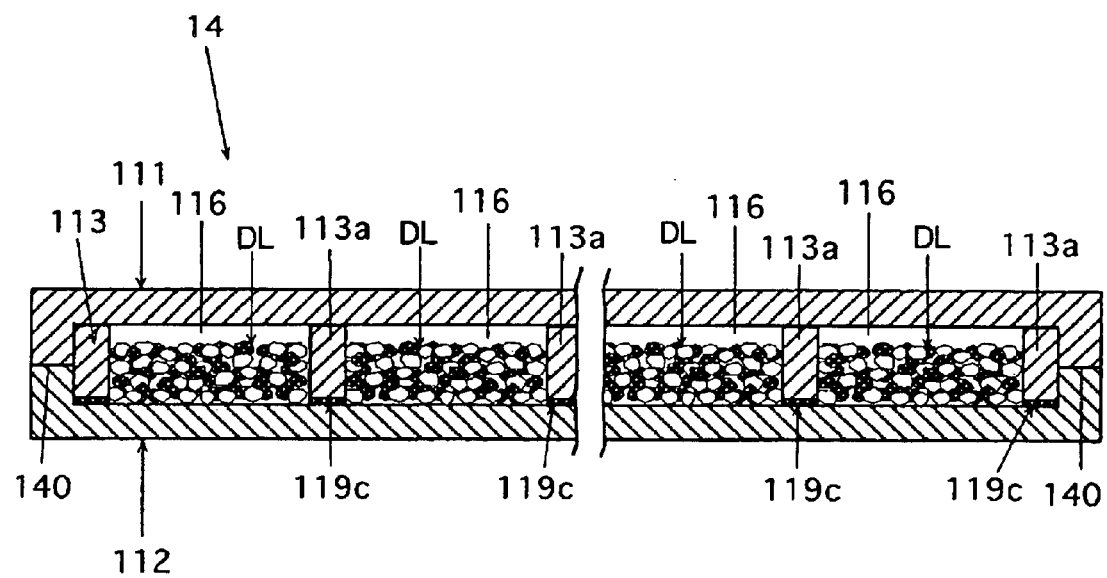
FIG. 8(A) and FIG. 8(B) show further example of the reversible image display medium.

FIG. 8(A) shows a further example of the reversible image display medium.

The reversible image display medium 14 shown in FIG. 8(A) is identical with the medium 11 of FIG. 1 if the medium 11 is such that at least the first substrate 111 is formed of a material having a light transmitting property and an insulating property, that the first substrate electrode 114 and the second substrate electrode 115 are not provided, and that a partition member 113 is provided which consists of a plurality of partition walls 113a extending in parallel with the lengthwise side of the medium 14 instead of the grid-like partition member (see FIG. 9) The developer-accommodating cell 116 is provided between the neighboring partition walls 113a. Each cell 116 accommodates the developer DL containing mutually frictionally charged white developing particles WP and black developing particles BP.

In the periphery of the medium 14, the two substrates 111, 112 are heat-sealed to form a sealing portion 140. The part 140a of the sealing portion 140 is provided at the both ends of the longitudinal partition walls 113a extending in the lengthwise direction, and serves also as the partition wall forming the cell 116.

Figure 9:
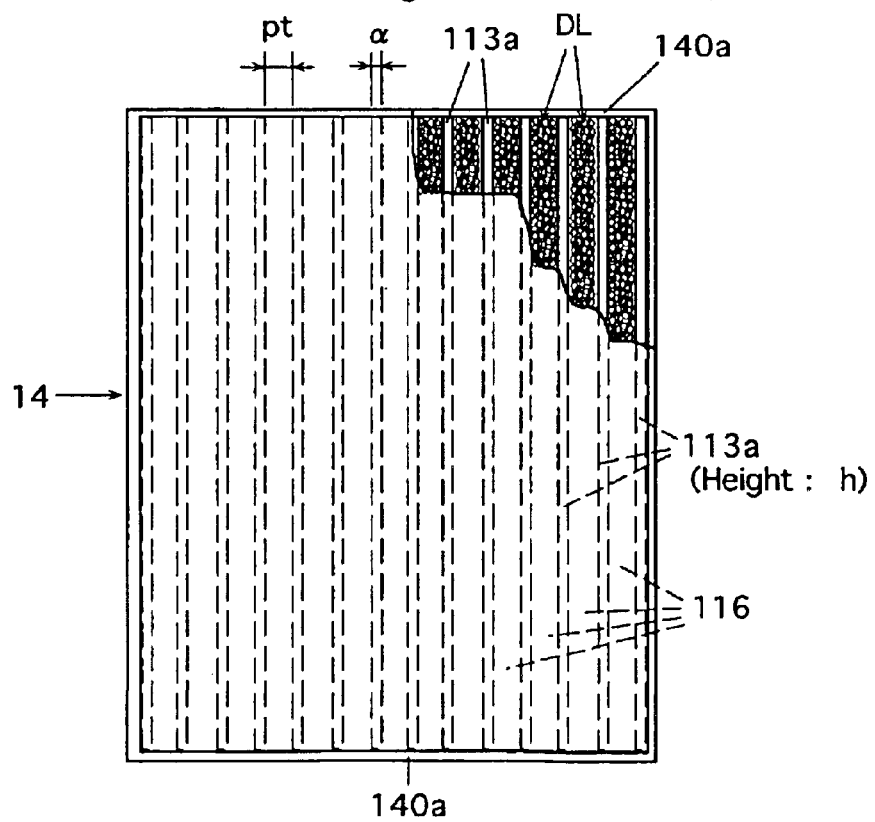
FIG. 9 is a plan view showing the medium shown in FIG. 8(A) and FIG. 8(B) as partly cut away.

As shown in FIG. 9, the partition walls 113a are formed with a width α, a height h and a space pt between the adjacent partition walls 113a.

In the mediums 13, 14, for example, a) an electrostatic latent image corresponding to the image to be formed is directly formed on the first substrate 111, or b) an image carrier carrying the electrostatic latent image corresponding to the image to be formed is contacted with (or made close to) the first substrate 111. Thereby an image can be displayed by applying to the developer DL an electric field for driving the developing particles. The second substrate 112 may be set to a ground potential, if necessary.

Reversible Image Display Mediums 15, 15'

Figure 10A:
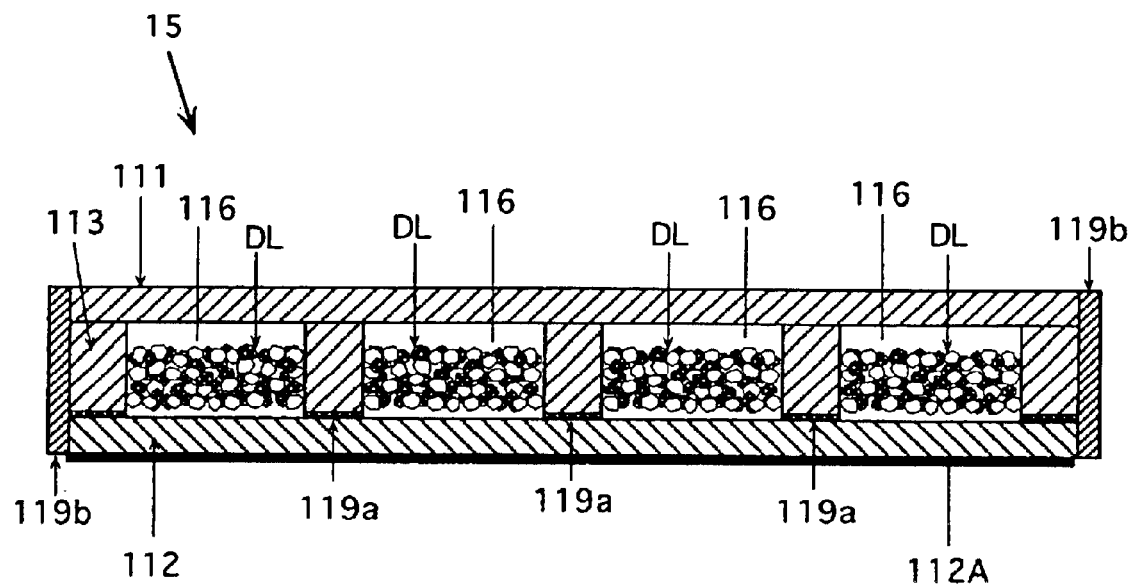
FIG. 10(A) is a sectional view showing another example of the reversible image display medium.
Figure 10B:
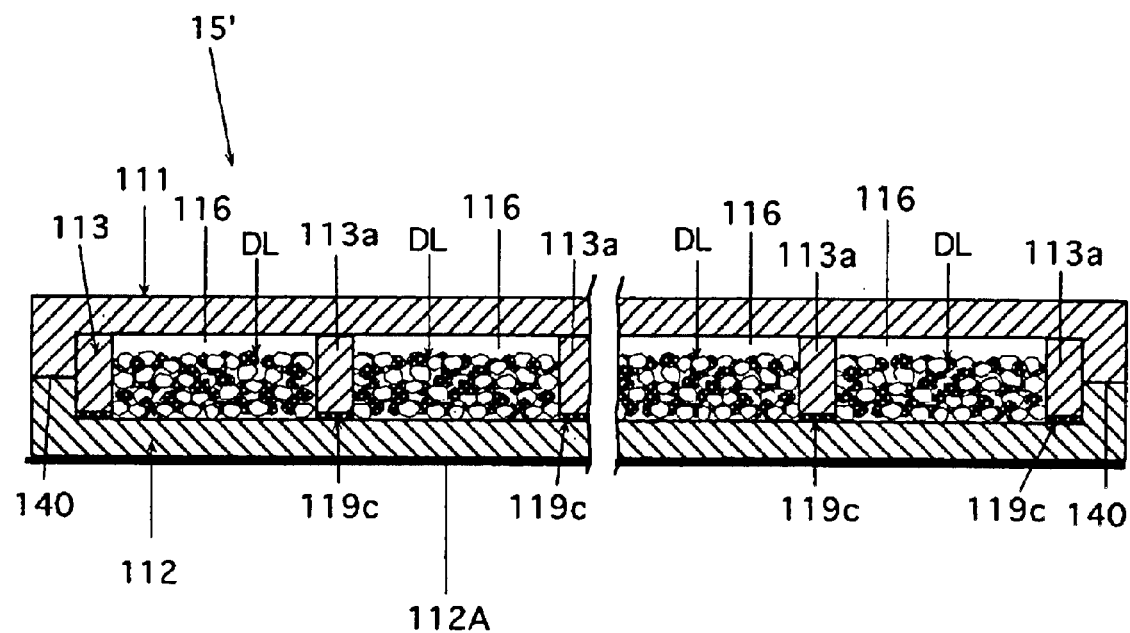
FIG. 10(B) is a sectional view showing a further example of the reversible image display medium.

FIG. 10(A) and FIG. 10(B) show further examples of the reversible image display medium.

The reversible image display medium 15 (15') shown in FIG. 10 (A) (FIG. 10(B)) is identical with the medium 13 (14) except that an electrically conductive film 112A is formed on an outer surface of the second substrate 112 in the medium 13 (14).

The medium 15 (15') is identical in other respects with the medium 13 (14). In FIG. 10(A) and FIG. 10(B), the same components and parts as in the medium 13 (14) are indicated with the same reference symbols.

In image display by the mediums 15, 15', for example, the electrically conductive film 112A is set to a ground potential or like proper potential, and a) an electrostatic latent image corresponding to the image to be formed is directly formed on the first substrate 111, or b) an image carrier carrying the electrostatic latent image corresponding to the image to be formed is contacted with (or made close to) the first substrate 111, whereby an image can be displayed by application of electric field for driving the developing particles to the developer DL.

Optionally the second substrate 112 may be made electrically conductive by dispersing an electrically conductive material, instead of provision of the electrically conductive film 112A and may be set to a ground potential or like proper potential.

Each of the image display mediums already described with reference to the drawings and the image display method utilizing the mediums can repeat the image display and image erasure.

The developing particles WP and BP are contained in the cell, and it is not necessary to supply externally the developer into the cell. Thereby, it is possible to suppress significantly the use of medium such as paper sheets and consumable materials such as developer, which are required for image display in the prior art. Since a heat energy for melting and fixing the toner onto the medium is not required in contrast to the conventional image display, the image forming energy can be reduced. Accordingly, it is possible to satisfy the present demand for reduction in environmental loads.

Since each of the mediums 11 to 15' employs the dry developer DL including developing particles WP and BP of different colors, one kind of the developing particles WP (or BP) can hide the other kind of developing particles BP (or WP) to a higher extent so that the image display in higher contrast can be achieved.

The developing particles WP and BP accommodated in the cell are charged to the different polarities, respectively, and therefore can be easily moved for image display by the Coulomb force applied thereto. This also improves the contrast for image display, and can suppress remaining of the last image. Further, the image display can be quickly performed, and the drive voltage for image display can be lowered.

Further, employment of the dry developer DL can suppress settling and condensation of the developing particles so that lowering in contrast for the image display can be suppressed, and the image display can be stably performed for a long time. Since the settling and condensation of the developing particles are suppressed, remaining of the last displayed image can be suppressed. Since the change in quality with time is suppressed in the dry developer DL, this also allows stable image display for a long time.

Any one of the mediums 11 to 15' can display images in high resolution as compared with the conventional electrophoretic display.

The mediums except for the medium 11 can display images in higher resolution as compared with the medium 11 in which the resolution is affected by the size of the pixel electrodes 114a.

In any one of the mediums 11 to 15', the strength of electric field (for driving the developing particles) to be applied to the developer DL may be adjusted to 0.3 V/$\mu$m to 3.0 V/$\mu$m at which the developing particles can smoothly and properly move. Thereby images can be displayed in good contrast at a satisfactory image density (density reproducibility).

In the case of forming images using any of the mediums 11 to 15', the following advantage is given. If the black developing particles BP are magnetic particles, the oscillating force (magnetic stirring force) can be affected on the developing particles in the medium by application of oscillating magnetic field to the developer DL in the medium in image display, whereby the developing particles are smoothly moved in the elctrostatic field so that the contrast is improved and lower voltage drive is allowed.

After image display, the application of oscillating magnetic field can be substantially stopped during application of such electrostatic field, whereby the image display is smoothly performed, the displayed images are suppressed from being disturbed in the same oscillating magnetic field and thus the displayed images are more stably held.

The substantial stop of application of oscillating magnetic field can be performed to assure the retention of displayed images while an electrostatic field having a strength of at least 0.5 V/$\mu$m is still applied from outside to the developer (developing particles) after image display.

After application of electrostatic field, the surface of image display medium on the image observation side can be charged to the potential holding the displayed image, and thereby the displayed image can be more stably held.

The potential holding the displayed image is, e.g. in the range of 10 V to 100 V in terms of absolute value.

After application of electrostatic field, when the surface of image display medium is charged to the potential holding the displayed image, it is preferable that the charged polarity of charged potential is adjusted to correspond to the charged polarity of magnetic developing particles BP.

If black non-magnetic developing particles are used as the black developing particles BP as described above, the developer can not be magnetically stirred in image display, but an oscillating force can be applied to the developer by application of alternating electric field or otherwise. In this case, after application of electrostatic field, the surface of image display medium on the image observation side can be charged to the potential holding the displayed image, and thereby the displayed image can be more stably held. The potential holding the displayed image is, e.g. in the range of 10 V to 100 V in terms of absolute value.

In image display, a magnetic roller R2 having magnetic poles may be provided and rotated to apply the oscillating magnetic field, whereby the developer DL in the cells 116 can be stirred and the developing particles BP, WP can be easily moved and a low drive voltage is allowed.

When images are displayed using any one of the mediums 11 to 15', the developer DL of the image display medium can be stirred before image display on the medium to initialize the medium, whereby images can be displayed on the initialized medium.

The image display medium can be initialized as stated above before image display, whereby the displayed images can be erased and remaining of images can be suppressed so that new images can be displayed with higher quality.

The developer can be stirred by such initializing processing, resulting in increased charge quantity of developing particles and in stabilization, and thus in high quality image display.

It is preferred to apply alternating electric field to the developer DL of the reversible image display medium in the initializing processing. The developer DL can be efficiently stirred by applying the alternating electric field to the developer DL.

In the case of displaying images by forming an electrostatic latent image on the surface of reversible image display medium, the remaining electrostatic latent image on the surface of the medium can be erased by applying alternating electric field prior to formation of image, whereby remaining of last images can be suppressed and images of higher quality can be formed.

When an alternating electric field is applied to the developer for initialization, the strength of alternating electric field to be applied to the developer, more specifically to the space in the cells 116 accommodating the developer in the image display medium is, for instance, is 0.5 V/$\mu$m or higher.

An upper limit of strength of the electric field to be applied is preferably about 2.0 V/$\mu$m or lower although not limited thereto.

The frequency of the alternating electric field to be applied is preferably 5 kHz or less.

The alternating electric field may be applied to meet the following condition: (the frequency [Hz] of alternating electric field)×(the time [sec] for application of alternating electric field)=20 or more.

When images are displayed using any one of the mediums 11 to 15', a magnetic field may be affected on the developer DL from outside before image display on the image display medium (before image display step) and/or in image display (in image display step) to apply a stirring force to the developer. For example, it is possible to use the device IN1 for applying a magnetic stirring force for the medium 11 as shown by way of example in FIG. 19.

More specifically, the magnet plate MG1 with alternately arranged S and N magnetic poles laid under the second substrate 112 of the medium 11 is reciprocatingly moved in parallel with the medium 11 by a drive device DR1. Thereby an oscillating magnetic field is applied to the developer DL in the medium so that the developer DL containing the magnetic developing particles BP is stirred. This can erase the remaining of the last images if any, can suppress the occurrence of remaining images, can prevent uneven distribution of developing particles in the medium, can achieve uniformity of distribution of the particles and can bring about the desired charged state of developing particles. These factors result in image display in good quality.

The voltage for image display is applied across the electrodes 114a and 115 opposed to each other, and the magnet plate MG1 is reciprocatingly moved, whereby the oscillating magnetic field is applied to the developer DL in the medium. The magnetic stirring force is applied to the developer DL containing the magnetic developing particles BP, thereby facilitating the movement of developing particles and achieving more rapid image display in high quality by lower voltage drive.

When images are displayed by application of a voltage between the electrodes 114a and 115 opposed to each other as in the medium 11, it is unnecessary to consider the occurrence of frictionally charging between the magnet plate MG1 and medium substrate. Accordingly the magnet plate may contact the medium substrate.

In respect of any one of the mediums 12 to 15', the same advantage is afforded by applying a magnetic stirring force to the developer DL before and/or in image display using a proper device for applying a magnetic stirring force.

The term "magnet plate" used herein includes various kinds of plates having properties such as rigidity or elasticity, and shapes such as thin sheets.

Now, description is given below on examples of image display operation using mediums 12, 12', 13, 14, 15 and 15', as well as on image forming apparatuses.

Figure 11:
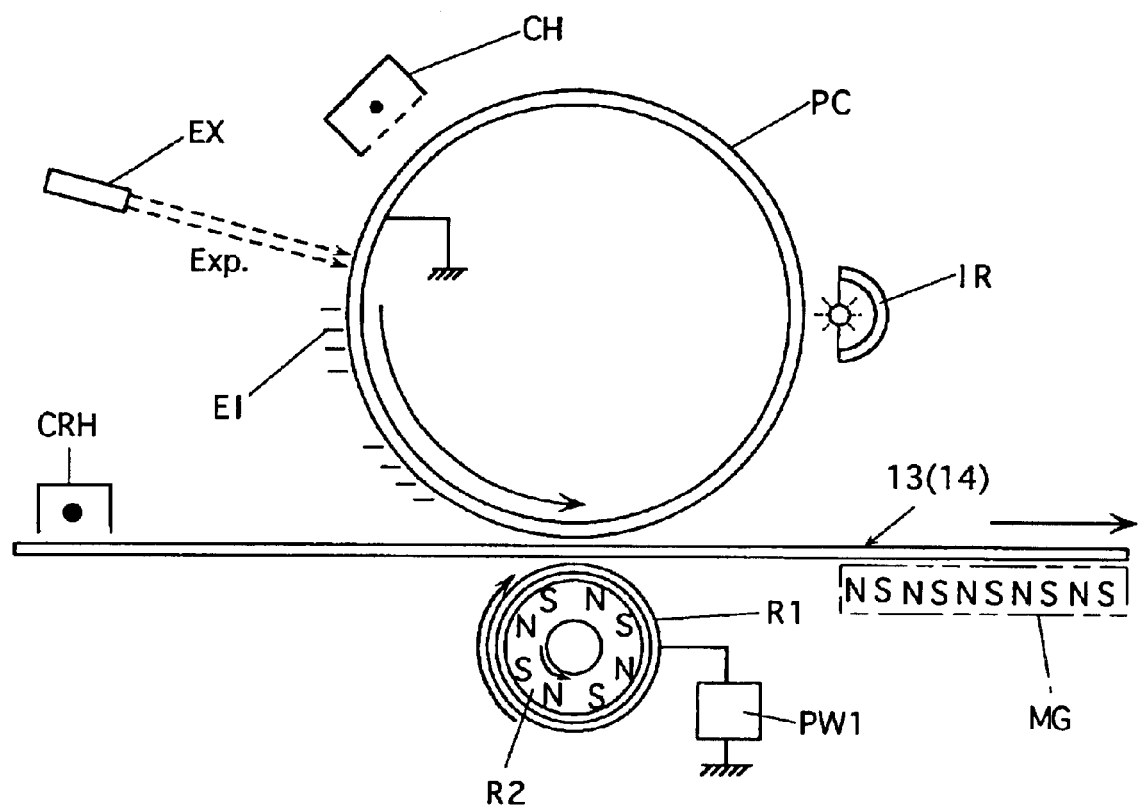
FIG. 11 is a view schematically showing an example of an image forming apparatus having an external electrostatic latent image forming device.

The image forming apparatus shown in FIG. 11 includes a photosensitive drum PC which is driven to rotate in the direction of an arrow in the drawing. Provided around the photosensitive drum PC are a scorotron charger CH, a laser image exposing device EX, and an eraser lamp IR. The electrode roller R1 which is driven to rotate is provided under the drum PC. The electrode roller R1 is a developing electrode roller for forming an electrostatic field for image display. The electrode roller R1 can be supplied with a bias voltage from the power source PW1 and may be internally provided with a rotary magnetic pole roller R2 which is driven to rotate in a direction opposite to that of the roller R1 (or which is driven to rotate reciprocatingly).

After the surface of the drum PC is charged by the charger CH, image exposure is performed on the charged region by the laser image exposing device EX to form an electrostatic latent image E1 on the drum PC. On the other hand, the electrode roller R1 is supplied with a bias voltage from the power source PW1. Optionally the electrode roller R1 may be set to a ground potential.

Then, e.g. the medium 13 or 14 is sent between the drum PC and the electrode roller R1 in synchronization with the electrostatic latent image E1 on the drum PC. In this operation, the surface of the medium 13 (14) is uniformly charged by the charger CRH such as a corona charger to carry a predetermined potential.

Figure 7B:
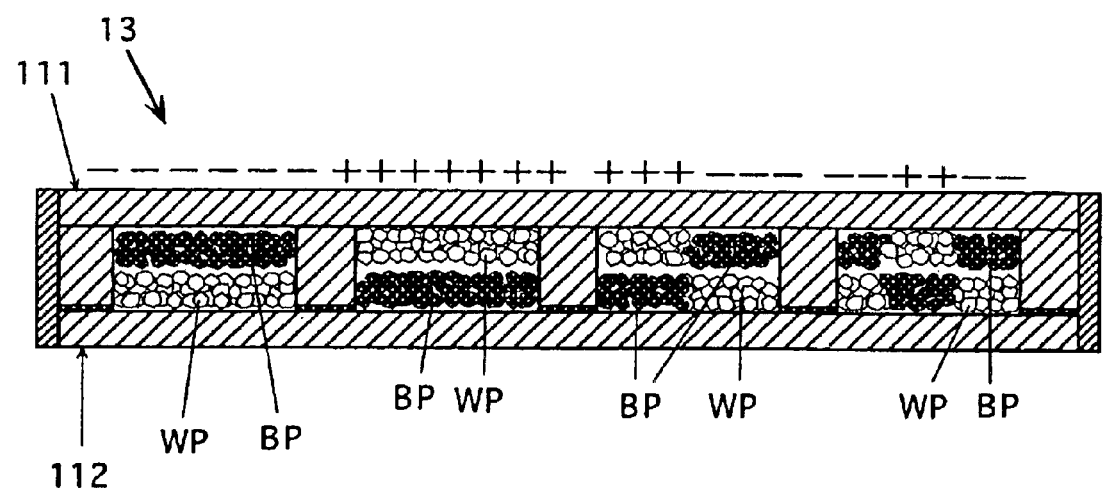
Figure 8B:
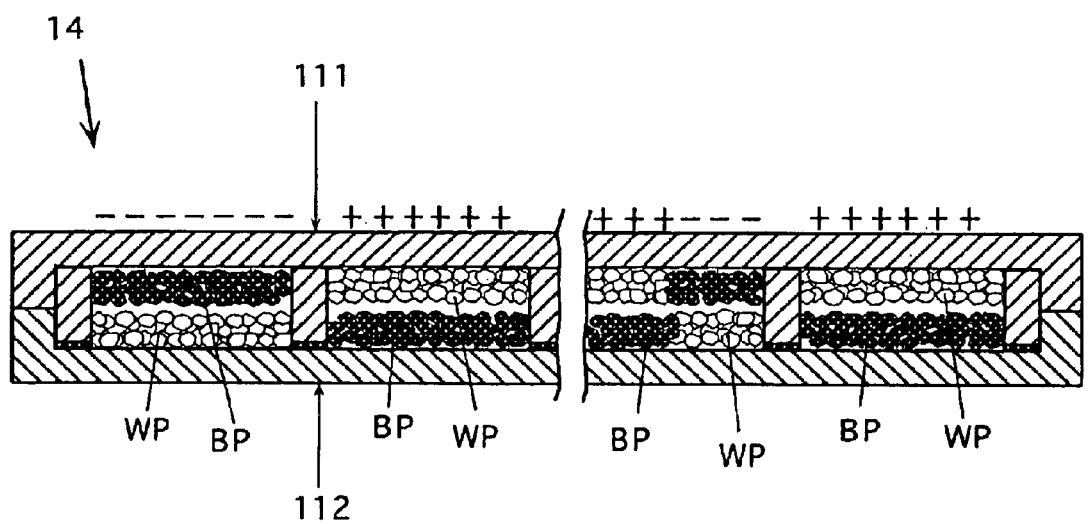

In this way, an electrostatic field is formed based on the electrostatic latent image E1 and applied to the developing particles BP, WP of the developer DL accommodated in the cells 116 of the medium 13 (14), whereby the developing particles are moved by the Coulomb force exerted between the electrostatic field and the charged developing particles. Subsequently the is white and black particles WP, BP mingled as shown in FIG. 7(A) or FIG. 8(A) are moved according to the electric field as shown in FIG. 7(B) or FIG. 8(B), whereby images can be displayed in the predetermined contrast.

After image display as described above, the charges on the surface of the photosensitive drum PC are erased by the eraser lamp IR to make ready for the next printing.

It is not essential that the surface of the medium 13 (14) be charged by the charger CRH.

When the developer DL contains magnetic developing particles in image display, e.g. black developing particles BP are magnetic, the magnetic pole roller R2 is provided and rotated whereby the developer DL in the cells 116 is stirred and the developing particles BP, WP become easily movable to accomplish display of better images with lower drive voltage.

If the developer DL contains magnetic developing particles in the medium 11 shown in FIGS. 1 and 2, the rotary magnetic pole roller R2 is usable as indicated with a chain line in FIG. 2.

The magnet plate MG1 with alternately arranged S and N magnetic poles may be laid under the second substrate 112 of the medium 11 instead of the rotary magnetic pole roller R2 and may be oscillated in parallel with the medium 11 by the drive device DR1 to form an oscillating magnetic field.

Optionally, a magnet plate MG with alternately arranged S and N magnetic poles may be provided downstream in a medium feed path as shown with a chain line in FIG. 11 instead of the rotary magnetic pole roller R2.

By application of oscillating magnetic field after application of electrostatic field based on the electrostatic latent image E1, the formed images would be likely to become disturbed. In such case, it is desirable to substantially stop the oscillating magnetic field during the application of the electrostatic field.

This matter will be described with reference to FIG. 19. In image display, the oscillating magnetic field is formed by oscillation of the magnet plate MG1, and after image display, the oscillation of the magnet plate MG1 is stopped after which the application of voltage across the opposite electrodes 114a and 115 can be stopped.

Figure 16:
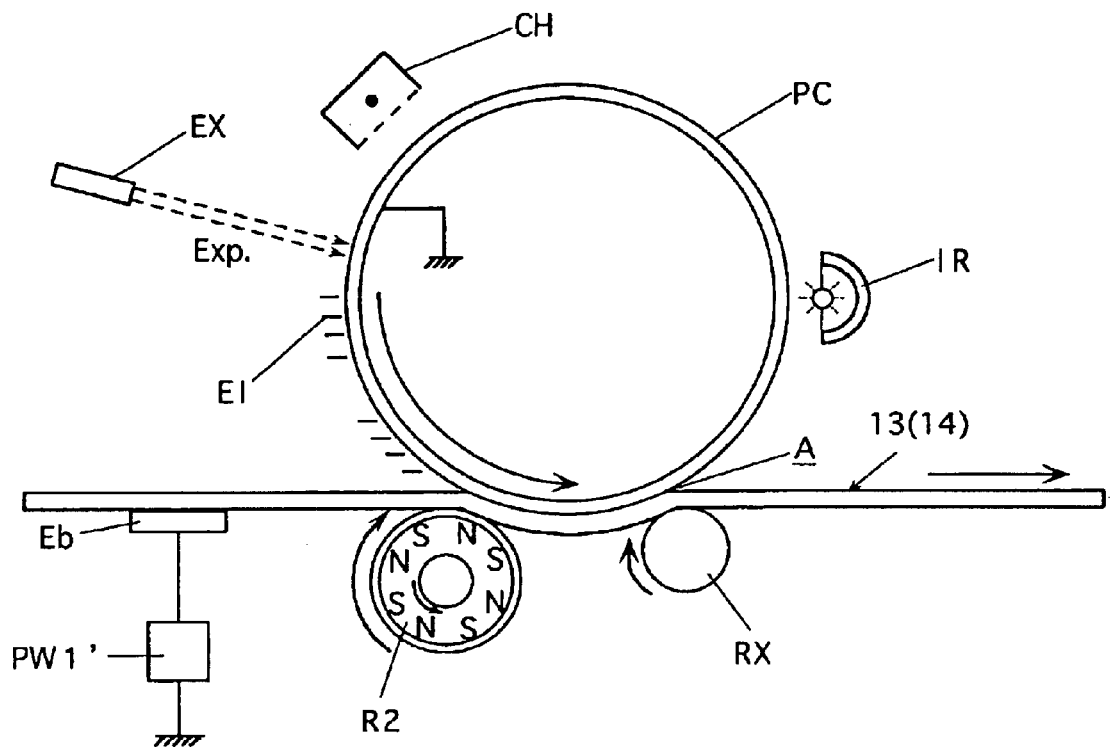
FIG. 16 is a schematic view showing the structure of a modification of the image forming apparatus illustrated in FIG. 11.

Images can be formed, for example, using the image forming apparatus shown in FIG. 16. The image forming apparatus shown in FIG. 16 is a modification of the image forming apparatus shown in FIG. 11. In the image forming apparatus shown in FIG. 16, the rotary magnetic pole roller R2 and a medium-supporting roller RX provided downstream thereof are arranged as opposed to the photosensitive drum PC in the medium feed path. For example, the medium 13 (14) is passed between the drum PC and the roller R2 and between the drum PC and the roller RX in synchronization with the electrostatic latent images E1 formed on the drum PC. During the passage, the medium 13 (14) is contacted with the electrostatic latent image E1 formed on the drum PC between the roller R2 and the roller RX, and the substrate 112 of the medium 13 (14) is supplied with a proper bias voltage for forming images from the power source PW1' via the electrode Eb.

According to this image displaying method (image forming method), the medium 13 (14) displays images as it is passed between the drum PC and the roller R2 which provides an oscillating magnetic field. In this case, the electrostatic field is continuously applied based on the electrostatic latent image E1 until the medium 13 (14) is separated from the drum PC at a portion of the roller RX. The application of oscillating magnetic field is substantially stopped (eliminated) at a portion of the roller RX, while the application of electrostatic field is still applied. In this way, the formed images are prevented from disturbance in the oscillating magnetic field of the roller R2.

The substantial stop of application of oscillating magnetic field is done, for example, while the electrostatic field contributing to the image display is applied to the developer at a strength of at least 0.5 V/$\mu$m although not limited thereto.

In FIG. 16, the same components and parts as in the image forming apparatus of FIG. 11 are indicated with the same reference symbols as in FIG. 11.

When the application of electrostatic field is stopped after image display in forming images with any of mediums 11 to 15' (e.g. when application of voltage across the opposite electrodes 114a and 115 is stopped after image display in forming images with the medium 11 shown in FIGS. 1 and 2), the surface of the reversible image display medium on the image observation side (surface of the substrate on the image observation side) may be charged to a potential holding the displayed images to stably retain the displayed images. In this operation, the medium may be charged to carry a potential of 10 V to 100 V such that the charged polarity corresponds to the charged polarity of the magnetic developing particles BP.

Figure 17:
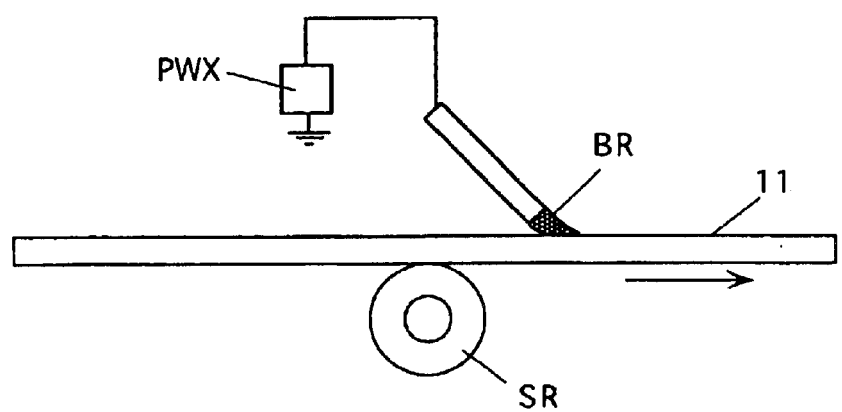
FIG. 17 is a view showing an example of a device for charging the surface of the image display medium after completion of application of electrostatic field.

FIG. 17 shows an example of such charger. The charger of FIG. 17 has the structure that, for example, while the medium 11 is transported as supported by a supporting roller SR, the surface of the medium 11 on the image observation side is charged to carry a potential holding the displayed images by being rubbed with a charging brush BR which contains water and which is supplied with a predetermined voltage from the power source PWX.

Figure 18A:
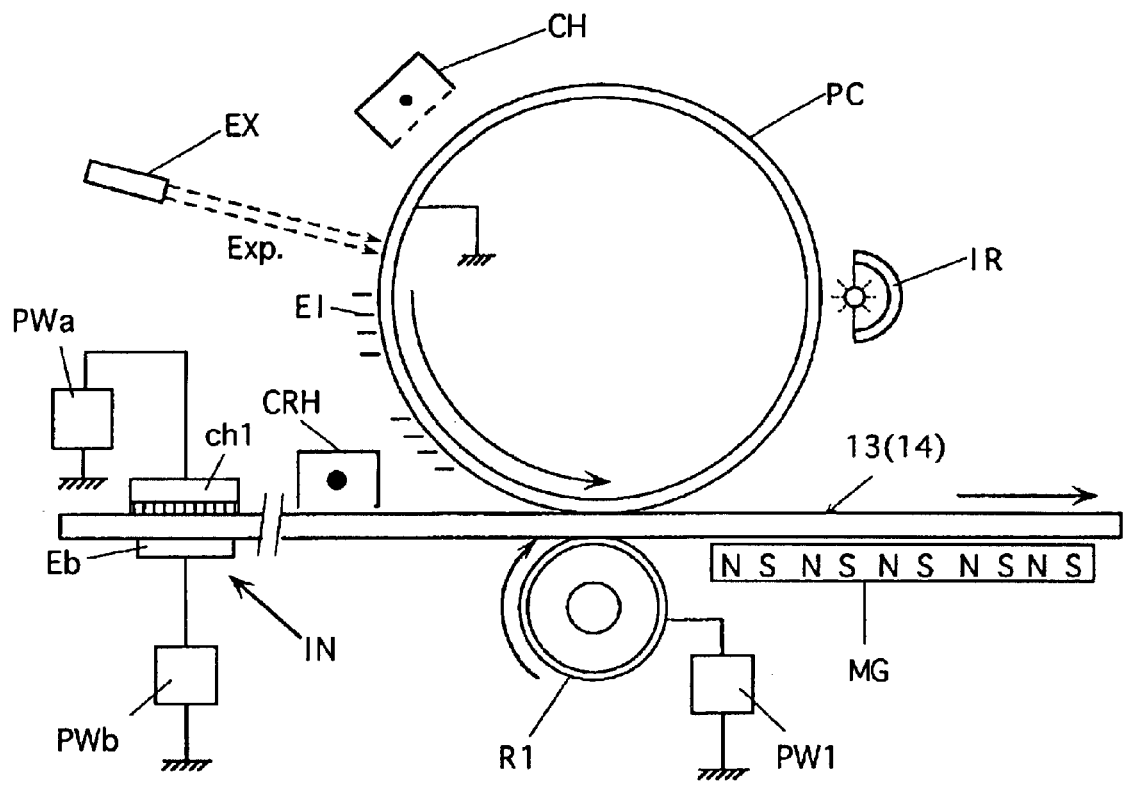
FIG. 18(A) is a schematic view showing the structure of another modification of the image forming apparatus of FIG. 11, especially one having a device for initializing the medium.

Further, as shown in FIG. 18(A), for example, an initializing device IN including a device for application of alternating electric field may be provided upstream of the image forming region on the feed path of medium 13 (14). The initializing device IN includes a brush charger ch1 connected to an AC power source PWa. The electrode Eb is provided as opposed to the brush charger ch1 such that the second substrate of the medium 13 (14) (underside substrate in the drawing) is set to a bias potential. To the electrode Eb is connected the bias power source PWb. Optionally the electrode Eb may be grounded.

The central value of AC voltage supplied from the brush charger ch1 is identical with the bias voltage to be applied to the electrode Eb.

The developer in the medium 13 (14) is stirred by applying an alternating electric field to the medium 13 (14) prior to image display using the initializing device IN, whereby the images previously formed can be erased and the electrostatic latent image can be removed from the medium to achieve initialization.

Figure 18B:
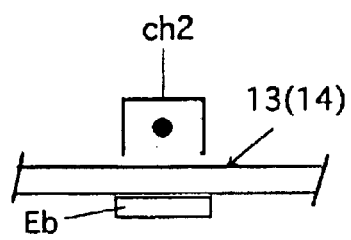
FIG. 18(B) to FIG. 18(D) are views showing other examples of the device for initializing the medium.
Figure 18C:
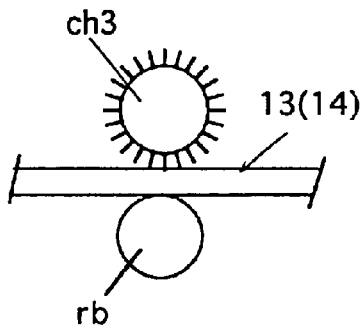
Figure 18D:
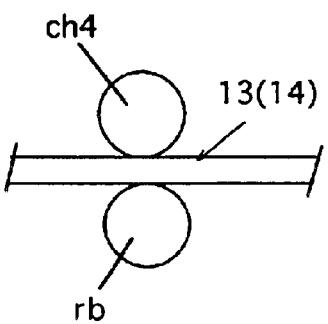

The brush charger ch1 may be replaced by a corona charger ch2 shown in FIG. 18(B), a brush roller charger ch3 shown in FIG. 18(C) or a roller charger ch4 shown in FIG. 18(D). In the illustrated modifications, a roller electrode rb is used as an electrode as opposed to the brush roller charger ch3 or the roller charger ch 4.

Using the mediums 12, 12' or the mediums 15, 15', image display can be also achieved by the image forming apparatus shown in FIG. 11 or FIG. 18. When images are displayed on the medium 12, 12', 15 or 15', the following electrodes or the like may be grounded or supplied with a bias voltage: the second electrode 115 in the medium 12, the pixel electrodes 114a in the medium 12' and the electrically conductive film 112A in the mediums 15, 15'.

Figure 20A:
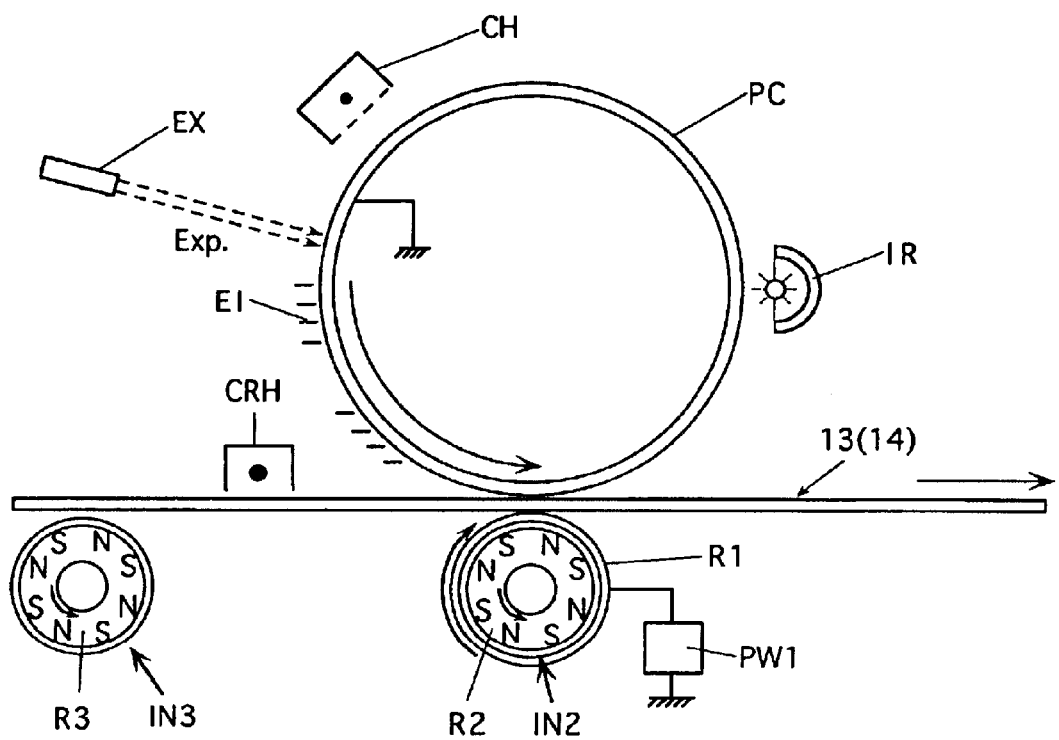
FIG. 20(A) is a schematic view showing the structure of another example of the image forming apparatus having an external electrostatic latent image forming device.

The image forming apparatus shown in FIG. 20(A) includes the photosensitive drum PC which is driven to rotate in the direction of an arrow in the drawing. Provided around the photosensitive drum PC are a scorotron charger CH, a laser image exposing device EX, and an eraser lamp IR. The electrode roller R1 which is driven to rotate is-provided under the drum PC. The electrode roller R1 is a developing electrode roller for forming an electrostatic field for image display. The electrode roller R1 is supplied with a bias voltage from the power source PW1 and may be internally provided with a rotary magnetic pole roller R2 which is driven to rotate in a direction opposite to that of the roller R1 (or which is driven to rotate reciprocatingly). The roller R2 is a kind of magnetic field-generating member such that in image display, a magnetic stirring force is applied to the developer in the medium by applying the oscillating magnetic field to the developer. The roller R2 forms an example (IN2) of the device for applying a magnetic stirring force for use in image display.

A rotary magnetic pole roller R3 is disposed upstream of the roller R1 in the direction of transporting the image display medium. The roller 3 is also a magnetic field-generating member which before image display, applies a magnetic stirring force to the developer in the medium by applying the oscillating magnetic field thereto to thereby initialize the medium. The roller R3 forms the device IN3 for applying a magnetic stirring force which is operated before image display. Optionally a charger CRH (a corona charger although not limited thereto) may be provided, upstream of the roller R1 and, e.g., downstream of the roller R3, to uniformly charge the surface of the medium before image display to carry a predetermined potential.

In the foregoing image forming apparatus, the surface of the photosensitive drum PC is charged by the charger CH and the image exposure is performed to the charged region of the drum PC by the image exposing device EX to form an electrostatic latent image E1 on the drum PC.

On the other hand, the electrode roller R1 is supplied with a bias voltage from the power source PW1. Optionally the electrode roller R1 may be grounded to carry the ground potential.

Then, e.g. the medium 13 or 14 is sent between the drum PC and the electrode roller R1 in synchronization with the electrostatic latent image E1 on the drum PC. An oscillating magnetic field is applied to the developer DL in the medium 13 (14) by the rotary magnetic pole roller R3, whereby the developer is stirred for erasure of the previously displayed images, i.e. for initialization. Optionally the surface of the medium 13 (14) is uniformly charged by the charger CRH to carry the predetermined potential.

As the medium 13 (14) arriving in this way is passed between the drum PC and the electrode roller R1, an electrostatic field is formed based on the electrostatic latent image E1, which acts on the developing particles BP, WP of the developer DL accommodated in the cells 116. Thereby the developing particles are moved by a Coulomb force exerted between the electrostatic field and the charged developing particles. In this operation, the developing particles in the medium is made easily movable due to the oscillating magnetic field applied by the rotary magnetic pole roller R2.

Thus, the white and black particles WP, BP mingled in the developer DL as shown in FIG. 7(A) or FIG. 8(A) are easily moved to bring them to the state of white and black particles WP, BP according to the electric field as shown in FIG. 7(B) or FIG. 8(B). Thereby images can be displayed in the predetermined contrast.

After image display as described above, the charges on the surface of the photosensitive drum PC are erased by the eraser lamp IR to make ready for the next printing.

Figure 20B:
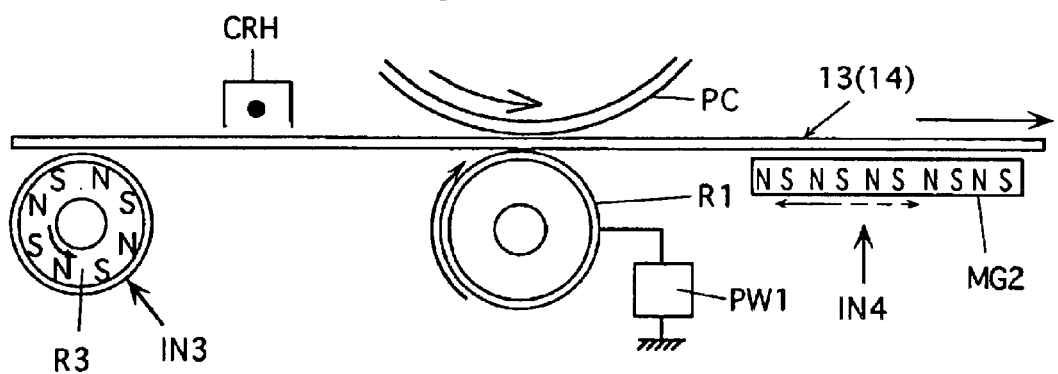
FIG. 20(B) is a view showing part of a modification of the apparatus of FIG. 20(A).

Instead of the magnetic pole roller R2, for example, a magnet plate MG2 may be disposed downstream of the photosensitive drum PC as shown in FIG. 20(B).

The magnet plate MG2 is a kind of magnetic field-generating member which forms another example (IN4) of the device for applying a magnetic stirring force. As shown in FIG. 26, the magnet plate MG2 (designated MG in FIG. 26) is one in which S and N magnetic poles are alternately arranged in the direction of transporting the medium (designated D in FIG. 26, and the cell is designated CEL). The medium 13 (14) is moved over the magnet plate MG2 so that an oscillating magnetic field is applied to the developer in the medium, thereby making the developing particles easily movable. The magnet plate MG2 may be stationarily arranged or may be reciprocatingly oscillated in the direction of transporting the medium.

Figure 30A:
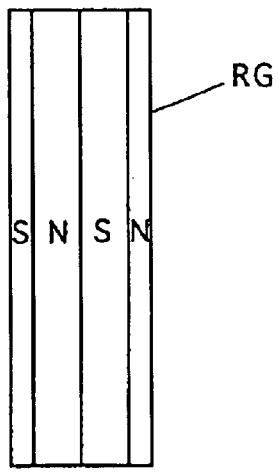
FIG. 30(A) and FIG. 30(B) are views showing an example of the arrangement of magnetic poles in a rotary magnetic pole roller.
Figure 30B:
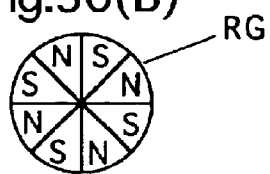

Instead of the magnet plate MG2, the magnetic pole roller R2 may be provided in or near the position of the plate MG2. The magnetic pole roller R2 for image display and the magnetic pole roller R3 for use before image display are of the type as shown in FIG. 30(A) and FIG. 30(B) (designated RG in FIG. 30(A) and FIG. 30(B)). These rollers have N and S magnetic poles alternately arranged in the direction of rotation of the roller.

Figure 19:
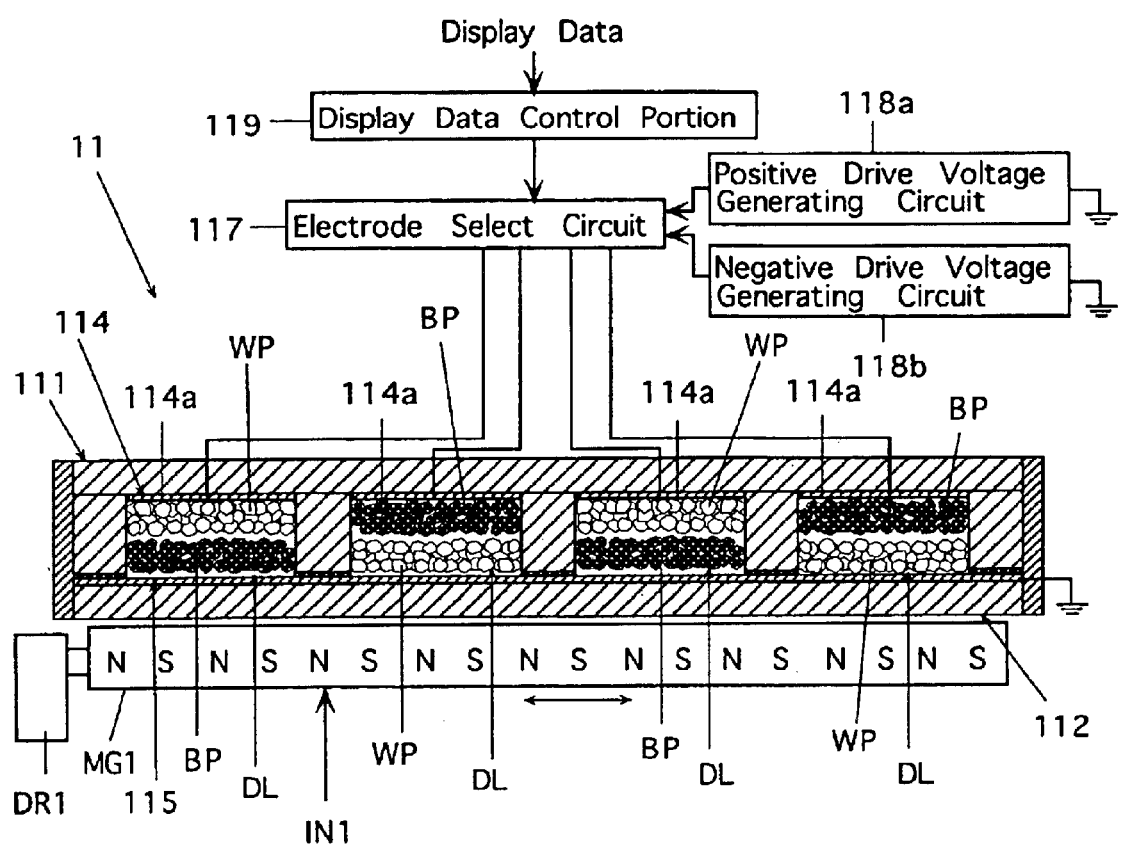
FIG. 19 is a sectional view showing another example of the medium of FIG. 1 while images are displayed.

The magnet plate MG1 shown in FIG. 19, the magnet plate MG2 shown in FIG. 20(B), and the magnetic pole rollers R2, R3 are magnetic field-generating members having magnetic poles arranged in one predetermined direction when the surface of the magnetic field-generating members and the medium are relatively moved in the predetermined direction.

When the magnet plate (such as MG1 and MG2) is used, the magnetic developing particles BP tend to be drawn toward one of the two substrates in the medium, and are oscillated according to the relative movement of the magnet plate and the medium in the state as if the particles BP would form chains of particles as shown in FIG. 23(A) to FIG. 23(D) and FIG. 24(A), whereby the developer is stirred.

In the case of the image forming apparatus shown in FIG. 20(B), for example, the medium 13 (14) is allowed to display images as follows.

After initializing the medium 13 (14), the electrostatic latent image is transferred to the surface of the medium 13 (14) after which the medium 13 (14) carrying the electrostatic latent image is passed over the magnet plate MG2, whereby ultimately the desired images can be displayed.

While the developing particles BP, WP of the medium 13 (14) are moved with difficulty in the stage of the formation of electrostatic latent image, the developer in the cells 116 receives a magnetic stirring force successively as the medium 13 (14) is passed over the magnet plate MG2 or in other words, as the relative movement is made between the medium 13 (14) carrying the electrostatic latent image and the magnet plate MG2 as schematically shown in FIG. 25(A) to FIG. 25(C). Thereby images are formed sequentially in the cells.

Other modifications of the image forming apparatus shown in FIG. 20(A) will be described with reference to FIG. 21(A) to FIG. 21(C) and FIG. 22(A) to FIG. 22(C).

Figure 21A:
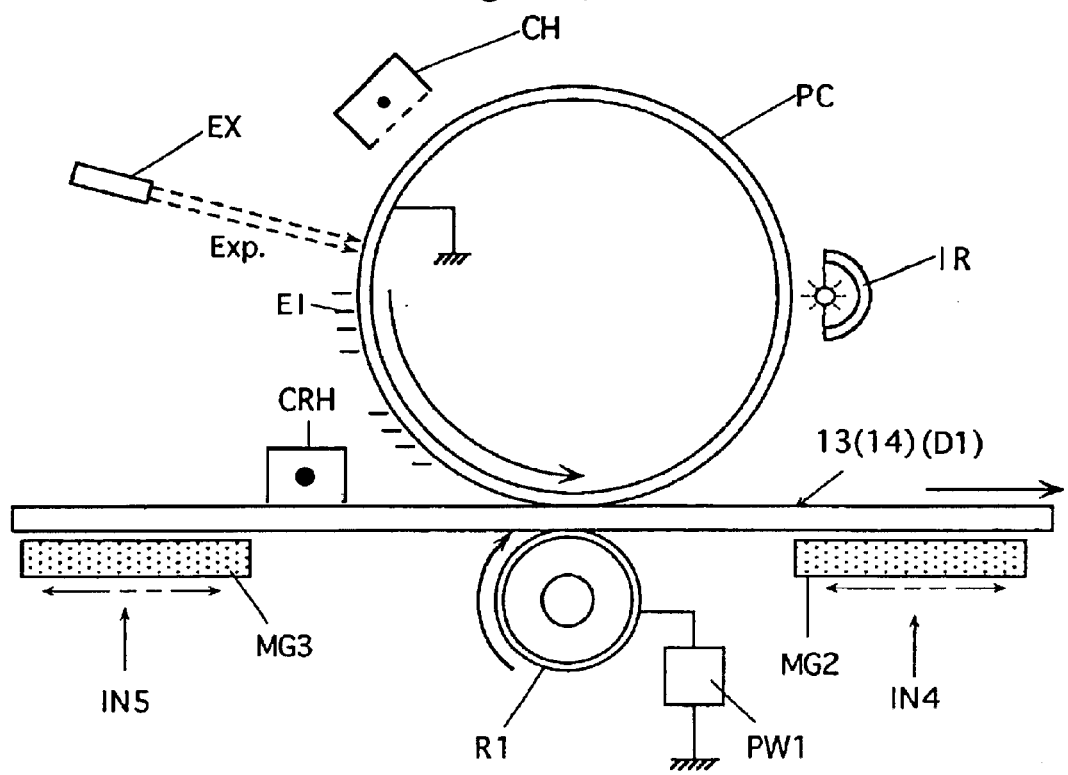
FIG. 21(A) to FIG. 21(C) are schematic views showing the structures of other examples of the image forming apparatus.

The image forming apparatus shown in FIG. 21(A) differs from that of FIG. 20(B) in that the magnet plate MG3 is used instead of the rotary magnetic pole roller R3 for use before image display. The magnet plate MG3 forms a device IN5 for applying a magnetic stirring force. The image forming apparatus of FIG. 21(A) is virtually identical in other respects with the apparatus of FIG. 20(A) and FIG. 20(B). In FIG. 21(A), the same components and parts as in the apparatus of FIG. 20(A) are indicated with the same reference symbols as in FIG. 20(A). The magnet plate MG3 may be stationarily arranged or may be reciprocatingly oscillated in a travelling direction of the medium 13 (14).

Figure 21B:
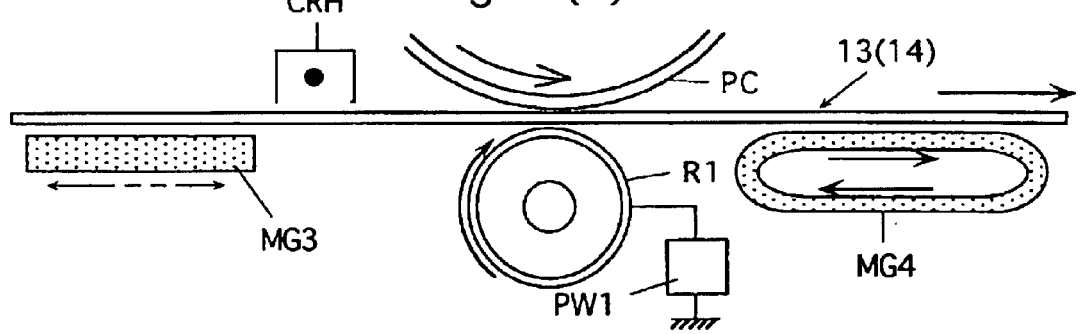

The image forming apparatus shown in FIG. 21(B) differs from that of FIG. 21(A) in that the magnet plate MG2 for use in image display step is replaced by a magnetic field-generating member MG4 in the shape of a belt which is driven to rotate.

Figure 21C:
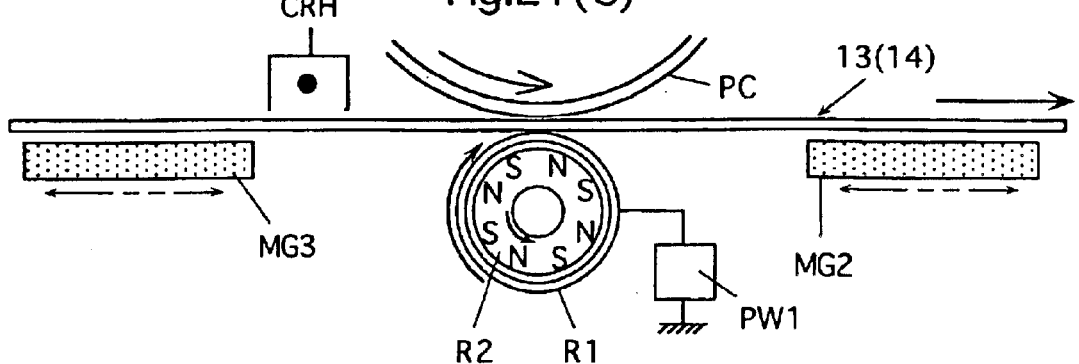

The image forming apparatus shown in FIG. 21(C) differs from that of FIG. 21(A) in that the electrode roller R1 is internally provided with a rotary magnetic pole roller R2.

Figure 22A:
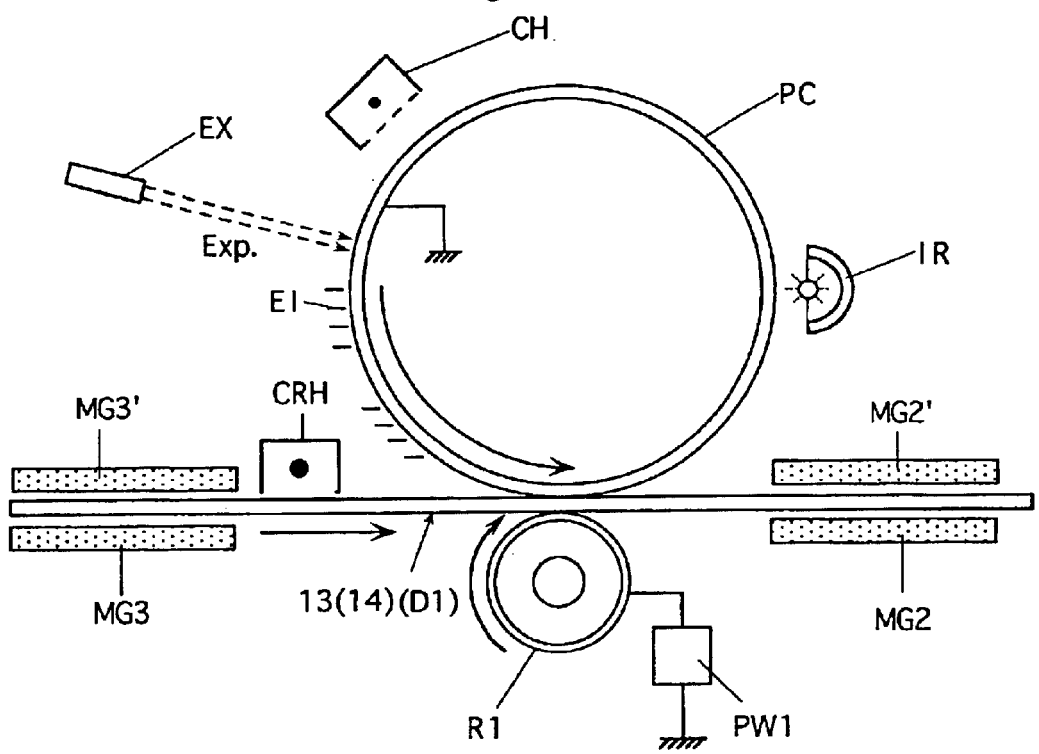
FIG. 22(A) to FIG. 22(C) are schematic views showing the structures of further examples of the image forming apparatus.

The image forming apparatus shown in FIG. 22(A) differs from that of FIG. 21(A) in that the magnet plates MG3 and MG3' are opposed to both sides of the medium 13 (14) before image display and the magnet plates MG2 and MG2' are opposed thereto in image display step to increase the effect of stirring the developer.

Figure 22B:
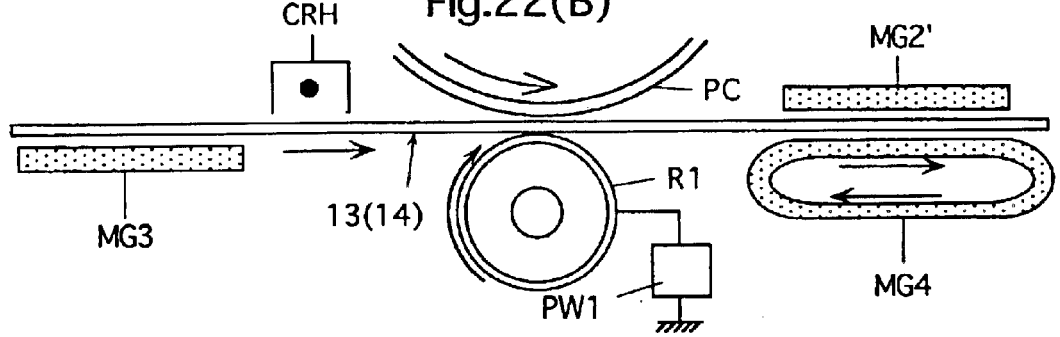

The image forming apparatus shown in FIG. 22(B) differs from that of FIG. 21(B) in that in image display step, the belt-like magnetic field-generating member MG4 and the magnet plate MG2' are opposed to the medium 13 (14).

Figure 22C:
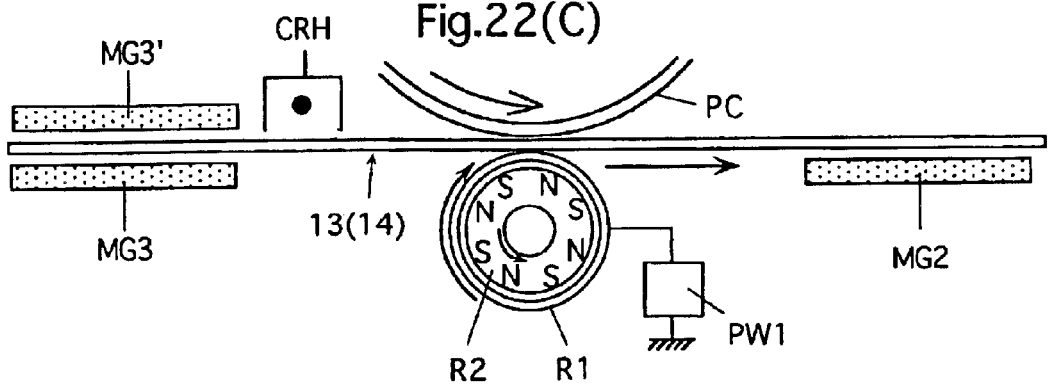
Figure 23A:
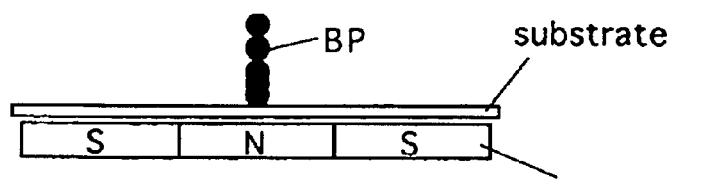
FIG. 23(A) to FIG. 23(D) are views schematically showing the movement of magnetic developing particles when an oscillating magnetic field is applied with a magnetic field-generating member as opposed to one surface of the image display medium.
Figure 23B:
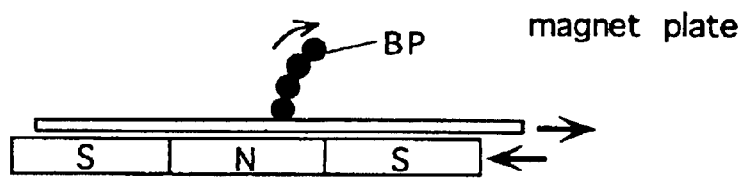
Figure 23C:
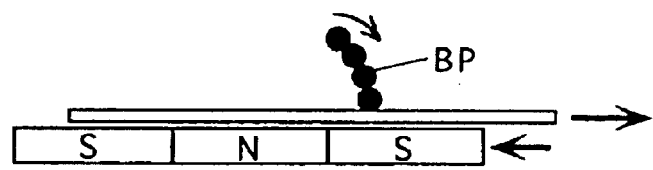
Figure 23D:
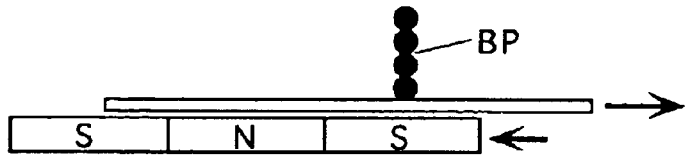

The image forming apparatus shown in FIG. 22(C) differs from that of FIG. 21(C) in that the magnet plates MG3 and MG3' are opposed to both sides of the medium 13 (14) before image display.

The magnet plates MG2', MG3' may be stationarily arranged or may be reciprocatingly oscillated in a travelling direction of the medium 13 (14).

Figure 24A:
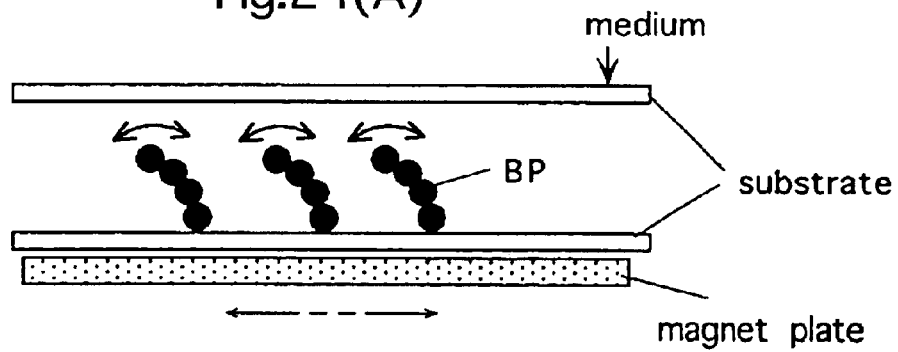
FIG. 24(A) is a view schematically showing the movement of magnetic developing particles when an oscillating magnetic field is applied with a magnetic field-generating member as opposed to one surface of the image display medium.
Figure 24B:
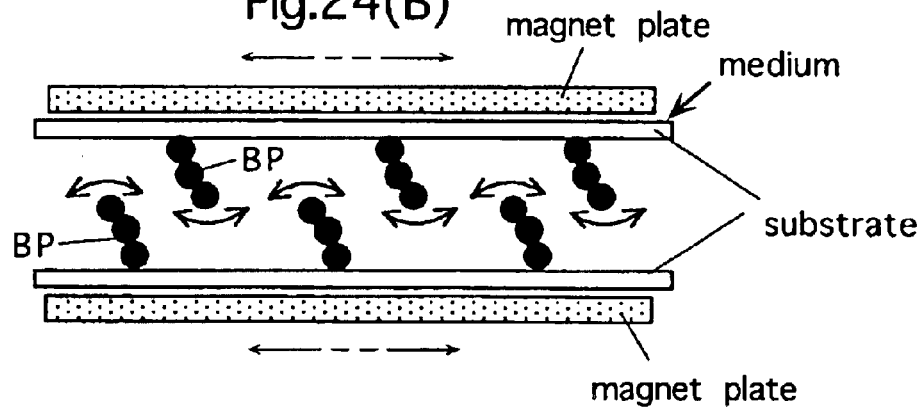
FIG. 24(B) is a view schematically showing the movement of magnetic developing particles when an oscillating magnetic field is applied with magnetic field-generating members as opposed to both surfaces of the image display medium.

When magnetic field-generating members such as a magnet plate are opposed to both sides of the medium, the magnetic developing particles BP tend to be drawn in the medium toward each of the two substrates, and are oscillated according to the relative movement of the magnetic field-generating members and the medium in the state as if the particles would form chains of particles on each substrate as shown in FIG. 24(B), whereby the developer is more effectively stirred than when the magnetic field-generating member is opposed only to one side of the medium.

It is possible to increase the stirring effect of developer by making various arrangements of magnetic poles in the magnetic field-generating members such as the magnet plate as opposed to both sides of the medium 13 (14).

Using the mediums 12, 12' and 15, 15', images can be formed by the image forming apparatuses shown in FIG. 20, FIG. 21(A) to FIG. 21(C), and FIG. 22(A) to FIG. 22(C). When images are formed on these mediums, the following electrodes or film may be grounded or supplied with a bias voltage: the second electrode 115 in the medium 12, the pixel electrode 114a in the medium 12' and the electrically conductive film 112A in the mediums 15, 15'.

When used on mediums for image display based on an electrostatic latent image, the following magnet plates and member should be considered regarding the magnet plates MG2, MG2', MG3, MG3', and the belt-like magnetic field-generating member MG4, especially the magnet plates MG2', MG3' as opposed to the substrate on the side of forming an electrostatic latent image. These magnet plates or member are disposed in a position remote from the substrate to avert the undesired frictional charging with the substrate.

Description is given to other examples of the arrangement of magnetic poles in the magnet plates and the rotary magnetic pole roller with reference to FIGS. 27 to 29 and FIG. 31(A) and FIG. 31(B).

Figure 28:
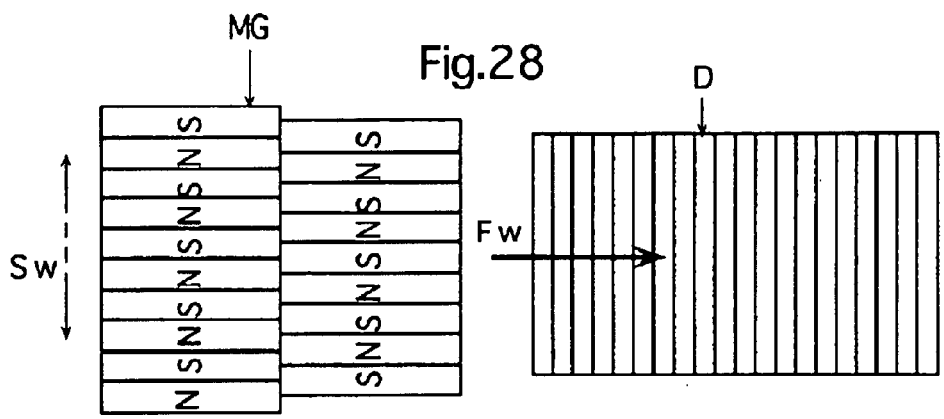
FIG. 28 is a view showing a further example of the arrangement of magnetic poles in a magnet plate.
Figure 29:
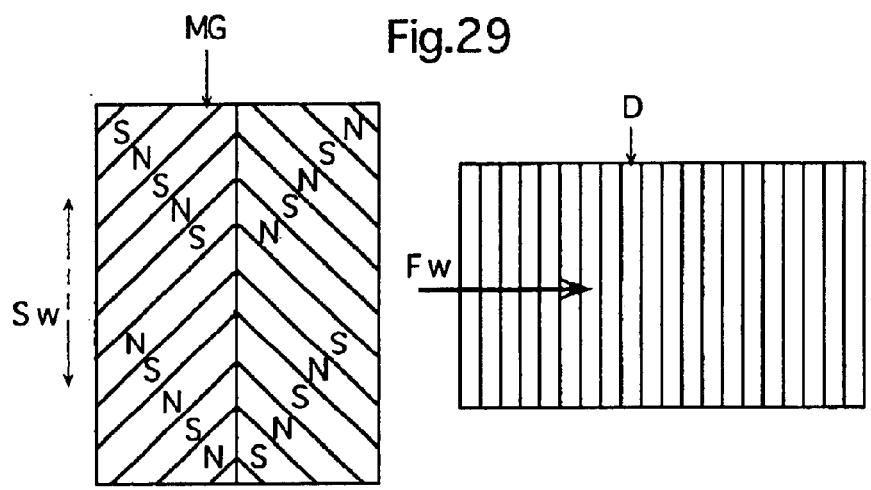
FIG. 29 is a view showing a still further example of the arrangement of magnetic poles in a magnet plate.

FIG. 27 to FIG. 29 show examples of the arrangement of magnetic poles in the magnet plates.

When the surface of the magnet plate MG and the reversible image display medium D are relatively moved in one predetermined direction and in a direction across the predetermined direction, the magnetic poles of the magnet plate MG may be arranged in the direction across the predetermined direction as shown in FIG. 27. In this case, the magnet plate MG may be reciprocatingly oscillated in a direction Sw across the relatively travelling direction Fw of the reversible image display medium D (e.g. direction vertical thereto).

When the surface of magnet plate MG and the reversible image display medium D are relatively moved in one predetermined direction, the magnet plate MG may have at least two rows of magnetic poles such arranged in a direction across the predetermined direction that in two adjacent rows of magnetic poles, the positions of N and S magnetic poles are displaced from each other in the direction of arrangement of magnetic poles as shown in FIG. 28. The magnet plate MG may be stationarily arranged or may be reciprocatingly oscillated in the direction Sw (e.g. a direction vertical thereto) across the relatively travelling direction Fw of the medium D.

When the surface of magnet plate MG and the reversible image display medium D are relatively moved in one predetermined direction, the magnetic poles of the magnet plate MG may be disposed in a direction at an angle to the predetermined direction as shown in FIG. 29. The magnet plate MG may be stationally arranged or may be reciprocatingly oscillated in the relatively travelling direction Fw of the medium D and/or in the direction Sw (e.g. a direction vertical thereto) across the travelling direction Fw.

Figure 31A:
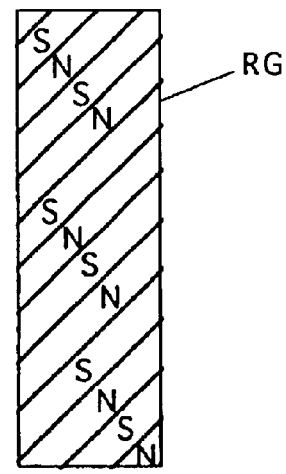
FIG. 31(A) and FIG. 31(B) are views showing other example of the arrangement of magnetic poles in a rotary magnetic pole roller.
Figure 31B:
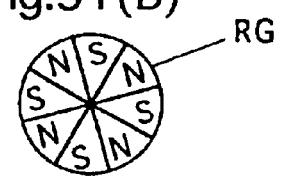
Figure 32A:
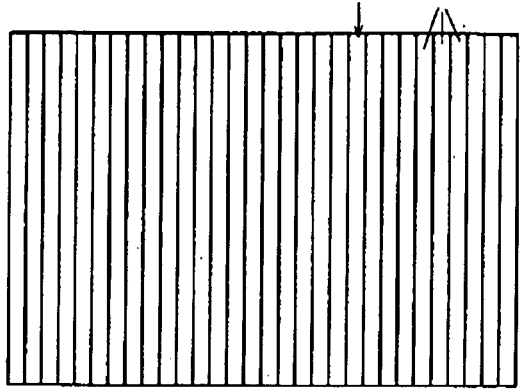
FIG. 32(A) to FIG. 32(E) are views showing examples of cells accommodating the developer in the reversible image display medium.
Figure 32B:
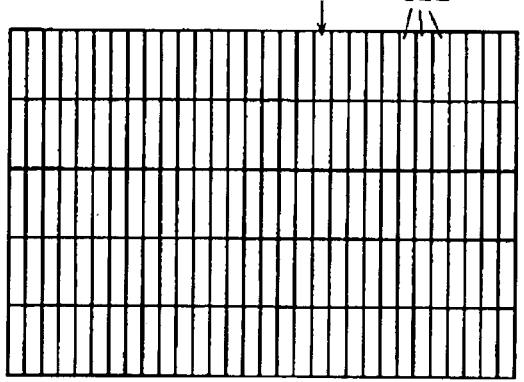
Figure 32C:
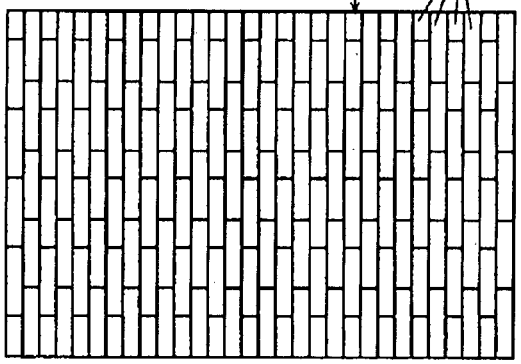
Figure 32D:
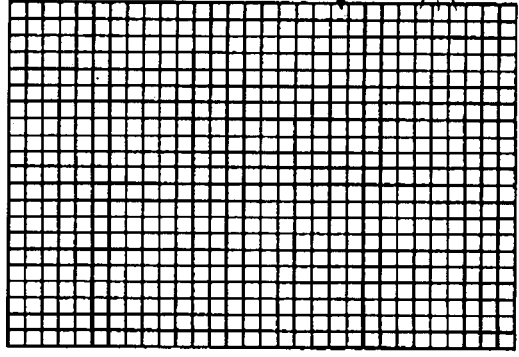
Figure 32E:
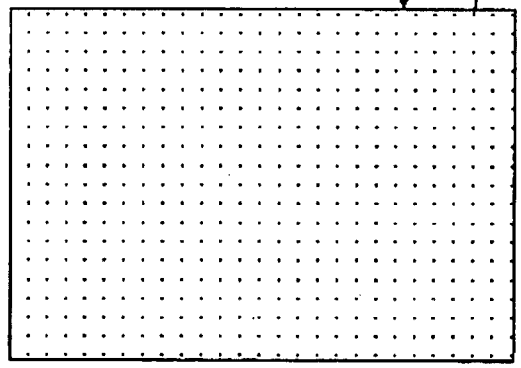

FIG. 31(A) and FIG. 31(B) show an example of arrangement of magnetic poles in the rotary magnetic pole roller. The roller RG is such that when the roller and the medium D are relatively moved in one predetermined direction, the magnetic poles may be disposed in a direction at an angle to the predetermined direction. Strips of N magnetic poles and strips of S magnetic poles are alternately helically arranged.

The foregoing magnet plates and the magnetic pole roller can be also used for any of the device for applying a magnetic stirring force for use before image display and the device for applying a magnetic stirring force for use in image display.

Magnetic poles can be variously arranged in the magnetic field-generating member MG4 in the shape of a belt shown in FIG. 21(B).

Figure 12A:
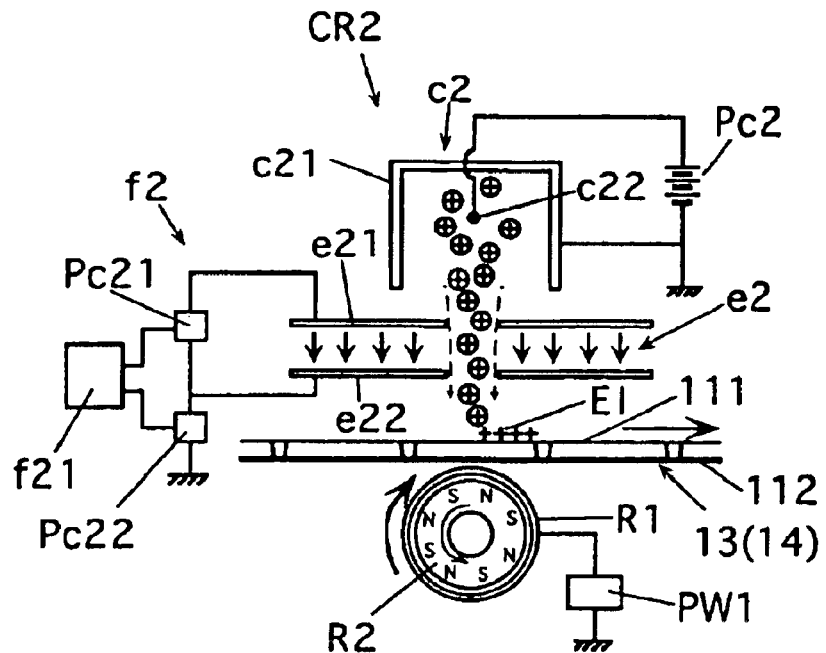
FIG. 12(A) and FIG. 12(B) show a schematic view showing the structure of an example of an image forming apparatus having an ion flow type direct electrostatic latent image forming device.

The image forming apparatus shown in FIG. 12(A) includes a direct electrostatic latent image forming device CR2 of an ion flow type. The device CR2 includes a corona ion generating portion c2 for generating corona ions, a write electrode e2 for leading the corona ions generated by the ion generating portion onto the surface of, e.g., the first substrate 111 in the medium 13 (or 14), a write electrode control circuit f2 for applying to the write electrode e2 the voltage, which is used for leading the positive or negative corona ions to the pixel corresponding portion on the surface of the substrate 111 in accordance with the image to be displayed.

The corona ion generating portion c2 includes a shield casing c21 and a corona wire c22, which is stretched in the casing c21. The corona wire c22 is formed of, e.g., gold-plated tungsten wire of 60 $\mu$m to 120 $\mu$m in diameter. A power source Pc2 applies a positive or negative voltage (4 kV to 10 kV) to the wire c22 for generating the corona ions.

The write electrode e2 is opposed to a portion of the shield casing c21, which faces the first substrate 111 of the medium 13 (or medium 14). The write electrode e2 is formed of upper and lower electrodes e21 and e22, and is provided at its center with a hole, through which the corona ions can flow.

The electrode control circuit f2 includes a control power source Pc21, a bias power source Pc22 and a control portion f21. The control portion f21 can apply to the electrodes e21 and e22 the ion leading voltages corresponding to the polarity of the ions to be led toward the medium 13.

Under the control by the control portion f21, the positive and negative voltages are applied to the upper and lower electrodes e21 and e22, respectively, whereby the positive corona ions can be led to the medium (FIG. 12(A)). By applying the negative and positive voltages to the upper and lower electrodes e21 and e22, respectively, the positive corona ions can be confined (FIG. 12(B)).

The electrode roller R1 is opposed to the write electrode e2, and is supplied with a positive bias voltage from the power source PW1 or the roller R1 is grounded. The roller R1 is internally provided with a magnetic pole roller R2, which is driven to rotate.

Figure 12B:
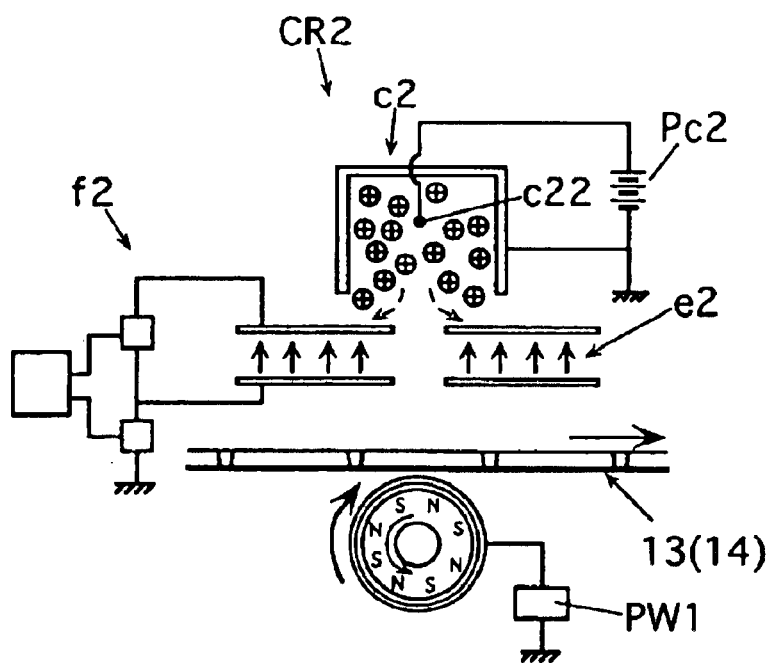

The surface of the medium 13 (or 14) is uniformly charged to a predetermined potential by a charger such as corona charger and the charged medium 13 (14) is moved relatively to the device CR2. At the same time, the electrode roller R1 is driven to rotate in the medium feed direction, and the magnetic pole roller R2 is rotated in the opposite direction. In accordance with the instruction by the control portion f21, positive corona ions are led to the predetermined pixel corresponding portion corresponding to the image to be displayed among the plurality of pixel corresponding portions on the surface of the first substrate 111, as shown in FIG. 12(A), and outflow of the ions are prevented for the other pixels as shown in FIG. 12(B). Thus the image display on the medium 13 (or 14) can be performed as shown in FIGS. 7(B) and 8(B).

Before image display, the medium can be initialized with the initializing devices shown, by way of example, in FIG. 18(A) to FIG. 18(D).

Before image display, any one of the above-exemplified devices for applying a magnetic stirring force can be used which would pose no problem.

It is not essential that the surface of the medium 13 (or 14) is previously charged. The discharging wire c22 in the device CR2 may be replaced with solid discharging elements.

Using the mediums 12, 12' or the mediums 15, 15', image display can be achieved by such image forming apparatus. When images are displayed on these medium 12, 12', 15 or 15', the following electrodes or the like may be used instead of the electrode roller R1 and may be grounded or supplied with a bias voltage: the second electrode 115 in the medium 12, the pixel electrodes 114a in the medium 12' and the electrically conductive film 112A in the mediums 15, 15'.

The electrostatic latent image forming device CR2 shown in FIG. 12(A) utilizes the discharging phenomenon. Instead of it, electrostatic latent image forming devices of various discharging types other than the above may be utilized.

Figure 13:
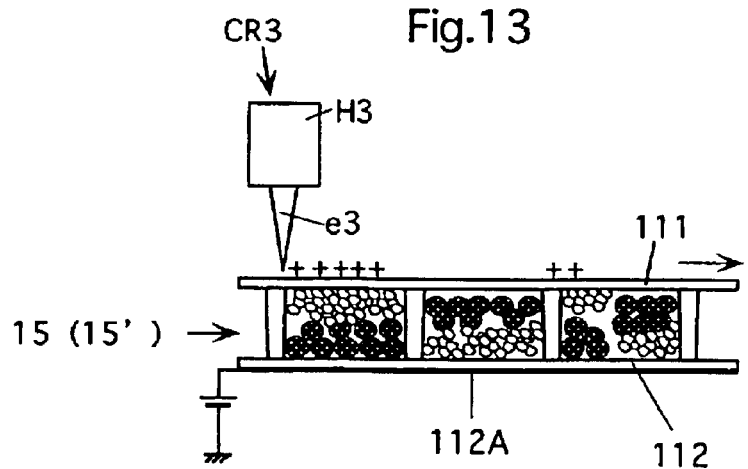
FIG. 13 is a schematic view showing the structure of an example of an image forming apparatus having a multi-stylus type direct electrostatic latent image forming device.

The image forming apparatus shown in FIG. 13 includes a direct electrostatic latent image forming device CR3 of the multi-stylus type. The device CR3 includes a multi-stylus head H3 having a plurality of electrodes e3, which are arranged in the main scanning direction of, e.g., medium 15 (or 15'), and are arranged close to the first substrate 111. A signal voltage is applied to each electrode e3 for applying electrostatic latent image charges to the pixel corresponding portion on the surface of the first substrate 111 in accordance with the image to be displayed. The medium 15 (or 15') is transported relatively to the head H3, e.g., while applying a bias to the conductive film 112A of the second substrate 112 or the film 112A is grounded so that the image display is performed.

Before image display, the medium can be initialized with the initializing devices shown, by way of example, in FIG. 18(A) to FIG. 18(D).

Before image display, any one of above examples of the devices for applying a magnetic stirring force can be used which would pose no problem.

Using the mediums 12, 12', images can be formed by the foregoing image forming apparatus. In this case, the second electrode 115 of the medium 12 and the electrodes 114a of the medium 12' may be supplied with a bias voltage, when so required.

In the mediums 13, 14, the outer surface of the second substrate 112 may be supplied with a bias voltage or it may be contacted with an external electrode which can be grounded, whereby images can be displayed by the foregoing image forming apparatus.

Figure 14:
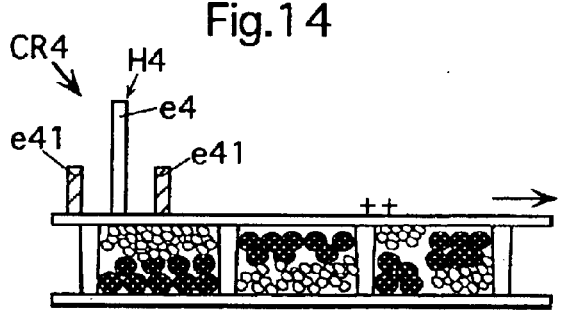
FIG. 14 is a schematic view showing the structure of an example of an image forming apparatus having a multi-stylus type direct electrostatic latent image forming device provided with neighboring control electrodes.

The image forming apparatus shown in FIG. 14 includes a direct electrostatic latent image forming device CR4 of the charge injection type. The device CR4 is of a multi-stylus type, and has an electrostatic record head H4, in which a plurality of record electrodes e4 are arranged in the main scanning direction of the medium, and neighboring control electrodes e41 are arranged close to the record electrodes e4. This head is located, e.g., near the medium, and the control electrodes e41 of the head H4 are successively and sequentially supplied with a voltage nearly equal to half the voltage (record voltage) required for the image recording. Also, the record electrodes e4 are supplied with the image signal voltage nearly equal to half the record voltage. Thereby, the electrostatic latent image can be formed on the medium located immediately under the record electrode.

Described below are specific examples of the developing particles and the developer, specific examples of the reversible image display medium and experimental examples of image display using them. (I) Examples illustrating the adjustment of strength of electric field for driving the developing particles <Developing Particles and Developer>
White Developing Particles WP In a Henschel mixer were thoroughly mixed 100 parts by weight of thermoplastic polyester resin (softening point:

121° C., Tg: 67° C.), 40 parts by weight of titanium oxide (Ishihara Sangyo Kaisha, Ltd.: CR-50) and 5 parts by weight of salicylic acid-zinc complex (minus-charge-controlling agent, Orient Chemical Co., Ltd.: Bontron E-84). The mixture was further mixed by a twin-screw extruder and then cooled. The mixture was roughly pulverized, then pulverized by a jet mill and classified with wind to obtain white fine powders which have volume average particle sizes of 12 $\mu$m, 15 $\mu$m and 19 $\mu$m.

To the white fine powders having the above sizes was added 0.3 parts by weight of hydrophobic silica particles (Nihon Aerosil Co., Ltd.: Aerosil R-972). Each of the mixture was mixed by a Henschel mixer to prepare white developing particles WP with a particle size shown below in a table.

Black Developing Particles BP

In a Henschel mixer were thoroughly mixed 100 parts by weight of styrene-n-butyl methacrylate resin (softening point: 132° C., Tg: 65° C.), 2 parts by weight of carbon black (Lion Oil & Fat Co., Ltd.: Ketchen Black), 1.5 parts by weight of silica (Nihon Aerosil Co., Ltd.: #200) and 500 parts by weight of magnetic powder containing magnetite (RB-BL, Titan Kogyo Co., Ltd.). The mixture was further mixed by a kneader.

After cooling, the mixture was roughly pulverized by a feather mill, then finely pulverized by a jet mill and classified with wind to obtain black particles BP which have a volume average particle size of 25 $\mu$m. The black developing particles BP are magnetic particles.

Developer DL

The white particles WP (30 g) and the black particles BP (70 g) were placed into a polyethylene bottle. The bottle was rotated by a ball mill pedestal to perform kneading and mixing for 30 minutes to obtain following developers DL1, DL2 and DL3.

| Developer | White Particles (particle size) | Black Particles (particle size) | Charge quantity ($\mu$C/g) |
|---|---|---|---|
| DL1 | 12 $\mu$m | 25 $\mu$m | −4.5 |
| DL2 | 15 $\mu$m | 25 $\mu$m | −3.6 |
| DL3 | 19 $\mu$m | 25 $\mu$m | −2.5 |

Note: Particle size = volume average particle size

The white developing particles WP were negatively charged and black developing particles BP were positively charged in the developer.

<Reversible Image Display Medium D1 and Image Display>

A reversible image display medium of the same type as the medium 11 having electrodes as shown in FIG. 1 was prepared as follows.

A photoresist was applied to a transparent ITO film on a transparent PET (polyethylene terephthalate) film of 50 $\mu$m in thickness as the first substrate 111. Over the photoresist was laid a photomask opened in a specified pattern which was then irradiated with light, followed by development and etching. Then the remaining photoresist was peeled off for removal. A first electrode pattern was formed in which square pixel electrodes 114a (see FIG. 4) measuring 1 mm and 1 mm were arranged as in a checkerboard with the squares spaced from each other by 0.1 mm in such a way that lead portions 110 (see FIG. 4) are disposed between and connected to the pixel electrodes.

A resist was repeatedly applied to increased thickness to other portions than the square electrodes 114a on the substrate 111 to form a grid-like partition member 113 (see FIG. 3). The partition walls 113a forming the partition member 113 (see FIGS. 3 and 4) had a thickness (width) $\alpha$ (0.1 mm), a height h (100 $\mu$m), and a wall space (1 mm) between the neighboring walls (corresponding to one side of the independent electrode 114a).

An ITO film was formed as the second electrode 115 by a sputtering method to a thickness of 500 Å over the entire surface of the second substrate 112 formed of a transparent PET film of 50 $\mu$m in thickness.

Then, the developer DL was placed into each square cavity surrounded with the partition wall 113a of the first substrate 111. The volume proportion of the developer placed into the cavity was 30% based on the volume of the cavity.

A photo-curing adhesive 119a (see FIG. 1) was applied only to the top of the partition member 113 to a small thickness after which the ITO electrode 115 side of the second substrate 112 was closely laid on the top. Thereby the adhesive was cured by UV irradiation.

Thereafter, the peripheries of the first and second substrates 111, 112 were sealed by an epoxy resin adhesive 119b (see FIG. 1).

In this way, a medium D1 of the type shown in FIG. 1 was produced.

Image display was performed on the medium D1 using the image forming apparatus shown in FIGS. 1 and 2, and the second electrode 115 was set to carry a ground potential. A negative voltage was applied to the independent electrodes 114a which correspond to the pixels to be displayed in black, while a positive voltage was applied to the independent electrodes 114a which correspond to the pixels to be displayed in white. In this manner, each independent electrode 114a was supplied with a voltage corresponding to the display data to display images.

<Reversible Image Display Medium D2 and Image Display>

A reversible image display medium of the same type as the medium 12' having electrodes as shown in FIG. 6(B) was prepared as follows.

A photoresist was applied to a transparent ITO film on a transparent PET (polyethylene terephthalate) film of 50 $\mu$m in thickness as the first substrate 111 as done in the case of the medium D1. The photoresist was exposed to light, developed and etched, and the remaining photoresist was peeled off for removal. A first electrode pattern was formed in which square pixel electrodes 114a (see FIG. 4) measuring 1 mm and 1 mm were arranged as in a checkerboard with the squares spaced from each other by 0.1 mm in such a way that lead portions 110 (see FIG. 4) are disposed between and connected to the pixel electrodes.

A resist was repeatedly applied to increased thickness to other portions than the square electrodes on the substrate 111 to form a grid-like partition member 113 having a height of 100 $\mu$m.

Then, the developer DL was placed into each square cavity surrounded with the partition wall on the first substrate 111. The volume proportion of the developer placed into the cavity was 30% based on the volume of the cavity.

A photo-curing adhesive 119a was applied to a small thickness only to the top of the partition member 113 after which the substrate 112 formed of a transparent PET film of 25 $\mu$m thickness was closely laid on the top. Then the adhesive was cured by UV irradiation.

Thereafter, the peripheries of the two substrates 111, 112 were sealed by an epoxy resin adhesive.

In this way, a medium D2 of the type shown in FIG. 6(B) was produced.

Image display was performed on the medium D2 using an image forming apparatus having a multi-stylus type direct electrostatic latent image forming device CR3 shown in FIG. 13 and independent electrodes 114a were set to a ground potential. A voltage corresponding to the display data was applied from the side of substrate 112 to display images.

<Reversible Image Display Medium D3 and Image Display>

A reversible image display medium of the same type as the medium 14 shown in FIG. 8(A) was prepared as follows.

Transparent PET (polyethylene terephthalate) was molded by thermal pressing molding method to give a substrate 111 having the partition member 113 on a base portion. The substrate 111 comprised the base portion having an average thickness (in other words, an average thickness of the base portion) of 25 μm and continuous partition walls 113a of a wall thickness α (20 μm) and a height h (100 μm) over the base portion. A plurality of continuous partition walls were formed as arranged in parallel with each other with a space pt (500 μm) away from each other (see FIG. 9).

The developer DL was placed into the continuous grooves (developer-accommodating cell) 116 between the neighboring continuous partition walls 113a. The volume proportion of the developer placed into the cavity was 30% based on the volume of the cavity.

A photo-curing adhesive was applied to a small thickness only to the top of the partition walls 113a (continuous partition walls 113a) after which a substrate 112 formed of a transparent PET film of 25 m thickness containing carbon black was closely laid on the top, followed by curing the adhesive by UV irradiation.

Thereafter, the peripheries of the substrates 111, 112 were heat-sealed to form a medium D3 of the type shown in FIG. 8(A) or FIG. 9.

Using the medium D3 of the type shown in FIG. 8(A), images were displayed by an image forming apparatus having an ion-flow type direct electrostatic latent image forming device CR2 shown in FIGS. 12(A) and 12(B).

The surface of the first substrate 111 was uniformly charged by a corona charger (not shown) to carry a negative potential. The second substrate 112 of the charged medium was set to a ground potential. Then positive corona ions were led to the predetermined pixel corresponding portions corresponding to the image to be displayed among the plurality of pixel corresponding portions on the surface of the first substrate 111 of the medium. The portions were charged to carry a positive polarity potential and to the same degree (absolute value) of potential as the above negatively charged potential.

Thereby the positive corona ion-charged portions and the non-charged portions were charged to carry the same degree (absolute value) of potential and to give different polarities. Thus, image display was conducted such that the positive corona ion-loaded portions were displayed in white by negatively charged white developing particles WP and the positive corona ion-unloaded portions were displayed in black by positively charged black developing particles BP.

In the image display, the magnetic pole roller R2 was rotated to stir the developing particles in the medium, whereby images were smoothly displayed.

Using the above-mentioned mediums D1 to D3, image display was performed with varied strengths (V/μm) of electric field for driving the developing particles which was applied to the developer DL accommodated between the substrates. The contrast and image irregularity of displayed images were evaluated.

The developer DL1 was used as the developer DL.

The contrast was evaluated by measuring the average image density (Bk av.) of the black portions and the average image density (W av.) of the white portions by a reflection densitometer (product of Konica Corporation, Sakura DENSITMETER PDA-65). The evaluation result was expressed in average density ratio (Bk av./W av.). An average density ratio of 5.0 or more was rated as good (o) and a lower value was rated as poor (x).

To evaluate the image irregularity, the image densities of the white portions were measured using the reflection densitometer to give a difference of image density between the maximum value and minimum value. An image density difference of 0.2 or less was rated as good (o) and the value of more than 0.2 was rated as not good (x).

The strength of electric field applied to the developing particles was determined based on the following potential difference or potentials:

(i) medium D1 a potential difference between the electrode 114a and 115 based on the voltage applied to the independent electrode 114a in the medium D1;

(ii) medium D2 a potential applied to the multi-stylus type direct electrostatic latent image forming device CR3; and (iii) medium D3 a surface potential V of the medium D3 determined by a surface potential meter (product of TREK, INC., Model 344).

In the medium D3, the strength of the electric field was determined from the following equation based on the surface potential V.

$$E = V/[(t_1/\epsilon_1)+(t_2/\epsilon_2)+(t_3/\epsilon_3)]$$

wherein $t_1$ is the thickness of the first substrate, $\epsilon_1$ is the specific dielectric constant thereof, $t_2$ is the thickness of the cell 116 layer (substantially a space between the substrates), $\epsilon_2$ is the specific dielectric constant of cell layer, $t_3$ is the thickness of the second substrate and $\epsilon_3$ is the specific dielectric constant thereof.

The specific dielectric constant $\epsilon_2$ of cell layer is the synthetic value given by calculation from the volume ratio of the developer DL and the air layer in the cell, and the partition wall portions forming the cell.

Figure 15:
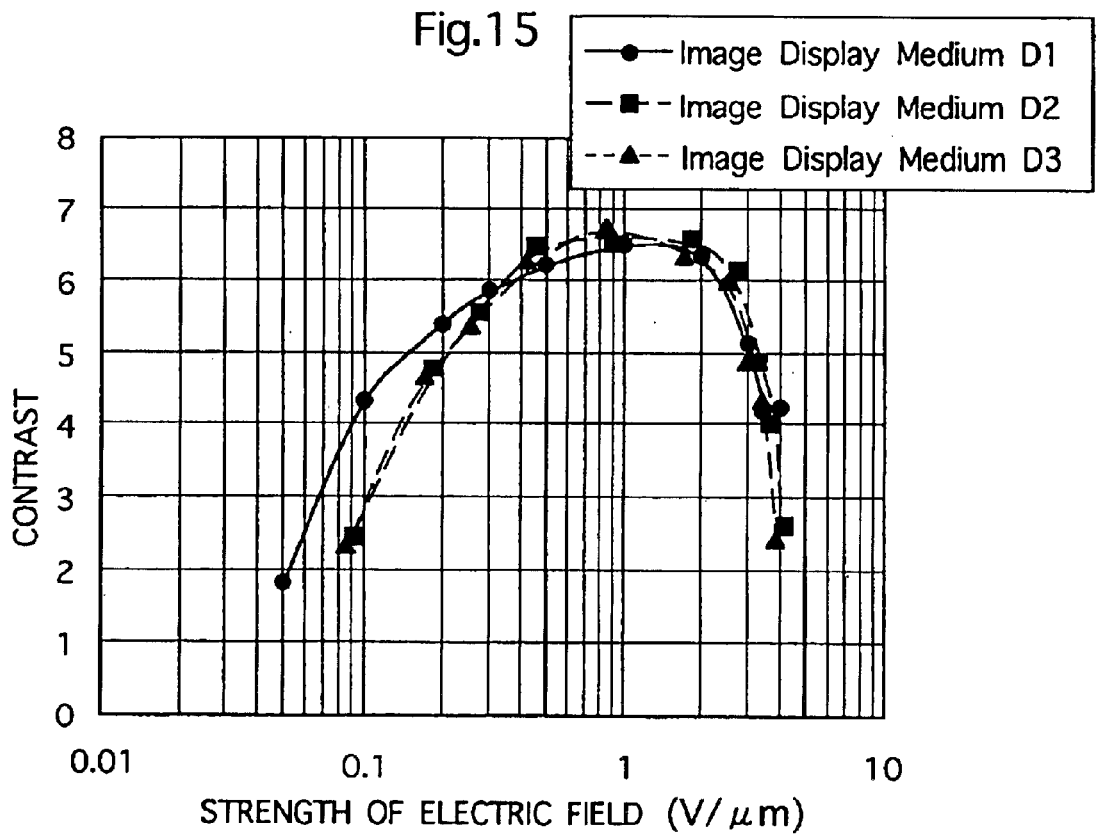
FIG. 15 is a view showing a relationship between the strength of electric field for driving the developing particles and the contrast.

Table 1 shows the evaluation results of the medium D1. Table 2 shows the evaluation results of the medium D2. Table 3 shows the evaluation results of the medium D3. FIG. 15 shows the relation between the strength of electric field for driving the developing particles and the contrast of images.

TABLE 1 reversible image display medium D1

| voltage black portion: negative white portion: positive V | strength of electric field V/μm | black portion | | | white portion | | | contrast Bk av./W. av. ③/⑥ | | image irregularity W max.–W min. ④–⑤ | |
|---|---|---|---|---|---|---|---|---|---|---|---|
| | | maximum density (Bk max.) ① | minimum density (Bk min.) ② | average density (Bk av.) ③ | maximum density (W max.) ④ | minimum density (W min.) ⑤ | average density (W av.) ⑥ | | | | |
| 5 | 0.05 | 1.15 | 0.85 | 1.00 | 0.65 | 0.45 | 0.55 | 1.8 | x | 0.20 | ○ |
| 10 | 0.1 | 1.45 | 1.35 | 1.40 | 0.40 | 0.25 | 0.33 | 4.3 | x | 0.15 | ○ |
| 20 | 0.2 | 1.65 | 1.58 | 1.62 | 0.35 | 0.25 | 0.30 | 5.4 | ○ | 0.10 | ○ |
| 30 | 0.3 | 1.67 | 1.50 | 1.59 | 0.30 | 0.24 | 0.27 | 5.9 | ○ | 0.06 | ○ |
| 50 | 0.5 | 1.65 | 1.52 | 1.59 | 0.28 | 0.23 | 0.26 | 6.2 | ○ | 0.05 | ○ |
| 100 | 1 | 1.63 | 1.49 | 1.56 | 0.26 | 0.22 | 0.24 | 6.5 | ○ | 0.04 | ○ |
| 200 | 2 | 1.61 | 1.50 | 1.56 | 0.27 | 0.22 | 0.25 | 6.3 | ○ | 0.05 | ○ |
| 300 | 3 | 1.58 | 1.45 | 1.52 | 0.34 | 0.25 | 0.30 | 5.1 | ○ | 0.09 | ○ |
| 350 | 3.5 | 1.54 | 1.68 | 1.61 | 0.54 | 0.23 | 0.39 | 4.2 | x | 0.31 | x |
| 400 | 4 | 1.62 | 1.65 | 1.64 | 0.52 | 0.25 | 0.39 | 4.2 | x | 0.27 | x |

TABLE 2 reversible image display medium D2

| voltage black portion: negative white portion: positive V | strength of electric field V/μm | black portion | | | white portion | | | contrast Bk av./W. av. ③/⑥ | | image irregularity W max.–W min. ④–⑤ | |
|---|---|---|---|---|---|---|---|---|---|---|---|
| | | maximum density (Bk max.) ① | minimum density (Bk min.) ② | average density (Bk av.) ③ | maximum density (W max.) ④ | minimum density (W min.) ⑤ | average density (W av.) ⑥ | | | | |
| 10 | 0.09 | 1.32 | 0.92 | 1.12 | 0.55 | 0.36 | 0.46 | 2.5 | x | 0.19 | ○ |
| 20 | 0.18 | 1.48 | 1.25 | 1.37 | 0.32 | 0.25 | 0.29 | 4.8 | x | 0.07 | ○ |
| 30 | 0.28 | 1.65 | 1.52 | 1.59 | 0.35 | 0.22 | 0.29 | 5.6 | ○ | 0.13 | ○ |
| 50 | 0.46 | 1.62 | 1.48 | 1.55 | 0.25 | 0.23 | 0.24 | 6.5 | ○ | 0.02 | ○ |
| 100 | 0.92 | 1.61 | 1.46 | 1.54 | 0.23 | 0.24 | 0.24 | 6.5 | ○ | −0.01 | ○ |
| 200 | 1.85 | 1.59 | 1.50 | 1.55 | 0.25 | 0.22 | 0.24 | 6.6 | ○ | 0.03 | ○ |
| 300 | 2.77 | 1.58 | 1.43 | 1.51 | 0.26 | 0.23 | 0.25 | 6.1 | ○ | 0.03 | ○ |
| 350 | 3.23 | 1.56 | 1.38 | 1.47 | 0.35 | 0.25 | 0.30 | 4.9 | x | 0.10 | ○ |
| 400 | 3.69 | 1.52 | 1.35 | 1.44 | 0.48 | 0.23 | 0.36 | 4.0 | x | 0.25 | x |
| 450 | 4.15 | 1.47 | 1.29 | 1.38 | 0.80 | 0.25 | 0.53 | 2.6 | x | 0.55 | x |

TABLE 3 reversible image display medium D2

| voltage black portion: negative white portion: positive V | strength of electric field V/μm | black portion | | | white portion | | | contrast Bk av./W. av. ③/⑥ | | image irregularity W max.–W min. ④–⑤ | |
|---|---|---|---|---|---|---|---|---|---|---|---|
| | | maximum density (Bk max.) ① | minimum density (Bk min.) ② | average density (Bk av.) ③ | maximum density (W max.) ④ | minimum density (W min.) ⑤ | average density (W av.) ⑥ | | | | |
| 10 | 0.09 | 1.30 | 0.85 | 1.08 | 0.55 | 0.36 | 0.46 | 2.4 | x | 0.19 | ○ |
| 20 | 0.17 | 1.45 | 1.23 | 1.34 | 0.32 | 0.25 | 0.29 | 4.7 | x | 0.07 | ○ |
| 30 | 0.26 | 1.60 | 1.48 | 1.54 | 0.35 | 0.22 | 0.29 | 5.4 | ○ | 0.13 | ○ |
| 50 | 0.43 | 1.59 | 1.49 | 1.54 | 0.25 | 0.24 | 0.25 | 6.3 | ○ | 0.01 | ○ |
| 100 | 0.86 | 1.60 | 1.43 | 1.52 | 0.23 | 0.22 | 0.23 | 6.7 | ○ | 0.01 | ○ |
| 200 | 1.71 | 1.57 | 1.43 | 1.50 | 0.25 | 0.22 | 0.24 | 6.4 | ○ | 0.03 | ○ |
| 300 | 2.57 | 1.55 | 1.40 | 1.48 | 0.26 | 0.23 | 0.25 | 6.0 | ○ | 0.03 | ○ |
| 350 | 3.00 | 1.52 | 1.38 | 1.45 | 0.35 | 0.24 | 0.30 | 4.9 | x | 0.11 | ○ |
| 400 | 3.43 | 1.48 | 1.31 | 1.40 | 0.42 | 0.22 | 0.32 | 4.4 | x | 0.20 | ○ |
| 450 | 3.86 | 1.37 | 1.23 | 1.30 | 0.80 | 0.25 | 0.53 | 2.5 | x | 0.55 | x |

The above evaluation results show that a proper strength of electric field for driving the developing particles is 0.3 V/μm to 3.0 V/μm.

The image evaluation was conducted in the same manner as above in respect of the mediums containing other developers DL2, DL3, with the same results that a proper strength of electric field for driving the developing particles is 0.3 V/μm to 3.0 V/μm.

(II) Examples of application of oscillating magnetic field and the timing of its stop and examples of charging the surface of the medium to carry a potential holding the images.

<Developing Particles and Developer>
White Developing Particles WP

In a Henschel mixer were thoroughly mixed 100 parts by weight of thermoplastic polyester resin (softening point: 121° C., Tg: 67° C.), 40 parts by weight of titanium oxide (Ishihara Sangyo Kaisha, Ltd.: CR-50) and 5 parts by weight of salicylic acid-zinc complex (minus-charge-controlling agent, Orient Chemical Co., Ltd.: Bontron E-84). The mixture was further mixed by a twin-screw extruder and then cooled. The mixture was roughly pulverized, then pulverized by a jet mill and classified with-wind to obtain white fine powder which has a volume average particle size of 10.1 µm. To the white fine powder was added 0.3 parts by weight of hydrophobic silica particles (Nihon Aerosil Co., Ltd.: Aerosil R-972). The mixture was mixed by a Henschel mixer to prepare white developing particles WP.

Black Developing Particles BP

In a Henschel mixer were thoroughly mixed 100 parts by weight of styrene-n-butyl methacrylate resin (softening point: 132° C., Tg: 65° C.), 2 parts by weight of carbon black (Lion Oil & Fat Co., Ltd.: Ketchen Black), 1.5 parts by weight of silica (Nihon Aerosil Co., Ltd.: #200) and 500 parts by weight of magnetic powder containing magnetite (RB-BL, Titan Kogyo Co., Ltd.). The mixture was further mixed by a kneader.

After cooling, the mixture was roughly pulverized by a feather mill, then finely pulverized by a jet mill and classified with wind to obtain black magnetic particles BP which have a volume average particle size of 25 µm.

Preparation of Developer DL

The white particles WP (30 g) and the black particles BP (70 g) were placed into a polyethylene bottle. The bottle was rotated by a ball mill pedestal to mix them for 30 minutes to obtain a developer DL. The white developing particles WP were negatively charged and black developing particles BP were positively charged.

<Reversible Image Display Medium D1x>

The reversible image display medium D1x is similar to the medium 14 shown in FIG. 8(A). Namely in the medium 14, it has a transparent electrode in common with all pixels on the internal surface of the second substrate 112 and an independent electrode for each cell 116 on the internal surface of the first substrate 111 on the image observation side.

A UV curing resin film of 150 µm in thickness was formed on an electrically conductive film (a common electrode) formed of ITO (transparent electrode) on a transparent glass substrate 112. Over the resin film was laid a photomask opened in a specified pattern which was then irradiated with ultraviolet light, followed by development and washing. Then, over the electrode of the glass substrate 112 were formed a plurality of continuous partition walls 113a extending in parallel. The partition wall 113a had a thickness (width) α (50 µm), a height h (150 µm), and a wall space pt (300 µm) between the neighbouring partition walls.

Thereafter, the foregoing developer DL was placed into each of the continuous groove-like cells between the neighboring partition walls on the substrate 112. The developer was placed into the cells at a fill factor of 34 vol. % based on the volume of the cell.

A glass substrate was prepared as the first substrate 111. On the glass substrate 111 were formed transparent independent electrodes in positions corresponding to the cells 116. On the glass substrate 111 were also formed lead portions connected to the independent electrodes in positions corresponding to the walls 113a.

A photo-curing adhesive was applied to a small thickness only to the top of each partition wall 113a on the substrate 112. The substrate 111 was laid on the adhesive on the partition walls 113a with the independent electrodes directed to the cells. Thus the adhesive was cured by UV irradiation. Thereafter, the peripheries of the two glass substrates were sealed by a sealer.

In this way, a medium D1x which was similar to the medium shown in FIG. 8(A) was produced.

<Image Display Using the Medium D1x>

The magnet plate MG1 shown in FIG. 19 was disposed under the second substrate 112 having the common electrode in the medium D1x. Then the same image forming apparatus as shown in FIG. 1 was connected to the independent electrodes of the substrate 111 on the image observation side.

The magnet plate MG1 was a rubber magnet plate having a surface magnetic force of 300 gausses. The magnet plate MG1 was capable of achieving vibrational drive in parallel with the medium by a drive device DR1.

In image display, each of the independent electrodes was supplied with +200V or −200V according to the images to be formed. The common electrode was set to a ground potential, and the magnet plate MG1 was oscillated. The oscillating magnetic field was applied to the medium, whereby the stirring force was applied to the developer in the cells.

Thus, after image formation, the oscillation of magnet plate MG1 was stopped and the oscillating magnetic field was stopped. Thereafter the application of voltage to each independent electrode was stopped.

The image density of the images formed in this way was measured from above the glass substrate using a reflection densitometer (product of X-Rite Incorporated, 310 TR, aperture diameter 2 mm). The black display portion had a reflection density of 1.7 and the white display portion had a reflection density of 0.2. Therefore, the images were confirmed as good.

A comparative image display was also performed. In the comparative image display, after the formation of images, the application of voltage to each independent electrode was stopped first and then the application of oscillating magnetic field was stopped.

The image density of the images formed in this way was also measured in the same manner as above, and it was found that the black display portion had a reflection density of 0.9 and the white display portion had a reflection density of 0.7.

This shows that it is preferred to substantially stop the application of oscillating magnetic field after image display during application of electrostatic field for image display.

<Reversible Image Display Medium D2x>

A reversible image display medium of the same type as the medium 15' shown in FIG. 10(B) was prepared as follows.

A transparent PET (polyethylene terephthalate) film was pressed by thermal pressing molding method to give a plurality of continuous partition walls 113a on a base portion of 25 µm thickness corresponding to the first substrate 111. The continuous partition walls 113a had a wall thickness (width) α (20 µm), a height h (100 µm) and a space pt (200 µm) between adjacent partition walls.

The developer DL was placed into each of the continuous groove-like cell 116 between the neighboring partition walls 113a on the substrate 111. The developer was placed into the continuous groove-like cell at a fill factor of 34 vol. % based on the volume of the continuous groove-like cell.

A photo-curing adhesive was applied to a small thickness only to the top of the partition walls 113a of the substrate 111. Then, a PET film of 30 µm thickness having an electrically conductive film of aluminum 112A formed over its external surface by deposition as the second substrate 112 was adhered to the adhesive over its internal surface. The adhesive was cured by UV irradiation to adhere the film.

Thereafter, the peripheries of the first and second substrates 111, 112 were heat-sealed.

In this way, a medium D2x of the type shown in FIG. 10(B) was produced.

<(1) Image Display Using the Medium D2x>

Description is given on the image display using the medium D2x (Experimental Examples 1x to 9x) and on comparative image display (Comparative Examples 1x to 11x).

The image forming apparatus shown in FIG. 16 was used for image display by the medium D2x.

In the image forming apparatus shown in FIG. 16, the surface of the photosensitive drum PC was charged by the charger CH to carry a negative surface potential $V_0$ and the image exposure was performed to the charged region by the image exposing device EX to form an electrostatic latent image E1. On the other hand, $V_0/2$ was applied from the power source PW1' to the electrically conductive film 112A of the medium D2x fed thereto.

Thus, the medium D2x was sent between the drum PC and the rotary magnetic pole roller R2 forming the oscillating magnetic field in synchronization with the electrostatic latent image on the drum PC. An electrostatic field for image display and an oscillating magnetic field were applied to the medium D2x thus fed so that image display was performed successively as the medium D2x was transported. The image-displayed portion of the medium D2x was transported as passed between the drum PC and the supporting roller RX while it was contacted with the surface of the drum PC, in other words, the electrostatic field based on the electrostatic latent image E1 was applied but the oscillating magnetic field was decreased.

Herein image display was conducted by changing the magnetic force in a position A shown in FIG. 16 wherein the medium D2x was separated from the drum PC. The magnetic force was varied by changing the surface magnetic force of the roller R2 from 300 gausses to 1000 gausses and/or changing the distance between the roller R2 and the roller RX.

Further, image display was effected by varying the electric field strength to be applied to the developer in the medium D2x due to change of the charged surface potential of photosensitive drum by the charger CH. The potential difference V acting on the upper side and underside of the medium D2x is a difference between the surface potential of photosensitive drum and the bias by the power source PW1'. The electric field strength E to be applied to the developer in the developer-accommodating cells was employed, which is given by calculation of the following equation:

$$E=V/[(t_1/\epsilon_1)+(t_2/\epsilon_2)+(t_3/\epsilon_3)]$$

wherein $t_1$ is the thickness of the substrate on the image observation side, $\epsilon_1$ is the specific dielectric constant thereof, $t_2$ is the thickness of the developer-accommodating cell layer (substantially a space between the substrates), $\epsilon_2$ is the specific dielectric constant of cell layer, $t_3$ is the thickness of the opposite substrate and $\epsilon_3$ is the specific dielectric constant thereof.

The specific dielectric constant $\epsilon_2$ of cell layer is the synthetic value given by calculation from the volume ratio of the developer DL and the air layer in the cell, and the partition wall portions forming the cell.

Measurements were made of the reflection density (that of black Bk) of solid portion (black portion) of formed images and the reflection density (W reflection density) of white portion of the background portion to give a reflection density ratio [B(Bk)/W], whereby the images were evaluated. The reflection density was measured using a reflection densitometer (product of X-Rite Incorporated, 310 TR, aperture diameter 2 mm).

A reflection density ratio (B/W) of 5.0 or more was rated as good (o) and that of less than 5.0 was rated as unsatisfactory in contrast (x).

The results of image evaluation are shown in Table 4 together with the magnetic force (gauss) at a position A and electric field strength E (V/µm) applied to the developer.

The magnetic force in a position A was measured with a gauss meter manufactured by Denshijiki Industry Co., Ltd.

TABLE 4

| | magnetic force in position A (gauss) | strength of electric field (V/µm) | Bk reflection density | W reflection density | B/W image density ratio | evaluation of B/W image density ratio |
|---|---|---|---|---|---|---|
| comparative example 1 | 200 | 2 | 0.95 | 0.83 | 1.1 | x |
| comparative example 2 | 200 | 1 | 0.95 | 0.86 | 1.1 | x |
| comparative example 3 | 200 | 0.5 | 0.98 | 0.84 | 1.2 | x |
| comparative example 4 | 200 | 0.3 | 0.97 | 0.85 | 1.1 | x |
| comparative example 5 | 150 | 2 | 0.93 | 0.82 | 1.1 | x |
| comparative example 6 | 150 | 1 | 0.94 | 0.8 | 1.2 | x |
| comparative example 7 | 150 | 0.5 | 0.95 | 0.83 | 1.1 | x |
| comparative example 8 | 150 | 0.3 | 0.92 | 0.81 | 1.1 | x |
| example 1 | 100 | 2 | 1.35 | 0.24 | 5.6 | o |
| example 2 | 100 | 1 | 1.34 | 0.25 | 5.4 | o |
| example 3 | 100 | 0.5 | 1.32 | 0.24 | 5.5 | o |

TABLE 4-continued

|  | magnetic force in position A (gauss) | strength of electric field (V/μm) | Bk reflection density | W reflection density | B/W image density ratio | evaluation of B/W image density ratio |
|---|---|---|---|---|---|---|
| comparative example 9 | 100 | 0.3 | 1.1 | 0.5 | 2.2 | x |
| example 4 | 50 | 2 | 1.45 | 0.2 | 7.3 | o |
| example 5 | 50 | 1 | 1.42 | 0.22 | 6.5 | o |
| example 6 | 50 | 0.5 | 1.25 | 0.23 | 5.4 | o |
| comparative example 10 | 50 | 0.3 | 1.15 | 0.35 | 3.3 | x |
| example 7 | 0 | 2 | 1.45 | 0.2 | 7.3 | o |
| example 8 | 0 | 1 | 1.43 | 0.21 | 6.8 | o |
| example 9 | 0 | 0.5 | 1.4 | 0.25 | 5.6 | 0 |
| comparative example 11 | 0 | 0.3 | 1.15 | 0.35 | 3.3 | x |

As clear from Table 4, in Experimental Examples 1x to 9x, the electric field strength applied to the developer was 0.5 V/μm or more, and the magnetic force was 100 gausses or less in the oscillating magnetic field in the position A (gauss) in which the application of electrostatic field was stopped, and images in good contrast were obtained. On the other hand, in Comparative Experimental Examples 1x to 11x, the electric field strength applied to the developer was less than 0.5 V/μm or the magnetic force was more than 100 gausses in the oscillating magnetic field in the position A wherein the application of electrostatic field was stopped. Images which were satisfactory in contrast were not obtained.

It is evident from the above that good images are obtained when the electric field strength applied to the developer is preferably 0.5 V/μm or more and preferably the application of oscillating magnetic field is substantially stopped during application of electrostatic field.

<(2) Image Display Using the Medium D2x>

First, using the image forming apparatus shown in FIG. 16, an image display was performed on each of a plurality of mediums D2x at a charged potential of −400V on the surface of photosensitive drum by the charger CH and at a bias voltage of −200 from the power source PW1' with use of the roller R2 having a surface magnetic force of 600 gausses. Each of the mediums D2x displayed images which showed a Bk reflection density of 1.45, W reflection density of 0.2 and reflection density ratio (B/W) of 7.3.

The surfaces of the mediums D2x except one medium D2x on the image observation side were charged to carry various potentials by the charger shown in FIG. 17. Thereafter the change of images were checked by applying a mechanical oscillation to the medium D2x.

The mechanical oscillation was applied by applying the mechanical oscillation 5 times with a weight of 20 g from a height of 45 degrees as a pendulum of 15 cm in radius from the side of the medium D2x.

The change of images was checked after applying the mechanical oscillation. The Bk reflection density of solid portion of formed images and the W reflection density of the background portion were measured, followed by determination of a reflection density ratio [B(Bk)/W]. The reflection density was measured using a reflection densitometer as described above (product of X-Rite Incorporated, 310 TR, aperture diameter 2 mm).

A reflection density ratio (B/W) of 5.0 or more was rated as suppressed image change (mark o) and that of less than 5.0 was deemed to suffer disturbance of images (mark x). The evaluation results are shown in Table 5.

TABLE 5

| charged potential [V] | Bk reflection density | W reflection density | B/W image density ratio | evaluation result |
|---|---|---|---|---|
| — | 0.95 | 0.83 | 1.1 | x |
| 0 | 1.45 | 0.27 | 5.4 | o |
| 50 | 1.45 | 0.29 | 5.0 | o |
| 150 | 0.9 | 0.25 | 3.6 | x |
| −150 | 1.45 | 0.82 | 1.8 | x |

As apparent from Table 5, the image display medium sent from the image forming apparatus was increased in image-retaining stability by being charged to 100V or less in terms of the absolute value.

Further, it is clear that when the medium was charged to have the same polarity as the magnetic developing particles, the contrast can be properly retained.

The same can be said about the mediums of the same type as the mediums 11, 12, 12', 13, 14 and 15.

(III) Examples of initialization of medium before image display

<Developing Particles and Developer>

White Developing Particles WP

In a Henschel mixer were thoroughly mixed 100 parts by weight of thermoplastic polyester resin (softening point: 121° C., Tg: 67° C.), 40 parts by weight of titanium oxide (Ishihara Sangyo Kaisha, Ltd.: CR-50) and 5 parts by weight of salicylic acid-zinc complex (minus-charge-controlling agent, Orient Chemical Co., Ltd.: Bontron E-84). The mixture was further mixed by a twin-screw extruder and then cooled. The mixture was roughly pulverized, then pulverized by a jet mill and classified with wind to obtain white fine powder which have a volume average particle size of 12 μm. To the white fine powder was added 0.3 parts by weight of hydrophobic silica particles (Nihon Aerosil Co., Ltd.: Aerosil R-972). The mixture was mixed by a Henschel mixer to prepare white developing particles WP.

Black Developing Particles BP

In a Henschel mixer were thoroughly mixed 100 parts by weight of styrene-n-butyl methacrylate resin (softening point: 132° C., Tg: 65° C.), 2 parts by weight of carbon black (Lion Oil & Fat Co., Ltd.: Ketchen Black), 1.5 parts by weight of silica (Nihon Aerosil Co., Ltd.: #200) and 500 parts by weight of magnetic powder containing magnetite (RB-BL, Titan Kogyo Co., Ltd.). The mixture was further mixed by a kneeder.

After cooling, the mixture was roughly pulverized by a feather mill, then finely pulverized by a jet mill and classified with wind to obtain black magnetic particles BP which have a volume average particle size of 25 μm.

Preparation of Developer DL

The white particles WP (30 g) and the black particles BP (70 g) were placed into a polyethylene bottle. The bottle was rotated by a ball mill pedestal to perform the mixing and stirring for 30 minutes to obtain a developer. The white developing particles WP were negatively charged and black developing particles BP were positively charged in the developer.

<Reversible Image Display Medium D1y>

A reversible image display medium of the same type as the medium 14 shown in FIG. 8(A) was prepared as follows.

A transparent PET (polyethylene terephthalate) film was pressed by thermal pressing molding method to give a plurality of continuous partition walls 113a on a base portion of 25 μm thickness corresponding to the first substrate 111. The continuous partition wall 113a had a wall thickness (width) α (30 μm), a height h (100 μm) and a space pt (500 μm) between adjacent partition walls.

The developer DL was placed into each of the continuous groove-like cells 116 between the neighboring partition walls 113a on the substrate 111. The volume proportion of the developer placed into the continuous groove-like cell was 30 vol. % based on the volume of the cell.

A photo-curing adhesive was applied to a small thickness only to the top of the partition walls 113a on the substrate 111. Then a second substrate 112 formed of a transparent PET film of 25 m thickness containing carbon black was closely laid on the adhesive over its internal surface. The PET film was adhered thereto by curing the adhesive by UV irradiation.

Thereafter, the peripheries of the substrates 111, 112 were heat-sealed.

In this way, a medium D1y of the type shown in FIG. 8(A) was produced.

<Reversible Image Forming Medium D2y>

A reversible image display medium of the same type as the medium 11 with electrodes as shown in FIG. 1 was prepared as follows.

A photoresist was applied to a transparent ITO film on the entire surface of a transparent PET (polyethylene terephthalate) film of 50 μm in thickness as the first substrate. Over the photoresist was laid a photomask opened in a specified pattern which was then irradiated with light, followed by development and etching. Then the remaining photoresist was peeled off for removal. A first electrode pattern was formed in which square pixel electrodes 114a (see FIG. 4) measuring 1 mm and 1 mm were arranged as in a checkerboard with the squares spaced from each other by 0.1 mm in such a way that lead portions 110 (see FIG. 4) are disposed between and connected to the pixel electrodes.

A resist was repeatedly applied to increased thickness to other portions than the square electrodes 114a on the substrate 111 to form a grid-like partition member 113 (see FIG. 3). The partition walls 113a forming the partition member 113 had a thickness (width) α (0.1 mm), a height h (100 μm), and a wall space (1 mm)(corresponding to one side of the independent electrode 114a).

An ITO film was formed as a second electrode 115 by a sputtering method to a thickness of 500 Å over the entire surface of the second substrate 112 formed of a transparent PET film of 50 μm in thickness.

Then, the developer DL was placed into each square cavity surrounded with the partition wall of the first substrate 111. The volume proportion of the developer placed into the cavity was 30% based on the volume of the cavity.

A photo-curing adhesive 119a (see FIG. 1) was applied to a small thickness only to the top of the partition member 113 after which the ITO electrode 115 side of the second substrate 112 was laid on the top. Then the adhesive was cured by UV irradiation.

Thereafter, the peripheries of the first and second substrates 111, 112 were sealed by an epoxy resin adhesive 119b (see FIG. 1).

In this way, a medium D2y of the type shown in FIG. 1 was produced.

<Image Display Using the Medium D1y>

A plurality of mediums D1y were provided. Image display was performed as described below using each medium D1y by the image forming apparatus shown in FIG. 18(A).

In formation of each image, the surface of the photosensitive drum PC was uniformly charged by the charger CH to −900V. The image exposure was performed to the charged region by the image exposing device EX and the surface potential in the exposed region was reduced to about −50V to form an electrostatic latent image E1.

On the other hand, the medium D1y thus fed was supplied with an alternating electric field (AC voltage) by the initializing device IN to stir the developer DL in the medium, whereby the medium D1y was initialized and the surface of the medium D1y was uniformly charged by the charger CRH to have a polarity of about +400V opposite to the charged polarity of the surface of photosensitive drum before image display.

Subsequently, the medium D1y was passed between the drum PC and the opposite electrode roller (transfer roller) R1 in synchronization with the electrostatic latent image E1 formed on the drum PC. The roller R1 of about $10^8 \Omega$ in resistance was used and a transfer bias voltage of about +1300V was applied to the roller R1 from the power source PW1.

In this way, the electrostatic latent image was transferred to the surface of the medium D1y at about −300V in the image portion (black portion) and at about +300V in the background portion (white portion).

The medium D1y carrying the electrostatic latent image as described above was passed above the magnet plate MG, whereby the developer DL containing magnetic developing particles BP was subjected to agitation by the oscillating magnetic field, thereby facilitating the movement of developing particles to achieve image display.

Each of the mediums D1y with the images formed as above was initialized under varied conditions for applying the alternating electric field (AC electric field) by the initializing device such as the electric field strength, and the frequency and (frequency×application time (period)).

More specifically, the conditions include the electric field strength in the range of 0.1 V/μm to 1.0 V/μmK, the frequency in the range of 100 Hz to 10 kHz and (frequency× application time) comprising combinations of frequency of 100 Hz to 5 kHz with 5 ms to 200 ms.

The presence or absence of remaining images on the medium D1y immediately after initialization and uncharged by the charger CRH before image display, i.e. the degree of initialization, was determined.

If the maximum image reflection density and the minimum image reflection density are both in the range of 0.7 to 0.8, it means the sufficient erasure of last images and achievement of the desired initialization (◯), whereas if at least one of the maximum image reflection density and the minimum image reflection density is outside this range, it means insufficiency of initialization (X). The evaluation results are shown in Tables 6 and 7.

The image density was measured by a reflection densitometer (product of Konica Corporation, Sakura DENSITMETER PDA-65).

The electric field strength was determined according to the following equation:

$$E = V/[(t_1/\epsilon_1) + (t_2/\epsilon_2) + (t_3/\epsilon_3)]$$

wherein E is an electric field strength, V is a surface potential of the medium D1y (the measured value obtained by a surface potential meter, product of TREK, INC., Model 344), $t_1$ is the thickness of the substrate on the observation side, $\epsilon_1$ is the specific dielectric constant thereof, $t_2$ is the thickness of the developer-accommodating cell layer 116 (substantially a space between the substrates), $\epsilon_2$ is the specific dielectric constant of the cell layer, $t_3$ is the thickness of the substrate on the opposite side and $\epsilon_3$ is the specific dielectric constant thereof.

The specific dielectric constant $\epsilon_2$ of the cell layer was 1.5 in terms of synthetic value given by calculating the volume ratio of the developer DL and the air layer in the cell, and the partition wall portions forming the cell.

TABLE 6

| | strength of alternating electric field | | | | | | | | |
|---|---|---|---|---|---|---|---|---|---|
| | frequency (Hz) | | | | | | | | |
| | 100 | | | 500 | | | 1k | | |
| strength of electric field (V/μm) | image density | | remaining images | image density | | remaining images | image density | | remaining images |
| | maximum | minimum | | maximum | minimum | | maximum | minimum | |
| 0.1 | 1.67 | 0.20 | x | 1.65 | 0.21 | x | 1.67 | 0.22 | x |
| 0.2 | 1.55 | 0.21 | x | 1.51 | 0.26 | x | 1.52 | 0.23 | x |
| 0.3 | 1.01 | 0.42 | x | 0.99 | 0.40 | x | 1.03 | 0.46 | x |
| 0.4 | 0.82 | 0.65 | x | 0.82 | 0.63 | x | 0.81 | 0.62 | x |
| 0.5 | 0.79 | 0.71 | ○ | 0.78 | 0.71 | ○ | 0.79 | 0.71 | ○ |
| 0.6 | 0.78 | 0.70 | ○ | 0.77 | 0.71 | ○ | 0.79 | 0.72 | ○ |
| 0.7 | 0.78 | 0.72 | ○ | 0.77 | 0.72 | ○ | 0.76 | 0.74 | ○ |
| 0.8 | 0.77 | 0.74 | ○ | 0.76 | 0.73 | ○ | 0.77 | 0.74 | ○ |
| 0.9 | 0.76 | 0.75 | ○ | 0.77 | 0.74 | ○ | 0.76 | 0.73 | ○ |
| 1.0 | 0.76 | 0.74 | ○ | 0.76 | 0.74 | ○ | 0.77 | 0.73 | ○ |

| | strength of alternating electric field | | | | | | | | |
|---|---|---|---|---|---|---|---|---|---|
| | frequency dependency | | | | | | | | |
| | frequency (Hz) | | | | | | | | |
| | 2k | | | 3k | | | 4k | | |
| strength of electric field (V/μm) | image density | | remaining images | image density | | remaining images | image density | | remaining images |
| | maximum | minimum | | maximum | minimum | | maximum | minimum | |
| 0.1 | 1.66 | 0.22 | x | 1.63 | 0.24 | x | 1.65 | 0.22 | x |
| 0.2 | 1.46 | 0.26 | x | 1.55 | 0.22 | x | 1.61 | 0.24 | x |
| 0.3 | 0.95 | 0.50 | x | 1.20 | 0.55 | x | 1.25 | 0.58 | x |
| 0.4 | 0.85 | 0.67 | x | 0.83 | 0.65 | x | 0.86 | 0.65 | x |
| 0.5 | 0.78 | 0.72 | ○ | 0.79 | 0.73 | ○ | 0.78 | 0.71 | ○ |
| 0.6 | 0.78 | 0.72 | ○ | 0.79 | 0.73 | ○ | 0.76 | 0.72 | ○ |
| 0.7 | 0.77 | 0.73 | ○ | 0.77 | 0.74 | ○ | 0.77 | 0.71 | ○ |
| 0.8 | 0.77 | 0.73 | ○ | 0.78 | 0.73 | ○ | 0.77 | 0.72 | ○ |
| 0.9 | 0.76 | 0.74 | ○ | 0.77 | 0.74 | ○ | 0.76 | 0.72 | ○ |
| 1.0 | 0.76 | 0.74 | ○ | 0.78 | 0.75 | ○ | 0.77 | 0.73 | ○ |

| | frequency (Hz) | | | | | | | | |
|---|---|---|---|---|---|---|---|---|---|
| | 5k | | | 6k | | | 7k | | |
| strength of electric field (V/μm) | image density | | remaining images | image density | | remaining images | image density | | remaining images |
| | maximum | minimum | | maximum | minimum | | maximum | minimum | |
| 0.1 | 1.64 | 0.20 | x | 1.64 | 0.20 | x | 1.66 | 0.22 | x |
| 0.2 | 1.54 | 0.21 | x | 1.60 | 0.21 | x | 1.59 | 0.22 | x |
| 0.3 | 1.02 | 0.46 | x | 1.26 | 0.40 | x | 1.35 | 0.35 | x |
| 0.4 | 0.88 | 0.59 | x | 0.89 | 0.55 | x | 0.94 | 0.44 | x |
| 0.5 | 0.79 | 0.70 | ○ | 0.81 | 0.65 | x | 0.91 | 0.60 | x |
| 0.6 | 0.79 | 0.70 | ○ | 0.81 | 0.69 | x | 0.85 | 0.65 | x |
| 0.7 | 0.78 | 0.71 | ○ | 0.79 | 0.69 | x | 0.86 | 0.63 | x |
| 0.8 | 0.79 | 0.72 | ○ | 0.82 | 0.71 | x | 0.84 | 0.66 | x |

TABLE 6-continued

| | | | | | | | | |
|---|---|---|---|---|---|---|---|---|
| 0.9 | 0.78 | 0.73 | ○ | 0.81 | 0.68 | x | 0.81 | 0.68 | x |
| 1.0 | 0.77 | 0.72 | ○ | 0.79 | 0.69 | x | 0.81 | 0.66 | x |

| | frequency (Hz) | | | | | | | | |
|---|---|---|---|---|---|---|---|---|---|
| | 8k | | | 9k | | | 10k | | |
| strength of electric field (V/μm) | image density | | remaining images | image density | | remaining images | image density | | remaining images |
| | maximum | minimum | | maximum | minimum | | maximum | minimum | |
| 0.1 | 1.65 | 0.21 | x | 1.64 | 0.22 | x | 1.63 | 0.22 | x |
| 0.2 | 1.61 | 0.21 | x | 1.60 | 0.22 | x | | | |
| 0.3 | 1.40 | 0.33 | x | 1.55 | 0.31 | x | 1.60 | 0.23 | x |
| 0.4 | 1.10 | 0.41 | x | 1.22 | 0.36 | x | 1.55 | 0.29 | x |
| 0.5 | 0.95 | 0.45 | x | 1.10 | 0.43 | x | 1.35 | 0.35 | x |
| 0.6 | 0.91 | 0.47 | x | 1.05 | 0.44 | ○ | 1.16 | 0.41 | x |
| 0.7 | 0.91 | 0.45 | x | 1.01 | 0.44 | x | 1.11 | 0.41 | x |
| 0.8 | 0.89 | 0.47 | x | 0.99 | 0.48 | x | 1.15 | 0.43 | x |
| 0.9 | 0.87 | 0.49 | x | 0.97 | 0.47 | x | 1.13 | 0.43 | x |
| 1.0 | 0.88 | 0.51 | x | 0.97 | 0.48 | x | 1.10 | 0.42 | x |

TABLE 7

| | oscillation dependency | | | | | | | | |
|---|---|---|---|---|---|---|---|---|---|
| | application time (ms) | | | | | | | | |
| | 5 | | | 10 | | | 20 | | |
| | image density | | remaining images | image density | | remaining images | image density | | remaining images |
| frequency (Hz) | maximum | minimum | | maximum | minimum | | maximum | minimum | |
| 100 | 1.57 | 0.26 | x | 1.51 | 0.27 | x | 1.41 | 0.28 | x |
| 500 | 1.40 | 0.29 | x | 1.26 | 0.31 | x | 0.88 | 0.59 | x |
| 1k | 1.28 | 0.33 | x | 0.87 | 0.56 | x | 0.77 | 0.73 | ○ |
| 2k | 0.89 | 0.61 | x | 0.77 | 0.73 | ○ | 0.76 | 0.73 | ○ |
| 5k | 0.76 | 0.74 | ○ | 0.77 | 0.74 | ○ | 0.76 | 0.74 | ○ |

| | strength of electric field: 1V/μm (fixed) | | | | | | | | |
|---|---|---|---|---|---|---|---|---|---|
| | application time (ms) | | | | | | | | |
| | 30 | | | 40 | | | 50 | | |
| | image density | | remaining images | image density | | remaining images | image density | | remaining images |
| frequency (Hz) | maximum | minimum | | maximum | minimum | | maximum | minimum | |
| 100 | 1.38 | 0.29 | x | 1.35 | 0.31 | x | 1.27 | 0.33 | x |
| 500 | 0.82 | 0.68 | x | 0.78 | 0.73 | ○ | 0.77 | 0.74 | ○ |
| 1k | 0.77 | 0.74 | ○ | 0.76 | 0.74 | ○ | 0.77 | 0.74 | ○ |
| 2k | 0.77 | 0.73 | ○ | 0.78 | 0.73 | ○ | 0.76 | 0.74 | ○ |
| 5k | 0.78 | 0.76 | ○ | 0.77 | 0.74 | ○ | 0.76 | 0.74 | ○ |

| | application time (ms) | | | | | | | | |
|---|---|---|---|---|---|---|---|---|---|
| | 60 | | | 70 | | | 80 | | |
| | image density | | remaining images | image density | | remaining images | image density | | remaining images |
| frequency (Hz) | maximum | minimum | | maximum | minimum | | maximum | minimum | |
| 100 | 1.19 | 0.36 | x | 1.11 | 0.40 | x | 0.99 | 0.47 | x |
| 500 | 0.77 | 0.74 | ○ | 0.76 | 0.73 | ○ | 0.76 | 0.74 | ○ |
| 1k | 0.76 | 0.73 | ○ | 0.76 | 0.74 | ○ | 0.77 | 0.73 | ○ |
| 2k | 0.76 | 0.74 | ○ | 0.77 | 0.74 | ○ | 0.76 | 0.74 | ○ |
| 5k | 0.76 | 0.73 | ○ | 0.76 | 0.74 | ○ | 0.77 | 0.74 | ○ |

TABLE 7-continued

| | oscillation dependency application time (ms) | | | | | | | | |
|---|---|---|---|---|---|---|---|---|---|
| | 90 | | | 100 | | | 200 | | |
| | image density | | remain- | image density | | remain- | image density | | remain- |
| frequency (Hz) | maxi-mum | mini-mum | ing images | maxi-mum | mini-mum | ing images | maxi-mum | mini-mum | ing images |
| 100 | 0.95 | 0.51 | x | 0.88 | 0.59 | x | 0.78 | 0.74 | o |
| 500 | 0.77 | 0.74 | o | 0.78 | 0.74 | o | 0.76 | 0.74 | o |
| 1k | 0.77 | 0.73 | o | 0.76 | 0.74 | o | 0.78 | 0.75 | o |
| 2k | 0.76 | 0.73 | o | 0.77 | 0.73 | o | 0.77 | 0.74 | o |
| 5k | 0.76 | 0.73 | o | 0.77 | 0.74 | o | 0.76 | 0.74 | o |

Tables 6 and 7 show:
(1) Images can be properly formed when the strength of alternating electric field to be applied to the developer in the medium, i.e. the strength of alternating electric field to be applied to the space in the developer-accommodating cell, is 0.5 V/μm or more;
(2) Images can be properly formed when the frequency of alternating electric field to be applied is 5 kHz or less; and
(3) Images can be properly formed when the value of (frequency [KHz]×time [ms] for application of alternating electric field)=20 or more.

Good images were formed under these conditions using the medium D1y by the image forming apparatus of FIG. 18(A) as described above.

The strength of alternating electric field to be applied for initialization may be the same when using the image display mediums of the same type as the mediums 11, 12, 12', 13, 15 and 15'.

In respect of the medium D2y of the same type as the medium 11, the second electrode 115 was set to carry a ground potential using the image forming apparatus shown in FIGS. 1 and 2. The independent electrodes 114a corresponding to the pixels to be displayed in black were supplied with a negative voltage, and the independent electrodes 114a corresponding to the pixels to be displayed in white were supplied with a positive voltage. In this way, the independent electrodes 114a were supplied with a voltage corresponding to the display data for image display. Good images were obtained by applying an alternating electric field as in the case of the medium D1y before image display.

In the case of the medium D1y, for adjustment of alternating electric field strength E to 0.5 V/μm, a voltage of about 60 V ($V_{pp}$ about 120 V) was needed to be applied to the charging brush ch1 from the power source Pwa. If change can be made of any one of the specific dielectric constant of the substrate and the thickness thereof, and the specific dielectric constant of the cell layer and the thickness thereof, the voltage value to be applied to the charging brush ch1 may be correspondingly changed to achieve an electric field strength of 0.5 V/μm or more.

(IV) Examples of applying a magnetic stirring force to the developer before and/or in image display step
<Developing Particles and Developer>
White Developing Particles WP In a Henschel mixer were thoroughly mixed 100 parts by weight of thermoplastic polyester resin (softening point: 121° C., Tg: 67° C.), 40 parts by weight of titanium oxide (Ishihara Sangyo Kaisha, Ltd.: CR-50) and 5 parts by weight of salicylic acid-zinc complex (minus-charge-controlling agent, Orient Chemical Co., Ltd.: Bontron E-84). The mixture was further mixed by a twin-screw extruder and then cooled. The mixture was roughly pulverized, then pulverized by a jet mill and classified with wind to obtain a white fine powder which has a volume average particle size of 12 μm. To the white fine powder was added 0.3 parts by weight of hydrophobic silica particles (Nihon Aerosil Co., Ltd.: Aerosil R-972). The mixture was mixed by a Henschel mixer to prepare white developing particles WP.

Black Developing Particles BP

In a Henschel mixer were thoroughly mixed 100 parts by weight of styrene-n-butyl methacrylate resin (softening point: 132° C., Tg: 65° C.), 2 parts by weight of carbon black (Lion Oil & Fat Co., Ltd.: Ketchen Black), 1.5 parts by weight of silica (Nihon Aerosil Co., Ltd.: #200) and 500 parts by weight of magnetic powder containing magnetite (RB-BL, Titan Kogyo Co., Ltd.). The mixture was further mixed by a kneader and then cooled.

The mixture was roughly pulverized by a feather mill, then finely pulverized by a jet mill and classified with wind to obtain black particles BP which have a volume average particle size of 25 μm.

Preparation of Developer DL

The white particles WP (30 g) and the black particles BP (70 g) were placed into a polyethylene bottle. The bottle was rotated by a ball mill pedestal to perform the kneading and mixing for 30 minutes to obtain a developer. The white developing particles WP were negatively charged and black developing particles BP were positively charged in the developer.

<Reversible Image Display Medium D1z>

A reversible image display medium of the same type as the medium 14 shown in FIG. 8(A) was prepared as follows.

A transparent PET (polyethylene terephthalate) film was molded by thermal pressing molding method to give a plurality of continuous partition walls 113a on a base portion of 25 μm thickness corresponding to the first substrate 111. The continuous partition wall 113a had a wall thickness (width) α (30 μm), a height h (100 μm) and a space pt (500 μm) between adjacent partition walls.

The developer DL was placed into each of the continuous groove-like cells 116 between the neighboring partition walls 113a on the substrate 111. The developer was placed into the continuous groove-like cell at a volume ratio of 30 vol. % based on the volume of the continuous groove-like cell.

A photo-curing adhesive was applied to a small thickness only to the top of the partition walls 113a of the substrate 111. Then, a PET film of 25 μm thickness containing carbon black as the second substrate 112 was closely laid on the adhesive over its internal surface. The adhesive was cured by UV irradiation to adhere the film.

Thereafter, the peripheries of the first and second substrates 111, 112 were heat-sealed.

In this way, a medium D1z of the type shown in FIG. 8(A) was produced.

<Image Display Using the Medium D1z>

Using the medium D1z, image display was performed by the image forming apparatus of FIG. 21(A).

The surface of the photosensitive drum PC was uniformly charged by the charger CH to −900V. The images exposure was performed to the charged region by the image exposing device EX and the surface potential in the exposed region was reduced to about −50 V to form an electrostatic latent image E1.

On the other hand, the medium D1z fed was initialized by the magnet plate MG3. Then the surface of the medium D1z was uniformly charged by the charger CRH before image display to have a polarity of about +400 V opposite to the charged polarity of the surface of photosensitive drum.

Subsequently, the medium D1z was passed between the drum PC and the opposite electrode roller (transfer roller) R1 in synchronization with the electrostatic latent images E1 formed on the drum PC. The roller R1 of about $10^8 \Omega$ in resistance was used and a transfer bias voltage of about +1300V was applied to the roller R1 from the power source PW1.

In this way, the electrostatic latent image was transferred to the surface of the medium D1z at about −300V in the image portion (black portion) and at about +300V in the background portion (white portion).

The medium D1z carrying the electrostatic latent image as described above was passed above the magnet plate MG2. Thereby a stirring force was affected on the developer DL containing magnetic developing particles BP in the medium by the oscillating magnetic field, resulting in facilitated movement of developing particles for image display.

In this way, good images were obtained.

<Reversible Image Display Medium D2z>

A reversible image display medium of the same type as the medium 11 having electrodes as shown in FIG. 1 was prepared as follows.

A photoresist was applied to a transparent ITO film on the entire surface of a transparent PET (polyethylene terephthalate) film of 50 μm in thickness as the first substrate 111. Over the photoresist was laid a photomask opened in a specified pattern, followed by exposure to light, development and etching. Then the remaining photoresist was peeled off for removal. A first electrode pattern was formed in which square pixel electrodes 114a (see FIG. 4) measuring 1 mm and 1 mm were arranged as in a checkerboard with the squares spaced from each other by 0.1 mm in such a way that lead portions 110 (see FIG. 4) are disposed between and connected to the pixel electrodes.

A resist was repeatedly applied to increased thickness to other portions than the square electrodes 114a on the first substrate 111 to form the grid-like partition member 113 (see FIG. 3). The partition walls 113a forming the partition member 113 (see FIG. 3) had a thickness (width) α (0.1 mm), a height h (100 μm), and a wall space pt (1 mm) (corresponding to one side of the independent electrode 114a).

An ITO film was formed as the second electrode 115 by a sputtering method to a thickness of 500 Å over the entire surface of the second substrate 112 formed of a transparent PET film of 50 μm in thickness.

Then, the developer DL was placed into each cavity surrounded with the partition wall 113a of the first substrate 111. The developer was placed into the cavity in a volume proportion of 30 vol. % based on the volume of the cavity.

A photo-curing adhesive 119a (see FIG. 1) was applied to a small thickness only to the top of the walls 113a after which the ITO electrode 115 side of the second substrate 112 was closely laid on the top. Then, the adhesive was cured by UV irradiation.

Thereafter, the peripheries of the first and second substrates 111, 112 were sealed by an epoxy resin adhesive 119b (see FIG. 1).

In this way, the medium D2z of the type shown in FIG. 1 was produced.

(Image Display Using the Medium D2z)

In image display using the medium D2z, the image forming apparatus shown in FIG. 19 was used and the second electrode 115 was set to carry a ground potential. A negative voltage was applied to the independent electrodes 114a which correspond to the pixels to be displayed in black, while a positive voltage was applied to the independent electrodes 114a which correspond to the pixels to be displayed in white. In this manner, each independent electrode 114a was supplied with a voltage corresponding to the display data to display images. The developer was initialized by oscillating the magnet plate GM1 before image display, while the developing particles were made easily movable by oscillating the magnet plate GM1 in image display. In this way, good images were obtained.

Now description was given to experiments for confirming the stirring effect of the developer in the medium which was achieved by the magnetic field-generating member.

The experiments were carried out using the medium D1z and holding the same between a pair of electrodes while the magnet plate is provided outside the substrate 112 on a side opposite to the image observation side. The magnet plate was reciprocatingly oscillated in parallel with the substrate 112, and N and S magnetic poles were alternately arranged in the oscillating direction.

Each experiment was made in the following manner (Step 1 and Step 2). In each experiment, use was made of a magnet plate different in magnetic flux density acting on the medium D1z in Step 2 while the number of magnetic poles passing through parts of the developer DL was changed.

Step 1

The electrode on the side of the substrate 112 opposed to the image observation side was set to a ground potential. In this state, −200 V was applied to the electrode on the side of the substrate 111 on the image observation side, while the magnet plate was reciprocatingly oscillated in a sufficient degree in parallel with the substrate 112. Thereby images were formed with black magnetic magnetic particles BP locally distributed on the image observation side. The images were black in their entirety when seen from the image observation side.

Step 2

After Step 1, the electrode on the side of the substrate 112 was set to a ground potential. In this state, +200 V was applied to the electrode on the side of the substrate 111, while the magnet plate of the same type as above which was provided similarly was reciprocatingly oscillated. Thereby images were formed with white developing particles WP locally distributed on the image observation side.

The stirring effect on the developer was evaluated in each experiment. The results were evaluated in terms of the reflection density in the white portion when seen from the image observation side after Step 2. If the maximum reflection density in white portion is 0.4 or less and a difference between the maximum reflection density and the minimum reflection density in white portion is 0.2 or less, it was visually excellent. In this case, the developer stirring effect was deemed to be sufficient (o), and if not so, the developer stirring effect was deemed to be insufficient (x).

The image density was measured by a reflection densitometer (product of Konica Corporation, Sakura DENSITMETER PDA-65).

The evaluation results are shown in Table 8 together with magnetic flux density against the medium D1z of the magnet plate used in Step 2 and the number of magnetic poles of the plate passing through parts of the developer.

It is evident from Table 8 that desirably the magnetic flux density of the magnet plate against the medium was 50 gausses or more and at least two magnetic poles pass through parts of the developer for smooth movement of developing particles.

TABLE 8

| | number of passing magnetic poles 1 | | | | number of passing magnetic poles 2 | | | | number of passig magnetic poles 3 | | | |
|---|---|---|---|---|---|---|---|---|---|---|---|---|
| | image density | | image irregularity | | image density | | image irregularity | | image density | | image irregularity | |
| magnetic flux density (gauss) | maximum ① | minimum ② | maximum-minimum (white portion) ①-② | stirring effect | maximum ① | minimum ② | maximum-minimum (white portion) ①-② | stirring effect | maximum ① | minimum ② | maximum-minimum (white portion) ①-② | stirring effect |
| 30 | 1.67 | 1.50 | 0.17 | x | 0.84 | 0.49 | 0.35 | x | 0.62 | 0.37 | 0.25 | x |
| 40 | 1.63 | 1.52 | 0.11 | x | 0.67 | 0.40 | 0.27 | x | 0.48 | 0.24 | 0.24 | x |
| 50 | 1.50 | 1.10 | 0.40 | x | 0.37 | 0.30 | 0.07 | o | 0.23 | 0.21 | 0.02 | o |
| 60 | 1.42 | 1.01 | 0.41 | x | 0.35 | 0.31 | 0.04 | o | 0.23 | 0.21 | 0.02 | o |
| 100 | 1.42 | 0.97 | 0.45 | x | 0.36 | 0.32 | 0.04 | o | 0.22 | 0.20 | 0.02 | o |
| 200 | 1.47 | 0.92 | 0.55 | x | 0.33 | 0.31 | 0.02 | o | 0.23 | 0.21 | 0.02 | o |
| 300 | 1.33 | 0.83 | 0.50 | x | 0.32 | 0.30 | 0.02 | o | 0.22 | 0.20 | 0.02 | o |

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for displaying an image, comprising the steps of:
   providing a reversible image display medium comprising;
   two substrates opposed to each other with a gap therebetween;
   one or more developer accommodating cells formed between the two substrates, each having a periphery surrounded by a partition wall; and
   a dry developer contained in each of the cells, the dry developer containing at least two kinds of frictionally chargeable dry developing particles having different chargeable polarities and different optical reflection densities;
   displaying an image by applying from outside an electrostatic field corresponding to the image to be displayed and by applying from outside an oscillating force to the frictionally charged dry developing particles having different chargeable polarities to drive the developing particles for image display; and
   substantially stopping application of the oscillating force during the application of the electrostatic field after image display.

2. The method according to claim 1, wherein at least one kind out of the two kinds of frictionally chargeable dry developing particles having different chargeable polarities and different optical reflection densities which form the dry developer are magnetic particles; and wherein
   the application of oscillating force to the developing particles in the image display step is carried out by application of an oscillating magnetic field; and
   the substantial stop of application of oscillating force in the step of substantial stop of application of oscillating force is done by substantial stop of the application of oscillating magnetic field during the application of electrostatic field after image display.

3. The method according to claim 1, wherein the substantial stop of application of oscillating force is conducted after image display and during the application of electrostatic field at 0.5 V/µm or more to the developer from outside.

4. The method according to claim 1, wherein a surface of the image display medium on image observation side is charged to carry a potential holding the displayed image after completion of application of the electrostatic field.

5. The method according to claim 4, wherein at least one kind out of at least two kinds of frictionally chargeable dry developing particles having different chargeable polarities and different optical reflection densities which form the developer are magnetic particles; and wherein
   when the surface of the image display medium on the image observation side is charged to carry the potential holding the displayed image, the charged polarity of the charged potential corresponds to the charged polarity of the magnetic developing particles.

6. The method according to claim 4, wherein the potential holding the displayed image is 100 V or less in terms of absolute value.

7. A method for displaying an image, comprising the steps of:
   providing a reversible image display medium comprising:
   two substrates opposed to each other with a gap therebetween;
   one or more developer accommodating cells formed between the two substrates, each having a periphery surrounded by a partition wall; and
   a dry developer contained in each of the cells, the dry developer containing at least two kinds of frictionally chargeable dry developing particles having different chargeable polarities and different optical reflection densities, at least one kind out of at least two kinds of developing particles being magnetic particles,
   displaying an image by applying an electrostatic field corresponding to the image to be displayed to the frictionally charged developing particles having different chargeable polarities in the medium to drive the developing particles, and affecting a magnetic field on the developer in the reversible image display medium from outside before and/or in the image display step to apply a stirring force to the developing particles, wherein at least one magnetic field-generating member is opposed to the reversible image display medium, and the magnetic field-generating member and the medium are relatively moved to oscillate the magnetic field strength to be applied to the developer, whereby the magnetic stirring force is applied.

8. The method according to claim 7, wherein the magnetic field-generating member is opposed to at least one side of the reversible image display medium.

9. The method according to claim 7, wherein a surface of at least one magnetic field-generating member and the reversible image display medium are relatively moved in one predetermined direction, and the magnetic field-generating member to be used is one in which magnetic poles are arranged in the predetermined direction.

10. The method according to claim 7, wherein a surface of at least one magnetic field-generating member and the reversible image display medium are relatively moved in one predetermined direction and a direction across the predetermined direction, and the magnetic field-generating member to be used is one in which magnetic poles are arranged in the direction across said predetermined direction.

11. The method according to claim 7, wherein a surface of at least one magnetic field-generating member and the reversible image display medium are relatively moved in one predetermined direction and wherein the magnetic field-generating member to be used is one in which magnetic poles are arranged in a direction at a specific angle to said predetermined direction.

12. The method according to claim 7, wherein a surface of at least one magnetic field-generating member and the reversible image display medium are relatively moved in one predetermined direction and the magnetic field-generating member to be used is one in which at least two rows of magnetic poles are arranged in a direction across the predetermined direction such that in two adjacent rows of the magnetic poles, positions of N and S magnetic poles are displaced from each other in the direction of arrangement of the magnetic poles.

13. The method according to claim 7, wherein the magnetic field-generating members are opposed to both sides of the reversible image display medium, and the magnetic field-generating members are different from each other in the arrangement of magnetic poles.

14. An image forming apparatus which displays an image using a reversible image display medium comprising: two substrates opposed to each other with a gap therebetween; one or more developer accommodating cells formed between the two substrates, each having a periphery surrounded by a partition wall; and a dry developer contained in each of the cells, the dry developer containing at least two kinds of frictionally chargeable dry developing particles having different chargeable polarities and different optical reflection densities, at least one kind out of two kinds of developing particles being magnetic particles, the image forming apparatus comprising:

an image forming portion for displaying the image by driving the frictionally charged dry developing particles having different chargeable polarities within the reversible image display medium in an electrostatic field corresponding to the image to be displayed; and at least one device for applying a magnetic stirring force by affecting a magnetic field on the developer in the reversible image display medium form outside to apply the stirring force to the developer before and/or in image display, wherein the device for applying the magnetic stirring force has at least one magnetic field-generating member which is opposed to the reversible image display medium, and magnetic field strength to be applied to the developer is oscillated by relative movement between a surface of the magnetic field-generating member and the medium.

15. The apparatus according to claim 14, wherein the device for applying the magnetic stirring force has the magnetic field-generating member which is opposed to at least one side of the reversible image display medium.

16. The apparatus according to claim 14, wherein the surface of at least one magnetic field-generating member in at least one device for applying the magnetic stirring force and the reversible image display medium are relatively moved in one predetermined direction, and the magnetic field-generating member has magnetic poles arranged in said predetermined direction.

17. The apparatus according to claim 14, wherein the surface of at least one magnetic field-generating member in at least one device for applying the magnetic stirring force and the reversible image display medium are relatively moved in one predetermined direction, and a direction across the predetermined direction and wherein the magnetic field-generating member has magnetic poles arranged in the direction across said predetermined direction.

18. The apparatus according to claim 14, wherein the surface of at least one magnetic field-generating member in at least one device for applying the magnetic stirring force and the reversible image display medium are relatively moved in one predetermined direction, and the magnetic field-generating member has magnetic poles arranged in a direction at a specific angle to said predetermined direction.

19. The apparatus according to claim 14, wherein the surface of at least one magnetic field-generating member in at least one device for applying the magnetic stirring force and the reversible image display medium are relatively moved in one predetermined direction, and the magnetic field-generating member has at least two rows of magnetic poles arranged in a direction across the predetermined direction such that in two adjacent rows of the magnetic poles, positions of N and S magnetic poles are displaced from each other in the direction of arrangement of the magnetic poles.

20. The apparatus according to claim 14, wherein at least one device for applying the magnetic stirring force has magnetic field-generating members which are opposed to both sides of the reversible image display medium and which are different from each other in the arrangement of magnetic poles.

* * * * *